(12) United States Patent
Sadiq et al.

(10) Patent No.: US 12,185,337 B2
(45) Date of Patent: Dec. 31, 2024

(54) TECHNIQUES FOR COMMUNICATING SYNCHRONIZATION SIGNAL BLOCK INDEX IN A TIMING SYNCHRONIZATION SIGNAL

(71) Applicant: QUALCOMM Incorporated, San Diego, CA (US)

(72) Inventors: Bilal Sadiq, Southlake, TX (US); Sundar Subramanian, San Diego, CA (US); Muhammad Nazmul Islam, Littleton, MA (US); Juergen Cezanne, Ocean Township, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/416,681

(22) Filed: Jan. 18, 2024

(65) Prior Publication Data

US 2024/0163887 A1    May 16, 2024

Related U.S. Application Data

(60) Continuation of application No. 17/476,067, filed on Sep. 15, 2021, now Pat. No. 11,882,568, which is a
(Continued)

(51) Int. Cl.
*H04W 72/23* (2023.01)
*H04J 11/00* (2006.01)
(Continued)

(52) U.S. Cl.
CPC .......... *H04W 72/23* (2023.01); *H04L 5/0053* (2013.01); *H04L 27/2656* (2013.01);
(Continued)

(58) Field of Classification Search
CPC ... H04L 5/0053; H04L 5/005; H04L 27/2666; H04L 27/2656; H04L 27/2675; H04W 72/23
See application file for complete search history.

(56) References Cited

U.S. PATENT DOCUMENTS 9,730,105 B2    8/2017  Bhushan et al.
11,140,667 B2   10/2021 Sadiq et al.
(Continued)

FOREIGN PATENT DOCUMENTS

CN    103907325 A    7/2014
CN    104081828 A    10/2014
(Continued)

OTHER PUBLICATIONS

Catt: "Discussion on UTRAN ANR", 3GPP TSG RAN WG2 Meeting #71, R2-104600, Madrid, Spain, Aug. 23-27, 2010, pp. 1-6.
(Continued)

*Primary Examiner* — Elton Williams
(74) *Attorney, Agent, or Firm* — Guang Yu Zhang; Holland & Hart LLP

(57) ABSTRACT

Techniques are described for wireless communication. In one method, a user equipment (UE) receives a timing synchronization signal (TSS) and a physical broadcast channel (PBCH), with the TSS based at least in part on a timing of the TSS within a broadcast channel transmission time interval (BCH TTI); determines the timing of the TSS within the BCH TTI; and demodulates the PBCH based at least in part on the TSS. In another method, a base station allocates resources for a TSS and a PBCH within a BCH TTI; determines the TSS based at least in part on a timing of the TSS within the BCH TTI; and transmits, on the resources allocated for the TSS and the PBCH, the TSS and the PBCH, with the TSS transmitted as a demodulation reference signal
(Continued)

(DMRS) for the PBCH on at least one port used to transmit the TSS and the PBCH.

20 Claims, 29 Drawing Sheets

Related U.S. Application Data division of application No. 15/921,026, filed on Mar. 14, 2018, now Pat. No. 11,140,667.

(60) Provisional application No. 62/476,633, filed on Mar. 24, 2017.

(51) Int. Cl.
    *H04L 5/00*    (2006.01)
    *H04L 27/26*    (2006.01)
    *H04W 56/00*    (2009.01)

(52) U.S. Cl.
    CPC ..... *H04L 27/2666* (2013.01); *H04W 56/0015* (2013.01); *H04J 11/0073* (2013.01); *H04J 11/0076* (2013.01); *H04L 5/005* (2013.01); *H04L 27/2675* (2013.01)

(56) References Cited

U.S. PATENT DOCUMENTS

| | | | |
|---|---|---|---|
| 2013/0083682 | A1 | 4/2013 | Ng et al. |
| 2013/0195069 | A1 | 8/2013 | Frederiksen et al. |
| 2015/0092768 | A1 | 4/2015 | Ng et al. |
| 2015/0208396 | A1 | 7/2015 | Guan et al. |
| 2015/0296469 | A1 | 10/2015 | Yoon |
| 2016/0344519 | A1 | 11/2016 | Lin et al. |
| 2017/0005764 | A1 | 1/2017 | Park et al. |
| 2017/0064685 | A1 | 3/2017 | Rico Alvarino et al. |
| 2018/0123849 | A1 | 5/2018 | Si et al. |
| 2018/0248642 | A1* | 8/2018 | Si .......................... H04L 5/0053 |
| 2018/0279271 | A1 | 9/2018 | Sadiq et al. |
| 2019/0158337 | A1 | 5/2019 | Yoon et al. |
| 2020/0014453 | A1 | 1/2020 | Takeda et al. |
| 2020/0053738 | A1 | 2/2020 | Harada et al. |
| 2022/0007344 | A1 | 1/2022 | Sadiq et al. |

FOREIGN PATENT DOCUMENTS

| | | |
|---|---|---|
| CN | 106465313 A | 2/2017 |
| EP | 3571802 A2 | 11/2019 |
| GB | 2413026 B | 3/2006 |
| IN | 201937033973 A | 10/2019 |
| JP | WO2014181618 A1 | 2/2017 |
| WO | 2013015660 A2 | 1/2013 |
| WO | WO-2014189912 | 11/2014 |
| WO | 2016074629 A1 | 5/2016 |
| WO | 2018155987 A2 | 8/2018 |

OTHER PUBLICATIONS

Catt: "NR Initial Access Procedure with Multi-Stage Synchronization Signals", 3GPP TSG RAN WG1 NR Ad hoc Meeting, R1-1700177, 3GPP TSG RAN WG1 #AH, 3GPP, Spokane, WA, USA, Jan. 16-20, 2017, pp. 1-6, Jan. 10, 2017.

Catt: "NR PBCH and NR Physical Channel Carried System Information", 3GPP TSG RAN WG1 AH_NR Meeting, R1-1700182, Spokane, USA, Jan. 16-20, 2017, Jan. 9, 2017, 5 Pages, Feb. 7, 2017.

Cohere Technologies : "NR SS Burst Composition and SS Time Index Indication", 3GPP TSG-RAN Meeting #88, R1-1702374, Feb. 13-17, 2017, 5 Pages.

Convida Wireless: "Design Considerations on SS Burst Set", 3GPP TSG RAN WG1 Meeting #88, R1-1702579, Athens, Greece, Feb. 7, 2017, 4 Pages, Feb. 13, 2017-Feb. 17, 2017.

Huawei, et al., "Discussion on SS Burst Set Composition and SS Block Time Index Indication", 3GPP Draft, R1-1703353, 3GPP TSG RAN WG1 Meeting #88, 3rd Generation Partnership Project (3GPP), Mobile Competence Centre, 650, Route Des Lucioles, F-06921 Sophia-Antipolis Cedex, France vol. RAN WG1 Meeting #88, Athens, Greece, Feb. 13, 2017-Feb. 17, 2017, Feb. 12, 2017 (Feb. 12, 2017), XP051210483, pp. 1-7.

Innovative Technology Lab Co: "On NR-SS Structure and Time Indexing", R1-1703422, 3GPP TSG RAN WG1 Meeting #88, Athens, Greece Feb. 13-17, 2017, 6 Pages, Feb. 7, 2017.

Innovative Technology Lab Co: "Synchronization Signal Structure", 3GPP Draft, 3GPP TSG RAN WG1 NR Ad-Hoc Meeting, R1-1701037, 3rd Generation Partnership Project (3GPP), Mobile Competence Centre, 650, Route Des Lucioles, F-06921 Sophia-Antipolis Cedex, France Spokane, USA, Jan. 16-20, 2017, XP051203318, 6 Pages.

Intel Corporation: "Synchronization Signal Sequence Design" [online], 3GPP Draft, 3GPP TSG RAN WG1 Meeting RAN1 #88, R1-1702180, Athens, Greece Feb. 13-17, 2017, 9 Pages, Retrieved from the Internet: URL: http://www.3gpp.org/ftp/tsg_ran/WG1_RL1/TSGR1_88/Docs/R1-1702180.zip.

International Preliminary Report on Patentability—PCT/US2018/022682, The International Bureau of WIPO—Geneva, Switzerland, Oct. 3, 2019 (173525WO).

International Search Report and Written Opinion—PCT/US2018/022682—ISA/EPO—Sep. 17, 2018 (173525WO).

Nokia, et al., "NR-PBCH Design," 3GPP Draft; R1-1703094, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051210232, 10 pages, Retrieved from the Internet: URL: http://www.3gpp.org/ftp/Meetings_3GPP_SYNC/RAN1/Docs/ [retrieved on Feb. 12, 2017].

Nokia, et al., "SS Bandwidth, Numerology and Multiplexing", 3GPP Draft, 3GPP TSG-RAN WG1 NR AH Meeting, R1-1701056, 3rd Generation Partnership Project (3GPP), Mobile Competence Centre; 650, Route Des Lucioles, F-06921 Sophia-Antipolis Cedex, France, vol. RAN WG1, No. Spokane, U.S.A, Jan. 16, 2017-Jan. 20, 2017, Jan. 16, 2017 (Jan. 16, 2017), XP051208571, 10 Pages, Section 2.1 and 2.3.

Nokia, et al., "SS Bandwidth, Numerology and Multiplexing", R1-1703090, 3GPP TSG RAN WG1 Meeting#88, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017, XP051210228, 6 pages.

Partial International Search Report—PCT/US2018/022682—ISA/EPO—Jun. 5, 2018 (173525WO).

Qualcomm Incorporated : "Performance Evaluation of Interference Randomization", 3GPP TSG-RAN WG1 Ad-Hoc#2, R1-1711952, Jun. 27-30, 2017, pp. 1-5.

Qualcomm Incorporated: "PBCH Design Considerations", 3GPP TSG-RAN WG1 #88, R1-1702589, Athens, Greece, Feb. 13-17, 2017, 9 Pages, Feb. 6, 2017.

Qualcomm Incorporated: "SS Burst Composition and Time Index Indication Considerations", 3GPP TSG-RAN WG1 NR #88, R1-1702585, 3rd Generation Partnership Project, Mobile Competence Centre, 650, Route Des Lucioles, F-06921 Sophia-Anti, vol. RAN WG1, No. Athens, Greece, Feb. 13, 2017-Feb. 17, 2017, 6 Pages, Feb. 12, 2017, XP051209739.

Samsung: "SS Bandwidth and Multiplexing in SS Block", R1-1702900, 3GPP TSG RAN WG1 Meeting #88, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017, XP05120044, 6 pages.

Samsung: "SS Periodicity", 3GPP TSG RAN WG1#88, R1-1702903, Athens, Greece, Feb. 13-17, 2017, 7 Pages, Parts 1, 3 and 4.1.

Samsung: "SS BW and Multiplexing", 3GPP TSG RAN WG1 NR AH, R1-1700883, Spokane, USA, 8 Pages, Jan. 16, 2017-Jan. 20, 2017, Jan. 10, 2017.

(56) References Cited

OTHER PUBLICATIONS

Spreadtrum Communications : "PBCH-DMRS Design and Time Index Indication Mechanism", 3GPP TSG RAN WG1 Meeting #90, R1-1713059, Aug. 21-25, 2017, pp. 1-8.
Spreadtrum Communications: "Indication of the SS-Block Index in Multi-Beam Cases", 3GPP Draft, 3GPP RAN WG1 #AH, R1-1700288, Indication of the SS-Block Index in Multi-Beam Cases—Final, 3rd Generation Partnership Project (3GPP), Mobile Competence Centre, 650, Route Des Lucioles, F-06921, Sophiaanti, vol. RAN WG1, No. Spokane, USA, Jan. 16, 2017-Jan. 20, 2017, Jan. 16, 2017 (Jan. 16, 2017), 4 Pages, XP051207826, Jan. 9, 2017.
Taiwan Search Report—TW107108822—TIPO—Mar. 25, 2022 (173525TW).
Taiwan Search Report—TW111117434—TIPO—Jun. 26, 2023 (173525TWD1).

* cited by examiner

TECHNIQUES FOR COMMUNICATING SYNCHRONIZATION SIGNAL BLOCK INDEX IN A TIMING SYNCHRONIZATION SIGNAL

CROSS REFERENCES

The present application for patent is a Continuation of U.S. patent application Ser. No. 17/476,067 by Sadiq et al., entitled "TECHNIQUES FOR COMMUNICATING SYNCHRONIZATION SIGNAL BLOCK INDEX IN A TIMING SYNCHRONIZATION SIGNAL" filed Sep. 15, 2021, which is a Divisional of U.S. patent application Ser. No. 15/921,026 by Sadiq et al., entitled "TECHNIQUES FOR COMMUNICATING SYNCHRONIZATION SIGNAL BLOCK INDEX IN A TIMING SYNCHRONIZATION SIGNAL" filed Mar. 14, 2018, which claims priority to U.S. Provisional Patent Application No. 62/476,633 by Sadiq et al., entitled "TECHNIQUES FOR COMMUNICATING SYNCHRONIZATION SIGNAL BLOCK INDEX IN A TIMING SYNCHRONIZATION SIGNAL," filed Mar. 24, 2017, assigned to the assignee hereof.

BACKGROUND

Field of the Disclosure

The present disclosure, for example, relates to wireless communication systems, and more particularly to techniques for communicating a synchronization signal (SS) block index in a timing synchronization signal (TSS).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as user equipments (UEs). In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs) on downlink channels (e.g., for transmissions from a base station to a UE and uplink channels (e.g., for transmissions from a UE to a base station).

Wireless devices that operate in mmW frequency ranges, e.g., 28 GHz, 40 GHz, 60 GHz, etc., may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. In some cases, a base station may transmit signals on a broadcast channel by repetitively transmitting the signals while changing the beam on which the signals are transmitted (e.g., the base station may transmit the signals on each of a plurality of beams while performing a beam sweep). In some cases, a base station may repetitively transmit a group of signals defining a SS block. The signals transmitted within the SS block may include a primary synchronization signal (PSS), a secondary synchronization signal (SSS), and/or a physical broadcast channel (PBCH). These signals may be used by a UE for acquisition of a network, for example, or for other purposes. Conventional techniques used by a UE to acquire and synchronize with the network are deficient.

SUMMARY

The described techniques relate to improved methods, systems, and devices, or apparatuses that support communicating a synchronization signal (SS) block index in a timing synchronization signal (TSS). Generally, the described techniques relate to a base station transmitting a set of SS blocks each conveying a TSS that includes a SS block index, and a user equipment (UE) may identify and use the SS block index to determine the timing of the TSS with respect to a broadcast channel transmission time interval (BCH TTI). Beneficially, the UE may use the timing of the TTI to reduce the amount of time required to acquire and synchronize with the base station.

In an example, when a base station transmits a plurality of SS blocks carrying duplicative signals on different beams (or on a same beam, but at different times), and a UE receives one of the SS blocks, the UE may determine the timing of the SS block with respect to a slot boundary, subframe boundary, frame boundary, or some other timing reference, so that the UE may synchronize with the base station. If the UE has additional a priori information about the SS blocks it is receiving, the UE may be able to make assumptions about the timing and synchronization of the signals that enable the UE to synchronize with the base station and perform demodulation more quickly. For example, if a base station transmits all signals within an SS block coherently (e.g., from the same antenna port), then the UE can assume that all the signals within the SS block are quasi co-located; that is, the UE can assume that certain properties of the signals within the SS block are essentially constant, such as, for example, the delay spread, Doppler spread, Doppler shift, etc. This may enable the UE to synchronize with the base station more quickly by using, for example, SSS as a reference for a TSS, which in turn serves as a demodulation reference signal for a physical broadcast channel (PBCH). The UE may then use the TSS and SSS together to demodulate the PBCH.

In one example, a method for wireless communication at a UE is described. The method may include receiving a TSS and a PBCH, the TSS based at least in part on a timing of the TSS within a broadcast channel transmission time interval (BCH TTI); determining the timing of the TSS within the BCH TTI; and demodulating the PBCH based at least in part on the TSS.

In one example, an apparatus for wireless communication at a UE is described. The apparatus may include a processor, memory in electronic communication with the processor, and instructions stored in the memory. The instructions may be executable by the processor to receive a TSS and a PBCH, the TSS based at least in part on a timing of the TSS within a BCH TTI; to determine the timing of the TSS within the BCH TTI; and to demodulate the PBCH based at least in part on the TSS.

In one example, another apparatus for wireless communication at a UE is described. The apparatus may include means for receiving a TSS and a PBCH, the TSS based at least in part on a timing of the TSS within a BCH TTI; means for determining the timing of the TSS within the BCH TTI; and means for demodulating the PBCH based at least in part on the TSS.

In one example, a non-transitory computer-readable medium storing computer-executable code for wireless communication at a UE is described. The code may be executable by a processor to receive a TSS and a PBCH, the TSS based at least in part on a timing of the TSS within a BCH TTI; determine the timing of the TSS within the BCH TTI; and demodulate the PBCH based at least in part on the TSS.

Some examples of the method, apparatus, and non-transitory computer-readable medium described above may further include processes, features, means, or instructions for receiving a SS block that includes the TSS and the PBCH, and the TSS may be based at least in part on a SS block index associated with the SS block, and the SS block index indicates the timing of the TSS within the BCH TTI; and determining, based at least in part on the SS block index, the timing of the SS block within the BCH TTI. In some examples, receiving the TSS and the PBCH may include receiving the TSS time division multiplexed with the PBCH on a same set of one or more frequency subcarriers. In some examples, the SS block may further include a PSS and a SSS, and receiving the TSS, the SSS, and the PBCH may include receiving the PBCH and the TSS after the SSS.

In some examples, receiving the TSS and the PBCH may include receiving the TSS on a first set of one or more frequency subcarriers that overlaps a second set of one or more frequency subcarriers on which the PBCH is received, and the first set of one or more frequency subcarriers may be different from the second set of one or more frequency subcarriers. In some examples, receiving the TSS and the PBCH may include receiving the TSS frequency division multiplexed with at least a portion of the PBCH. In some examples, the SS block may further include a PSS and a SSS, and receiving the SSS and the PBCH may include receiving a second portion of the PBCH after the SSS.

In some examples, receiving the TSS and the PBCH may include receiving the TSS on a first set of one or more frequency subcarriers that is interleaved with a second set of one or more frequency subcarriers on which the PBCH is received. In some examples, the SS block may further include a PSS and a SSS, and receiving the TSS, the PSS, the SSS, and the PBCH may include receiving the PSS and the SSS frequency division multiplexed with the interleaved TSS and PBCH.

Some examples of the method, apparatus, and non-transitory computer-readable medium described above may further include processes, features, means, or instructions for receiving the SS block index encoded in a waveform signature of the TSS, or in at least one modulation symbol in the TSS. Some examples of the method, apparatus, and non-transitory computer-readable medium described above may further include processes, features, means, or instructions for identifying, based at least in part on the SS block index, a beam on which the SS block is transmitted. In some examples, the PBCH may be received based at least in part on the SS block index, and the method, apparatus, and non-transitory computer-readable medium may further include processes, features, means, or instructions for decoding the PBCH based at least in part on the SS block index. In some examples, the SS block may further include a PSS and a SSS, and the SSS is based at least in part on a physical cell identity (PCI) of a base station.

In some examples, the SS block may further include a PSS and a SSS, and the method, apparatus, and non-transitory computer-readable medium may further include processes, features, means, or instructions for demodulating the PBCH based at least in part on the SSS. In some examples, the SS block may be one SS block in a plurality of SS blocks within the BCH TTI. In some examples, the TSS includes at least one modulation symbol encoding the SS block index, and the method, apparatus, and non-transitory computer-readable medium described above may further include processes, features, means, or instructions for decoding the SS block index encoded in the at least one modulation symbol. In some examples, the at least one modulation symbol includes a quadrature phase-shift keying (QPSK) symbol.

In one example, a method for wireless communication at a base station is described. The method may include allocating resources for a TSS and a PBCH within a BCH TTI; determining the TSS based at least in part on a timing of the TSS within the BCH TTI; transmitting, on the resources allocated for the TSS and the PBCH, the TSS and the PBCH, the TSS transmitted as a demodulation reference signal (DMRS) for the PBCH on at least one port used to transmit the TSS and the PBCH.

In one example, an apparatus for wireless communication at a base station is described. The apparatus may include a processor, memory in electronic communication with the processor, and instructions stored in the memory. The instructions may be executable by the processor to allocate resources for a TSS and a PBCH within a BCH TTI; determine the TSS based at least in part on a timing of the TSS within the BCH TTI; and transmit, on the resources allocated for the TSS and the PBCH, the TSS and the PBCH, the TSS transmitted as a DMRS for the PBCH on at least one port used to transmit the TSS and the PBCH.

In one example, another apparatus for wireless communication at a base station is described. The apparatus may include means for allocating resources for a TSS and a PBCH within a BCH TTI; means for determining the TSS based at least in part on a timing of the TSS within the BCH TTI; and means for transmitting, on the resources allocated for the TSS and the PBCH, the TSS and the PBCH, the TSS transmitted as a DMRS for the PBCH on at least one port used to transmit the TSS and the PBCH.

In one example, a non-transitory computer-readable medium storing computer-executable code for wireless communication at a base station is described. The code may be executable by a processor to allocate resources for a TSS and a PBCH within a BCH TTI; determine the TSS based at least in part on a timing of the TSS within the BCH TTI; and transmit, on the resources allocated for the TSS and the PBCH, the TSS and the PBCH, the TSS transmitted as a DMRS for the PBCH on at least one port used to transmit the TSS and the PBCH.

Some examples of the method, apparatus, and non-transitory computer-readable medium described above may further include processes, features, means, or instructions for allocating resources for a SS block, the resources allocated for the SS block including the resources allocated for the TSS and the PBCH, and the timing of the TSS may be based at least in part on a SS block index associated with the SS block. The SS block index may indicate the timing of the TSS within the BCH TTI, and the TSS and the PBCH may be transmitted by transmitting the SS block. In some examples, transmitting the TSS and the PBCH may include time division multiplexing the TSS with the PBCH on a same set of one or more frequency subcarriers. In some examples, the SS block may further include a PSS and a SSS, and transmitting the TSS, the SSS, and the PBCH may include transmitting the PBCH and the TSS after the SSS.

In some examples, transmitting the TSS and the PBCH may include transmitting the TSS on a first set of one or more frequency subcarriers that overlaps a second set of one or more frequency subcarriers on which the PBCH is transmitted, and the first set of one or more frequency subcarriers may be different from the second set of one or more frequency subcarriers. In some examples, transmitting the TSS and the PBCH may include frequency division multiplexing the TSS and at least a portion of the PBCH. In some examples, the SS block may further include a PSS and a SSS, and transmitting the SSS and the PBCH may include transmitting a second portion of the PBCH after the SSS.

In some examples, transmitting the TSS and the PBCH may include transmitting the TSS on a first set of one or more frequency subcarriers that is interleaved with a second set of one or more frequency subcarriers on which the PBCH is transmitted. In some examples, the SS block may further include a PSS and a SSS, and transmitting the TSS, the PSS, the SSS, and the PBCH may include frequency division multiplexing the PSS and the SSS with the interleaved TSS and PBCH. Some examples of the method, apparatus, and non-transitory computer-readable medium may further include processes, features, means, or instructions for encoding the SS block index in a waveform signature of the TSS, or including the SS block index in at least one modulation symbol in the TSS. In some examples, the SS block index may further identify a beam on which the SS block is transmitted.

In some examples, the PBCH may be transmitted based at least in part on the SS block index. In some examples, the SS block may further include a PSS and a SSS, and the SSS is determined based at least in part on a PCI of the base station. In some examples, the SS block may further include a PSS and a SSS, and the SSS may be transmitted as an additional DMRS for the PBCH, on at least one port used to transmit the SSS and the PBCH. In some examples, the SS block may be one SS block in a plurality of SS blocks transmitted within the BCH TTI. Some examples of the method, apparatus, and non-transitory computer-readable medium may further include processes, features, means, or instructions for encoding the SS block index in at least one modulation symbol, and transmitting, on the resources allocated for the SS block, the TSS, wherein the TSS includes the at least one modulation symbol. In some cases, the at least one modulation symbol includes a quadrature phase-shift keying (QPSK) symbol.

In one example, another method for wireless communication at a UE is described. The method may include receiving a SS block that includes a TSS, a PSS, and a SSS, the TSS based at least in part on a SS block index associated with the SS block; determining, based at least in part on the SS block index, a timing of the SS block within a BCH TTI; and demodulating the TSS based at least in part on the SSS.

In one example, another apparatus for wireless communication at a UE is described. The apparatus may include a processor, memory in electronic communication with the processor, and instructions stored in the memory. The instructions may be executable by the processor to receive a SS block that includes a TSS, a PSS, and a SSS, the TSS based at least in part on a SS block index associated with the SS block; determine, based at least in part on the SS block index, a timing of the SS block within a BCH TTI; and demodulate the TSS based at least in part on the SSS.

In one example, another apparatus for wireless communication at a UE is described. The apparatus may include means for receiving a SS block that includes a TSS, a PSS, and a SSS, the TSS based at least in part on a SS block index associated with the SS block; means for determining, based at least in part on the SS block index, a timing of the SS block within a BCH TTI; and means for demodulating the TSS based at least in part on the SSS.

In one example, a non-transitory computer-readable medium storing computer-executable code for wireless communication at a UE is described. The code may be executable by a processor to receive a SS block that includes a TSS, a PSS, and a SSS, the TSS based at least in part on a SS block index associated with the SS block; determine, based at least in part on the SS block index, a timing of the SS block within a BCH TTI; and demodulate the TSS based at least in part on the SSS.

In some examples of the method, apparatus, and non-transitory computer-readable medium described above, the SS block may further include a PBCH, and receiving the TSS and the PBCH may include receiving the TSS time division multiplexed with the PBCH on a same set of one or more frequency subcarriers. In some examples, receiving the TSS, the SSS, and the PBCH may include receiving the PBCH and the TSS after the SSS.

Some examples of the method, apparatus, and non-transitory computer-readable medium described above may further include processes, features, means, or instructions for receiving the SS block index encoded in a waveform signature of the TSS, or in at least one modulation symbol in the TSS.

Some examples of the method, apparatus, and non-transitory computer-readable medium described above may further include processes, features, means, or instructions for identifying, based at least in part on the SS block index, a beam on which the SS block is received.

In some examples of the method, apparatus, and non-transitory computer-readable medium described above, the SS block may further include a PBCH, the PBCH may be received based at least in part on the SS block index, and the method, apparatus, and non-transitory computer-readable medium may further include processes, features, means, or instructions for decoding the PBCH based at least in part on the SS block index.

In some examples of the method, apparatus, and non-transitory computer-readable medium described above, the SSS may be determined based at least in part on a PCI of a base station.

In some examples of the method, apparatus, and non-transitory computer-readable medium described above, the SS block may further include a PBCH, and the method, apparatus, and non-transitory computer-readable medium may further include processes, features, means, or instructions for demodulating the PBCH based at least in part on the SSS.

In some examples of the method, apparatus, and non-transitory computer-readable medium described above, the SS block may be one SS block in a plurality of SS blocks within the BCH TTI.

In one example, another method for wireless communication at a base station is described. The method may include allocating resources for a SS block; determining a TSS based at least in part on a SS block index associated with the SS block, the SS block index indicating a timing of the SS block within a BCH TTI; and transmitting, on the resources allocated for the SS block, the TSS, a PSS, and a SSS, the SSS transmitted as a DMRS for the TSS on at least one port used to transmit the TSS and the SSS.

In one example, another apparatus for wireless communication at a base station is described. The apparatus may include a processor, memory in electronic communication with the processor, and instructions stored in the memory. The instructions may be executable by the processor to allocate resources for a SS block; determine a TSS based at least in part on a SS block index associated with the SS block, the SS block index indicating a timing of the SS block within a BCH TTI; and transmit, on the resources allocated for the SS block, the TSS, a PSS, and a SSS, the SSS transmitted as a DMRS for the TSS on at least one port used to transmit the TSS and the SSS.

In one example, another apparatus for wireless communication at a base station is described. The apparatus may include means for allocating resources for a SS block; means for determining a TSS based at least in part on a SS block index associated with the SS block, the SS block index indicating a timing of the SS block within a BCH TTI; and means for transmitting, on the resources allocated for the SS block, the TSS, a PSS, and a SSS, the SSS transmitted as a DMRS for the TSS on at least one port used to transmit the TSS and the SSS.

In one example, a non-transitory computer-readable medium storing computer-executable code for wireless communication at a base station is described. The code may be executable by a processor to allocate resources for a SS block; determine a TSS based at least in part on a SS block index associated with the SS block, the SS block index indicating a timing of the SS block within a BCH TTI; and transmit, on the resources allocated for the SS block, the TSS, a PSS, and a SSS, the SSS transmitted as a DMRS for the TSS on at least one port used to transmit the TSS and the SSS.

In some examples of the method, apparatus, and non-transitory computer-readable medium described above, the SS block may further include a PBCH, and transmitting the TSS and the PBCH may include time division multiplexing the TSS with the PBCH on a same set of one or more frequency subcarriers. In some examples, transmitting the TSS, the SSS, and the PBCH may include transmitting the PBCH and the TSS after the SSS.

Some examples of the method, apparatus, and non-transitory computer-readable medium described above may further include processes, features, means, or instructions for encoding the SS block index in a waveform signature of the TSS, or including the SS block index in at least one modulation symbol in the TSS.

In some examples of the method, apparatus, and non-transitory computer-readable medium described above, the SS block index may further identify a beam on which the SS block is transmitted.

In some examples of the method, apparatus, and non-transitory computer-readable medium described above, the SS block may further include a PBCH, and the PBCH may be transmitted based at least in part on the SS block index.

In some examples of the method, apparatus, and non-transitory computer-readable medium described above, the SSS may be determined based at least in part on a PCI of the base station.

In some examples of the method, apparatus, and non-transitory computer-readable medium described above, the SS block may further include a PBCH, and the SSS is transmitted as a DMRS for the PBCH, on at least one port used to transmit the SSS and the PBCH.

In some examples of the method, apparatus, and non-transitory computer-readable medium described above, the SS block may be one SS block in a plurality of SS blocks transmitted within the BCH TTI.

In one example, another method for wireless communication at a UE is described. The method receiving a SS block that includes a TSS including at least one modulation symbol; decoding a SS block index encoded in the at least one modulation symbol; and identifying, based at least in part on the SS block index, a timing of the SS block within a BCH TTI.

In one example, another apparatus for wireless communication at a UE is described. The apparatus may include a processor, memory in electronic communication with the processor, and instructions stored in the memory. The instructions may be executable by the processor to receive a SS block that includes a TSS including at least one modulation symbol; decode a SS block index encoded in the at least one modulation symbol; and identify, based at least in part on the SS block index, a timing of the SS block within a BCH TTI.

In one example, another apparatus for wireless communication at a UE is described. The apparatus may include means for receiving a SS block that includes a TSS including at least one modulation symbol; means for decoding a SS block index encoded in the at least one modulation symbol; and means for identifying, based at least in part on the SS block index, a timing of the SS block within a BCH TTI.

In one example, a non-transitory computer-readable medium storing computer-executable code for wireless communication at a UE is described. The code may be executable by a processor to receive a SS block that includes a TSS including at least one modulation symbol; decode a SS block index encoded in the at least one modulation symbol; and identify, based at least in part on the SS block index, a timing of the SS block within a BCH TTI.

In some examples of the method, apparatus, and non-transitory computer-readable medium described above, the at least one modulation symbol may include a quadrature phase-shift keying (QPSK) symbol or a binary phase-shift keying (BPSK) symbol.

Some examples of the method, apparatus, and non-transitory computer-readable medium described above may further include processes, features, means, or instructions for decoding, from the at least one modulation symbol, at least one parameter of a beam sweep configuration used to receive a plurality of SS blocks, including the SS block, within the BCH TTI. In some examples, the at least one parameter of the beam sweep configuration may include: a number of beams in a SS block burst-set, or a periodicity of the SS block burst-set, or a combination thereof.

In some examples of the method, apparatus, and non-transitory computer-readable medium described above, the SS block index may be encoded in the at least one modulation symbol using a polar code, or a Reed-Mueller code, or a Golay code, or a tail-biting convolutional code (TBCC).

Some examples of the method, apparatus, and non-transitory computer-readable medium described above may further include processes, features, means, or instructions for decoding a cyclic redundancy check (CRC) for the SS block index encoded in the at least one modulation symbol; and verifying the SS block index based at least in part on the CRC.

In some examples of the method, apparatus, and non-transitory computer-readable medium described above, the SS block may further include a PSS, a SSS, and a PBCH.

In one example, another method for wireless communication at a base station is described. The method allocating resources for a SS block; encoding a SS block index in at least one modulation symbol, the SS block index indicating a timing of the SS block within a BCH TTI; and transmitting, on the resources allocated for the SS block, a TSS that includes the at least one modulation symbol.

In one example, another apparatus for wireless communication at a base station is described. The apparatus may include a processor, memory in electronic communication with the processor, and instructions stored in the memory. The instructions may be executable by the processor to allocate resources for a SS block; encode a SS block index in at least one modulation symbol, the SS block index indicating a timing of the SS block within a BCH TTI; and transmit, on the resources allocated for the SS block, a TSS that includes the at least one modulation symbol.

In one example, another apparatus for wireless communication at a base station is described. The apparatus may include means for allocating resources for a SS block; means for encoding a SS block index in at least one modulation symbol, the SS block index indicating a timing of the SS block within a BCH TTI; and means for transmitting, on the resources allocated for the SS block, a TSS that includes the at least one modulation symbol.

In one example, a non-transitory computer-readable medium storing computer-executable code for wireless communication at a base station is described. The code may be executable by a processor to allocate resources for a SS block; encode a SS block index in at least one modulation symbol, the SS block index indicating a timing of the SS block within a BCH TTI; and transmit, on the resources allocated for the SS block, a TSS that includes the at least one modulation symbol.

In some examples of the method, apparatus, and non-transitory computer-readable medium described above, the at least one modulation symbol may include a QPSK symbol or a BPSK symbol.

Some examples of the method, apparatus, and non-transitory computer-readable medium described above may further include processes, features, means, or instructions for encoding, in the at least one modulation symbol, at least one parameter of a beam sweep configuration used to transmit a plurality of SS blocks, including the SS block, within the BCH TTI.

In some examples of the method, apparatus, and non-transitory computer-readable medium described above, the at least one parameter of the beam sweep configuration may include: a number of beams in a SS block burst-set, or a periodicity of the SS block burst-set, or a combination thereof.

In some examples of the method, apparatus, and non-transitory computer-readable medium described above, the SS block index may be encoded in the at least one modulation symbol using a polar code, or a Reed-Mueller code, or a Golay code, or a TBCC.

Some examples of the method, apparatus, and non-transitory computer-readable medium described above may further include processes, features, means, or instructions for generating a CRC for the SS block index; and encoding the CRC in the at least one modulation symbol, along with the SS block index.

In some examples of the method, apparatus, and non-transitory computer-readable medium described above, the SS block may further include a PSS, a SSS, and a PBCH.

In one example, another method for wireless communication at a UE is described. The method receiving a SS block including a TSS and a PBCH, the TSS based at least in part on a SS block index associated with the SS block; demodulating the TSS and the PBCH based at least in part on a DMRS; and identifying, based at least in part on the SS block index, a timing of the SS block within a BCH TTI.

In one example, another apparatus for wireless communication at a UE is described. The apparatus may include a processor, memory in electronic communication with the processor, and instructions stored in the memory. The instructions may be executable by the processor to receive a SS block including a TSS and a PBCH, the TSS based at least in part on a SS block index associated with the SS block; demodulate the TSS and the PBCH based at least in part on a DMRS; and identify, based at least in part on the SS block index, a timing of the SS block within a BCH TTI.

In one example, another apparatus for wireless communication at a UE is described. The apparatus may include means for receiving a SS block including a TSS and a PBCH, the TSS based at least in part on a SS block index associated with the SS block; means for demodulating the TSS and the PBCH based at least in part on a DMRS; and means for identifying, based at least in part on the SS block index, a timing of the SS block within a BCH TTI.

In one example, a non-transitory computer-readable medium storing computer-executable code for wireless communication at a UE is described. The code may be executable by a processor to receive a SS block including a TSS and a PBCH, the TSS based at least in part on a SS block index associated with the SS block; demodulate the TSS and the PBCH based at least in part on a DMRS; and identify, based at least in part on the SS block index, a timing of the SS block within a BCH TTI.

In some examples of the method, apparatus, and non-transitory computer-readable medium described above, the SS block may further include a PSS and a SSS, and the DMRS may include the SSS.

In one example, another method for wireless communication at a base station is described. The method allocating resources for a SS block; determining a TSS based at least in part on a SS block index associated with the SS block, the SS block index indicating a timing of the SS block within a BCH TTI; and transmitting, on the resources allocated for the SS block, the TSS and a PBCH, the SS block including a same DMRS for the TSS and the PBCH on at least one port used to transmit the DMRS, the TSS, and the PBCH.

In one example, another apparatus for wireless communication at a base station is described. The apparatus may include a processor, memory in electronic communication with the processor, and instructions stored in the memory. The instructions may be executable by the processor to allocate resources for a SS block; determine a TSS based at least in part on a SS block index associated with the SS block, the SS block index indicating a timing of the SS block within a BCH TTI; and transmit, on the resources allocated for the SS block, the TSS and a PBCH, the SS block including a same DMRS for the TSS and the PBCH on at least one port used to transmit the DMRS, the TSS, and the PBCH.

In one example, another apparatus for wireless communication at a base station is described. The apparatus may include means for allocating resources for a SS block; means for determining a TSS based at least in part on a SS block index associated with the SS block, the SS block index indicating a timing of the SS block within a BCH TTI; and means for transmitting, on the resources allocated for the SS block, the TSS and a PBCH, the SS block including a same DMRS for the TSS and the PBCH on at least one port used to transmit the DMRS, the TSS, and the PBCH.

In one example, a non-transitory computer-readable medium storing computer-executable code for wireless communication at a base station is described. The code may be executable by a processor to allocate resources for a SS block; determine a TSS based at least in part on a SS block index associated with the SS block, the SS block index indicating a timing of the SS block within a BCH TTI; and transmit, on the resources allocated for the SS block, the TSS and a PBCH, the SS block including a same DMRS for the TSS and the PBCH on at least one port used to transmit the DMRS, the TSS, and the PBCH.

In some examples of the method, apparatus, and non-transitory computer-readable medium described above, the SS block may further include a PSS and a SSS, and the DMRS may include the SSS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
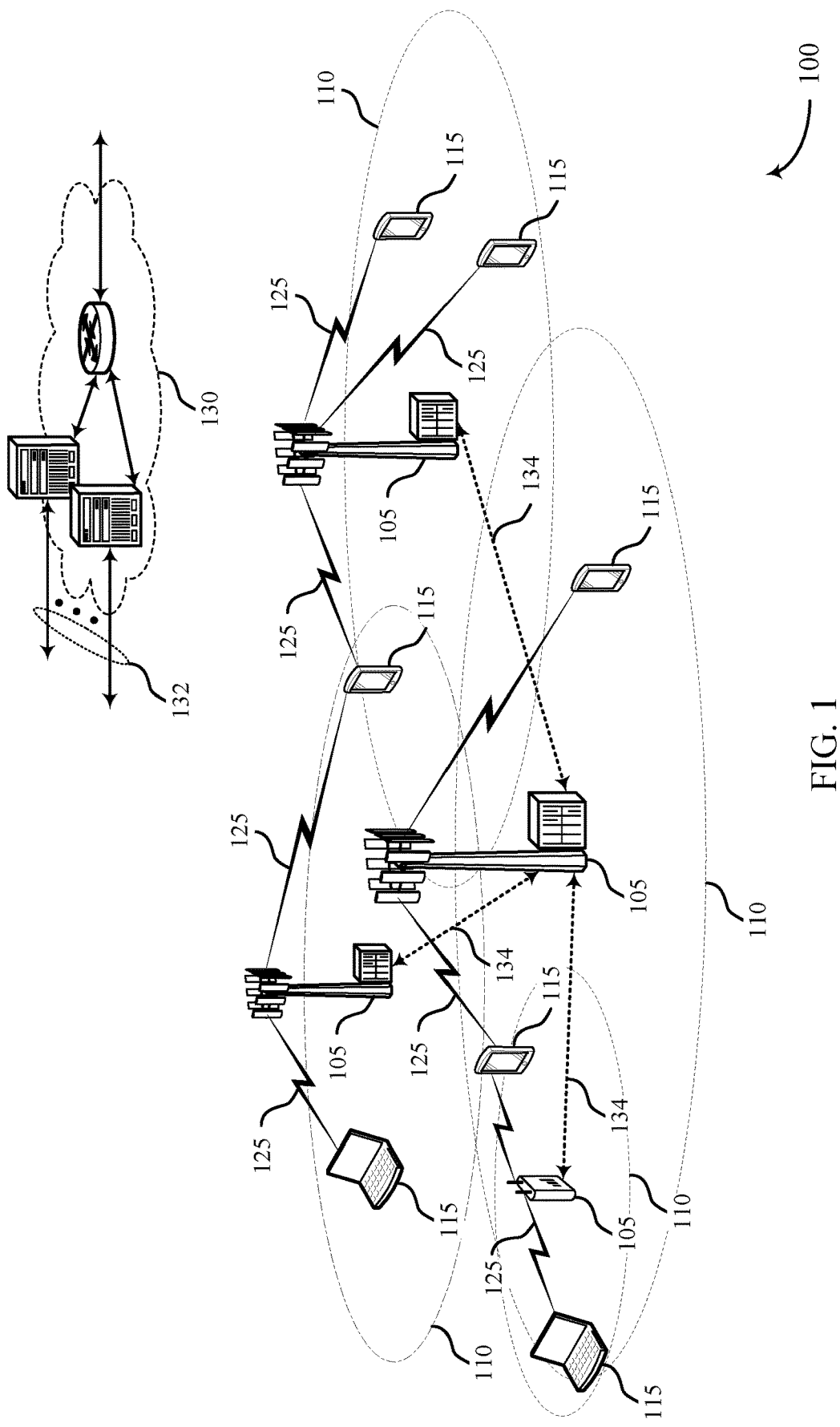
FIG. 1 shows an example of a wireless communication system, in accordance with various aspects of the present disclosure.

The described techniques relate to improved methods, systems, and devices, or apparatuses that support communicating a synchronization signal (SS) block index in a timing synchronization signal (TSS). Generally, the described techniques relate to a base station transmitting a set of SS blocks each conveying a TSS that includes a SS block index, and a user equipment (UE) may identify and use the SS block index to determine the timing of the TSS with respect to a broadcast channel transmission time interval (BCH TTI). Beneficially, the UE may use the timing of the TTI to reduce the amount of time required to acquire and synchronize with the base station.

A wireless communication system (e.g., a mmW system) may utilize directional or beamformed transmissions (e.g., beams) for communication. For example, a base station may transmit signals on multiple beams associated with different directions. In some cases, the base station may engage in beam sweeping over a portion (or all) of the possible beams for transmitting messages or signals intended for UEs distributed throughout a coverage area of the base station. In some cases, a base station may transmit multiple instances of a SS block, on different beams, during a periodic BCH TTI. In other cases, a base station may transmit multiple instances of a SS block on a same beam, or in an omnidirectional manner. A UE that receives one of the SS blocks may acquire a network associated with the base station. However, before or while acquiring the network, the UE may determine the timing of one or more SS blocks that it receives. In some cases, the timing of a SS block may be determined based at least in part on a SS block index that conveys the timing of the SS block within a sequence of SS blocks.

Techniques described in the present disclosure use a TSS to convey a SS block index. A TSS may be referred to as a tertiary synchronization signal or extended synchronization signal since it augments primary and secondary synchronization signals (PSS and SSS) and may enable more efficient synchronization between the UE and the base station. A TSS may be transmitted alongside other synchronization signals—such as PSS and SSS—that convey time synchronization at different granularity (e.g., OFDM symbol timing but not necessarily the OFDM symbol index or the SS block index). For example, a base station may periodically transmit 40 SS blocks. All or many of these SS blocks may contain identically transmitted signals such as a PSS/SSS and a PBCH. Therefore, these blocks may not be distinguishable. In contrast, a TSS can also be transmitted in every SS block but may change from block to block to convey the SS block index.

In an example, an SS block may carry one or more synchronization signals (such as PSS, SSS, and/or TSS). If the base station coherently transmits all signals within an SS block (e.g., from the same antenna port), then the UE can assume that the synchronization signals are quasi-collocated and therefore may have consistent signal properties, such as the delay spread, Doppler spread, Doppler shift, etc. Based on this assumption, the UE may be able to synchronize with the base station more quickly by using, for example, SSS as a reference for TSS, which in turn serves as reference for a PBCH. The UE may then use TSS and SSS together to demodulate the PBCH. For example, the UE determine a signal to noise ratio (SNR) and/or a signal to noise plus interference ratio (SINR) for the TSS, the SSS, or both, transmitted via a wireless channel, and use the determined SNR and/or SINR for demodulating the PBCH. In another example, the UE may use the TSS, the SSS, or both, to generate a channel estimate (e.g., estimate of a phase shift caused to the TSS, the SSS, or both, by transmission via a wireless channel), and use the channel estimate for demodulating the PBCH. It is also possible that PBCH changes from block to block but, because it may be computationally complex to determine an SS block index via changes in PBCH, TSS may be used instead to convey SS block index. In this case, the changes in PBCH can be used to verify the SS block index determined using the TSS.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 shows an example of a wireless communication system 100, in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to- Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a UE 115 may perform an initial access (acquisition) procedure with a base station 105, synchronize with a base station 105, or measure signals transmitted by a base station 105. When performing the initial access procedure (or synchronizing, or performing measurements), the UE 115 may search a wireless spectrum for a SS block transmitted by the base station 105. The SS block may include information usable by the UE 115 to synchronize the UE 115 with the base station 105, so that the UE 115 may communicate with the base station 105 (or over a network to which the base station 105 provides access). After synchronizing with the base station 105, the UE 115 may initiate a random access procedure with the base station 105 by transmitting a random access preamble to the base station 105.

Figure 2:
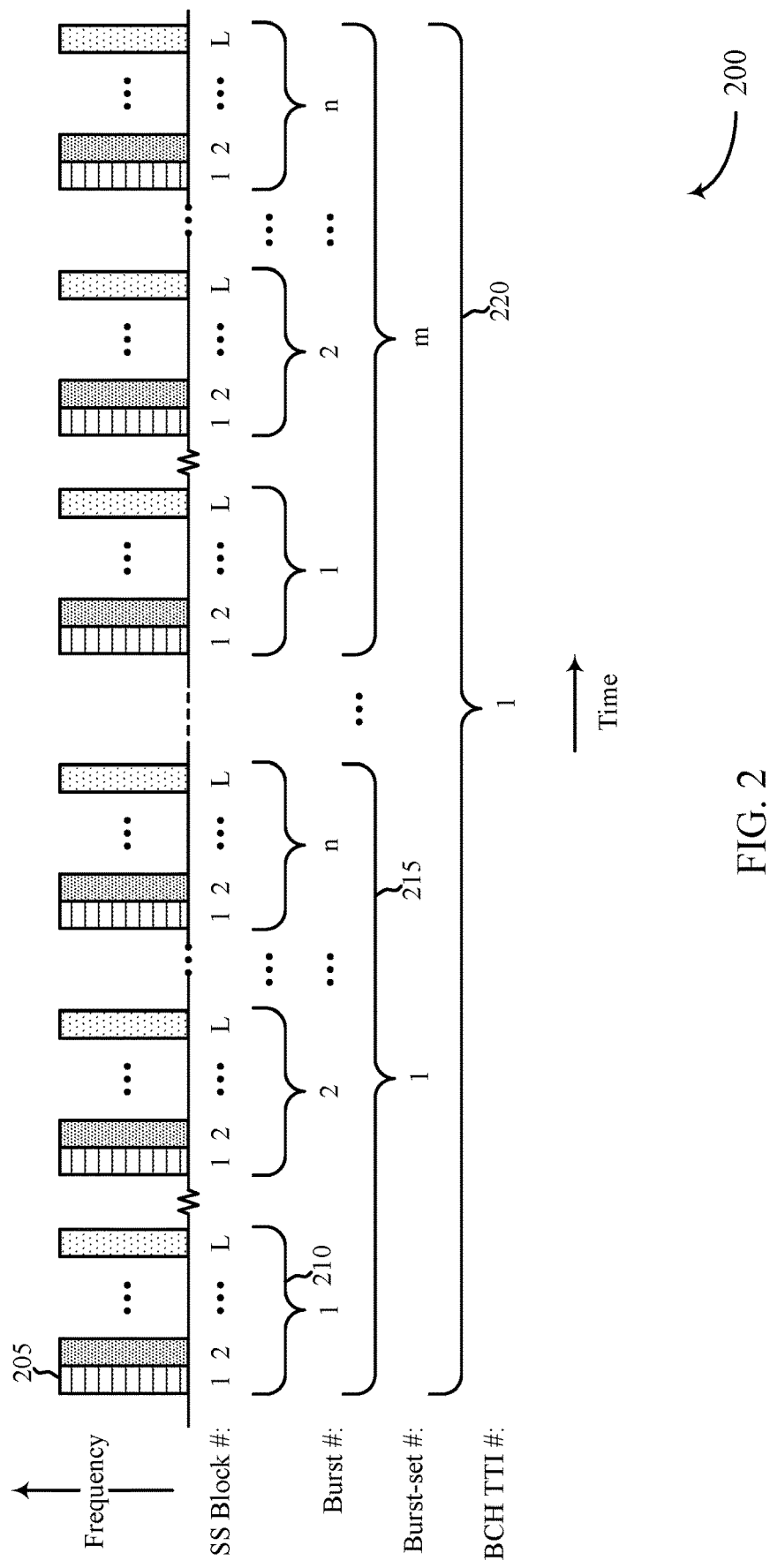
FIG. 2 shows an example timeline of SS blocks within a periodic BCH TTI, in accordance with various aspects of the present disclosure.

FIG. 2 shows an example timeline 200 of SS blocks 205 within a periodic BCH TTI, in accordance with various aspects of the present disclosure. The SS blocks 205 may be transmitted by a base station, which base station may be an example of aspects of one or more of the base stations 105 described with reference to FIG. 1. A UE may receive one or more of the SS blocks 205. The UE may be an example of aspects of one or more of the UEs 115 described with reference to FIG. 1.

The SS blocks 205 may include a plurality of SS blocks 205 transmitted in succession during a SS block burst 210. A SS block burst 210 may include L SS blocks 205. In some examples, the SS blocks 205 within a SS block burst 210 may be transmitted on different beams using a beam sweep. In other examples, the SS blocks 205 within a SS block burst 210 may be transmitted on a same beam, or in an omnidirectional manner In some examples, a SS block 205 may include a TSS and one or more of a PSS, a SSS, or a PBCH. In some examples, the PBCH may carry a master information block (MIB) and the TSS. The TSS may convey a SS block index or other timing information. In an example, the TSS may be a set of coded bits to be sent using modulation symbols, where the coded bits encode at least an SS block index. In some examples, the coded bits may include one or more other parameters of a beam sweep configuration of a base station 105. The one or more parameters may include a periodicity of burst set, a number of beams in the burst set, or the like. In some examples, the burst set may be defined as the set of beams transmitted periodically and carrying SS blocks 205 in a coverage are of base station 105.

A SS block index may indicate a timing of a TSS (or SS block 205) within a sequence of SS blocks 205 (e.g., a timing of a TSS (or SS block 205) within a SS block burst 210). A SS block index may thus also indicate a timing of a SS block 205 within a SS block burst-set 215 and within a BCH TTI 220 (although in some cases, other timing information may need to be combined with the timing indicated by a SS block index to fully determine a timing of a SS block 205 within a SS block burst-set 215 or BCH TTI 220). In some examples, a SS block index may also indicate a beam on which a SS block 205 is transmitted. In some examples, a SS block index may be encoded in a waveform signature of a TSS (e.g., the SS block index may be sequence-based) or included in at least one modulation symbol in the TSS (e.g., the SS block index may be message-based). In some examples, the SSS of a SS block 205 may be based at least in part on a physical cell identity (PCI) of the base station that transmitted the SS block 205.

A plurality of SS blocks bursts 210 may be transmitted within a SS block burst-set 215. In some examples, the SS block bursts 210 in a SS block burst-set 215 may be associated with different PBCH redundancy versions (RVs). In some cases, a SS block burst-set 215 may include n SS block bursts 210. The SS block bursts 210 within a SS block burst-set 215 may be separated in time.

A plurality of SS block burst-sets 215 may be transmitted within the BCH TTI 220. For purposes of this disclosure, a BCH TTI is defined to include any time interval in which a plurality of SS blocks are transmitted with the same system information, regardless of whether the SS blocks are allocated to SS block bursts 210 or SS block burst-sets 215. In some examples, the SS block burst-sets 215 in a BCH TTI 220 may be associated with different SSSs. In some cases, a BCH TTI 220 may include m SS block burst-sets 215.

When m=2, n=4, and L=14, the number of SS blocks 205 transmitted within the BCH TTI 220 may be 112 (e.g., m·n·L=112). In other examples, the values of m, n, and L may be higher or lower. Regardless, a UE that receives one of the SS blocks 205 may need to determine the timing of the SS block 205 within a SS block burst 210, a SS block burst-set 215, and/or a BCH TTI 220.

Figure 3:
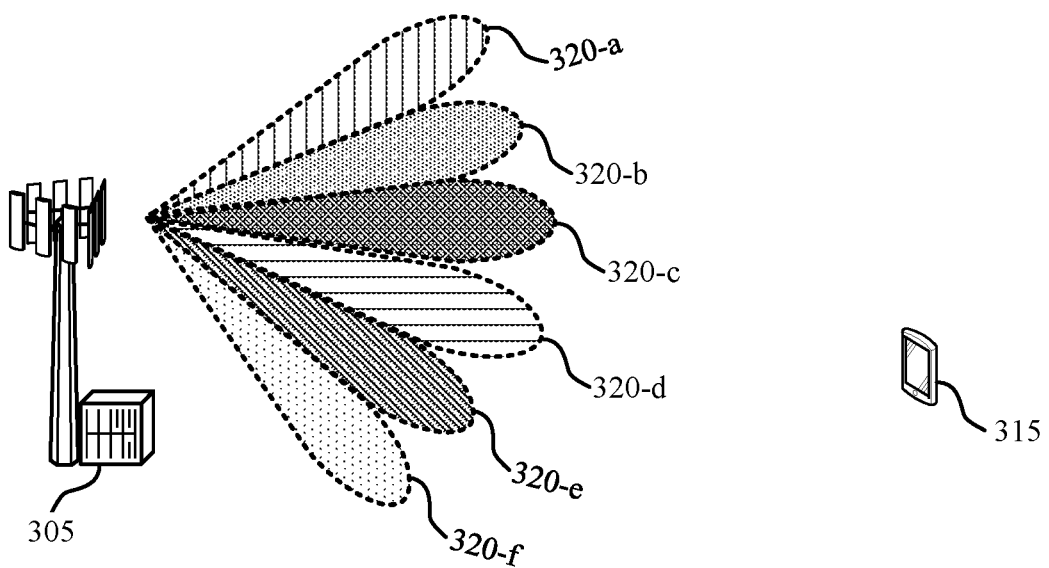
FIG. 3 shows an example of a mmW wireless communication system, in accordance with various aspects of the present disclosure.

FIG. 3 shows an example of a mmW wireless communication system 300, in accordance with various aspects of the present disclosure. The mmW wireless communication system 300 may include a base station 305 and a UE 315, which may be examples of aspects of one or more of the base stations 105 or UEs 115 described with reference to FIG. 1.

To overcome signal attenuation and path losses at mmW frequencies, the base station 305 and UE 315 may communicate with one another on one or more beams (i.e., directional beams). As shown, the base station 305 may transmit signals on a plurality of beams 320 (e.g., on different directional beams 320, including, for example, a first beam 320-a, a second beam 320-b, a third beam 320-c, a fourth beam 320-d, a fifth beam 320-e, and a sixth beam 320-f). In other examples, the base station 305 may transmit on more or fewer beams 320.

In some examples, the base station 305 may transmit a SS block on each of the beams 320, and the UE 315 may receive the SS block on one of the beams 320. The UE 315 may determine the timing of the SS block, and a beam 320 on which the SS block is received, to acquire a network to which the base station 305 provides access. In some examples, the UE 315 may determine the timing of the SS block and/or identify the beam 320 on which the SS block is received based at least in part on a SS block index conveyed by a TSS included in the SS block.

FIGS. 4-7 show examples of time-frequency plots for SS blocks having various configurations.

Figure 4:
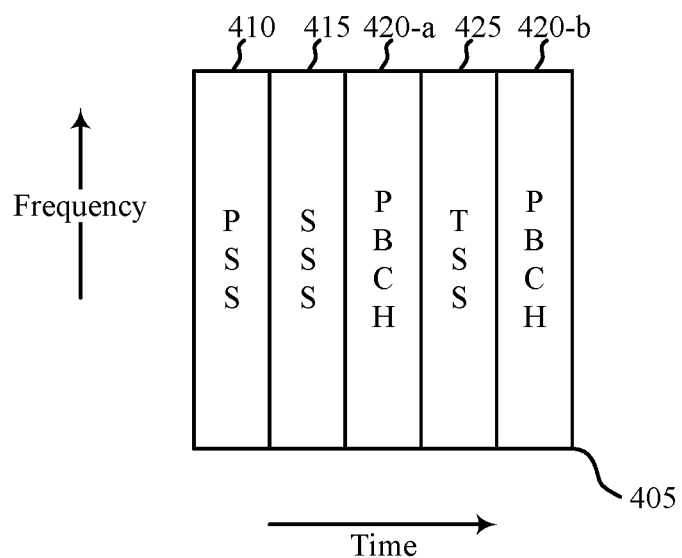
FIGS. 4-7 show example time-frequency plots of a SS block, in accordance with various aspects of the present disclosure.

FIG. 4 shows an example time-frequency plot 400 of a SS block 405, in accordance with various aspects of the present disclosure. The SS block 405 includes a PSS 410, SSS 415, first portion of a PBCH 420-a, TSS 425, and second portion of the PBCH 420-b that are time division multiplexed on a same set of one or more frequency subcarriers and transmitted in the order shown in FIG. 4.

Figure 5:
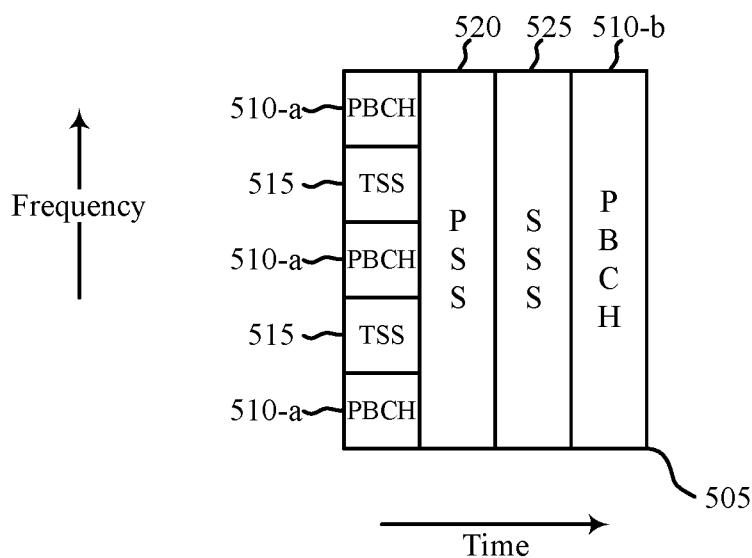

FIG. 5 shows an example time-frequency plot 500 of a SS block 505, in accordance with various aspects of the present disclosure. The SS block 505 includes a PSS 520, SSS 525, and second portion of a PBCH 510-b that are time division multiplexed on a same set of one or more frequency subcarriers and transmitted in the order shown in FIG. 5. The SS block 505 may also include a first portion of the PBCH 510-a and a TSS 515 that are frequency division multiplexed and transmitted before the PSS 520. The TSS 515 is therefore transmitted on a first set of one or more frequency subcarriers that overlaps a second set of frequency subcarriers on which the PSS 520, SSS 525, and PBCH 510 are transmitted.

Figure 6:
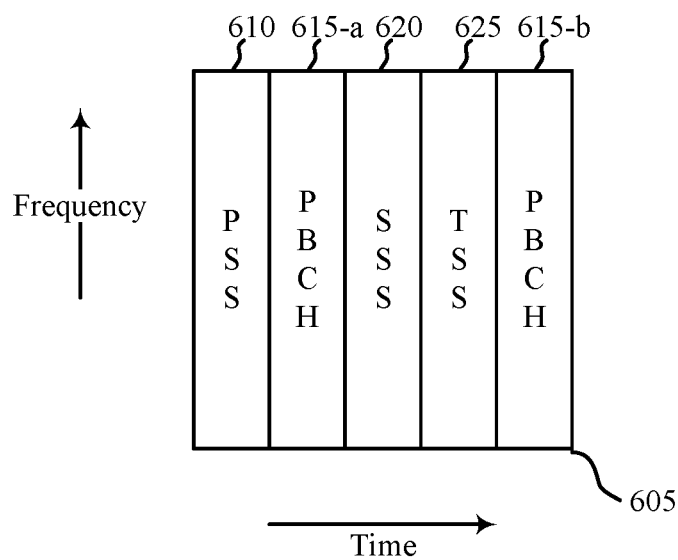

FIG. 6 shows an example time-frequency plot 600 of a SS block 605, in accordance with various aspects of the present disclosure. The SS block 605 includes a PSS 610, first portion of a PBCH 615-a, SSS 620, TSS 625, and second portion of the PBCH 615-b that are time division multiplexed and transmitted in the order shown in FIG. 6.

Figure 7:
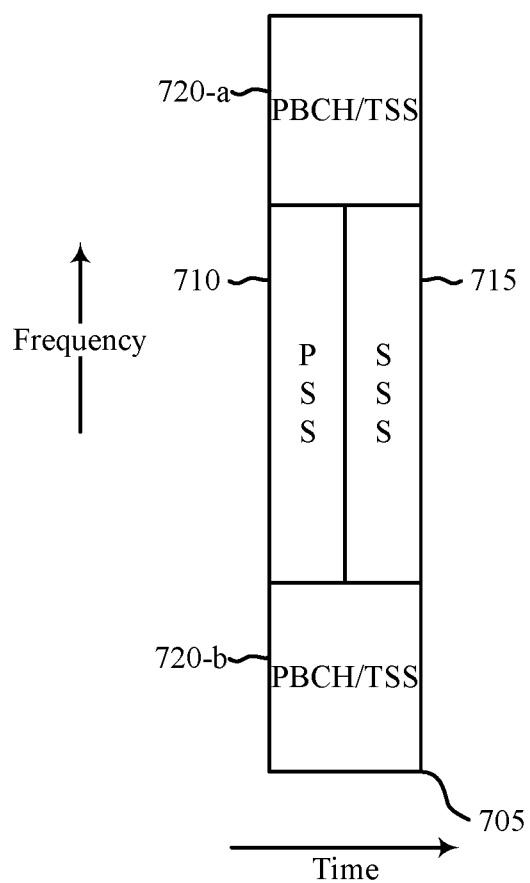

FIG. 7 shows an example time-frequency plot 700 of a SS block 705, in accordance with various aspects of the present disclosure. The SS block 705 includes a PSS 710 and SSS 715 that are time division multiplexed and transmitted over a range of frequency subcarriers (or resource blocks) in the order shown in FIG. 7. The SS block 705 may also include a TSS transmitted on a first set of frequency subcarriers that is interleaved with a second set of frequency subcarriers on which the PBCH is transmitted. The interleaved frequency subcarriers 720-a and 720-b on which the TSS and PBCH are transmitted may be frequency division multiplexed with the PSS 710 and SSS 715, and in some cases, the interleaved frequency subcarriers 720-a and 720-b on which the TSS and PBCH are transmitted may include frequency subcarriers on either end of the range of frequency subcarriers over which the PSS 710 and SSS 715 are transmitted.

In some examples, the TSS described with reference to any of FIGS. 2 and 4-7 may be based at least in part on a timing of the TSS within a BCH TTI and/or based at least in part on a SS block index associated with a SS block in which the TSS is transmitted. The SS block index may indicate the timing of the TSS within a BCH TTI (e.g., the SS block index may partially or fully indicate the timing of the TSS within the BCH TTI). The TSS may be transmitted (used) as a DMRS for a PBCH, on at least one port used to transmit the TSS and the PBCH. For example, the TSS may be coherently transmitted from the same port used to transmit a transmission via the PBCH. In the examples shown in FIGS. 4-6, the SSS may also be transmitted (used) as a DMRS for the PBCH, on at least one port used to transmit the SSS and the PBCH. For example, the SSS may be coherently transmitted from the same port used to transmit a transmission via the PBCH. In some examples, the TSS and PBCH may be transmitted within a same SS block. In other examples, the TSS and PBCH may not be transmitted in a same SS block.

In some examples, the SSS described with reference to any of FIGS. 2, 4, and 6 may be transmitted (used) as a DMRS for a TSS, on at least one port used to transmit the SSS and the TSS. Equivalently, the TSS may be transmitted/detected coherently with the SSS. The TSS may be based at least in part on a timing of the TSS within a BCH TTI and/or based at least in part on a SS block index associated with a SS block in which the TSS is transmitted. The SSS may also be transmitted (used) as a DMRS for a PBCH, on at least one port used to transmit the SSS and the PBCH. In some examples, the TSS and PBCH may be transmitted within a same SS block. In other examples, the TSS and PBCH may not be transmitted in a SS block.

In some examples, a DMRS transmitted in an SS block described with reference to any of FIGS. 2, 4, 6, and 7 may be transmitted (used) as a DMRS for both a TSS and a PBCH transmitted in the SS block. In the examples described with reference to FIGS. 4 and 6, the DMRS may include the SSS.

In some examples, a TSS may be message-based and include at least one modulation symbol in which a SS block index is encoded. The at least one modulation symbol may include, for example, a QPSK symbol or a BPSK symbol. In some examples, the SS block index may be encoded in the at least one modulation symbol using a polar code, or a Reed-Mueller code, or a Golay code, or a TBCC. In some examples, a cyclic redundancy check (CRC) for the SS block index may be encoded in the at least one modulation symbol, and may be used by a UE to verify the SS block index. In an example, information bits of the TSS indicating the SS block index may be encoded using a Polar code, or a Reed-Muller code, or a Golay code, or a TBCC, or the like, and a CRC algorithm may be performed on the information bits to generate a CRC for the SS block index. One or more bits of the CRC may be attached to the information bits to form a bit sequence for encoding (e.g., polar encoding, etc.). The CRC along with the SS block index may be encoded in at least one modulation symbol. The UE 315 may use the CRC to verify whether decoding of the SS block index is successful. In some examples, the information bits may indicate at least one parameter of a beam sweep configuration used to transmit/receive a plurality of SS blocks, such as, for example, a number of beams in a SS block burst set, or a periodicity of the SS block burst set, or the like, or a combination thereof.

Figure 8:
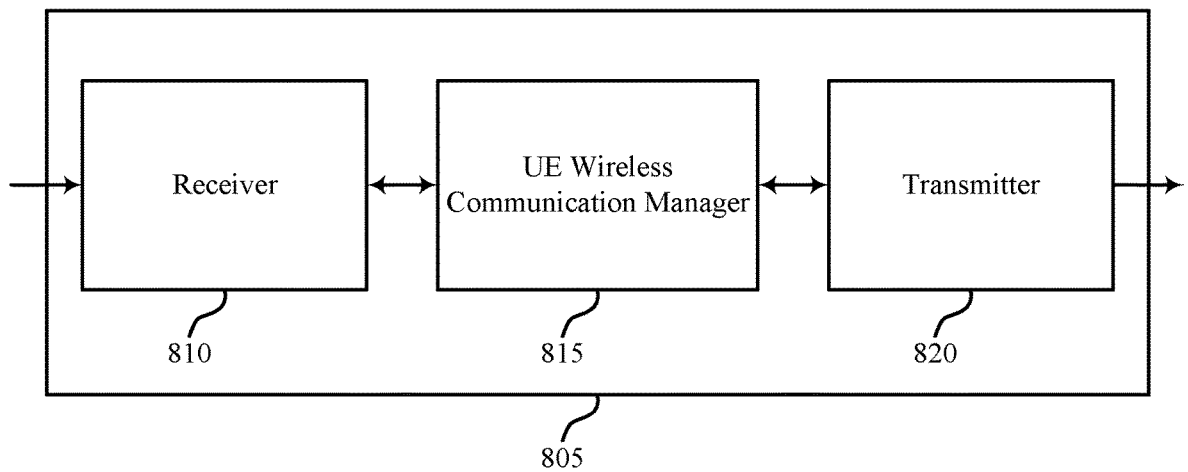
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the UEs described with reference to FIGS. 1 and 3. The apparatus 805 may include a receiver 810, a UE wireless communication manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805. The receiver 810 may include one or a plurality of antennas.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver(s) 1830 described with reference to FIG. 18. The transmitter 820 may include one or a plurality of antennas, which may be separate from (or shared with) the one or more antennas used by the receiver 810.

The UE wireless communication manager 815 and/or at least some of its various sub-components may be implemented in hardware, software executed by a processor, firmware, or any combination thereof. If implemented in software executed by a processor, the functions of the UE wireless communication manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE wireless communication manager 815 and/or at least some of its various sub-components may be physically located at various positions, including being distributed such that portions of functions are implemented at different physical locations by one or more physical devices. In some examples, the UE wireless communication manager 815 and/or at least some of its various sub-components may be a separate and distinct component in accordance with various aspects of the present disclosure. In other examples, the UE wireless communication manager 815 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The UE wireless communication manager 815 may be used to receive one or more of the SS blocks described with reference to FIGS. 2 and 4-7, and to determine the timing of a SS block from a TSS included in the SS block. The TSS may be based at least in part on a SS block index associated with the SS block. In some examples, the UE wireless communication manager 815 may be used to receive a TSS that is outside of a SS block and based at least in part on a timing of the TSS within a BCH TTI.

Figure 9:
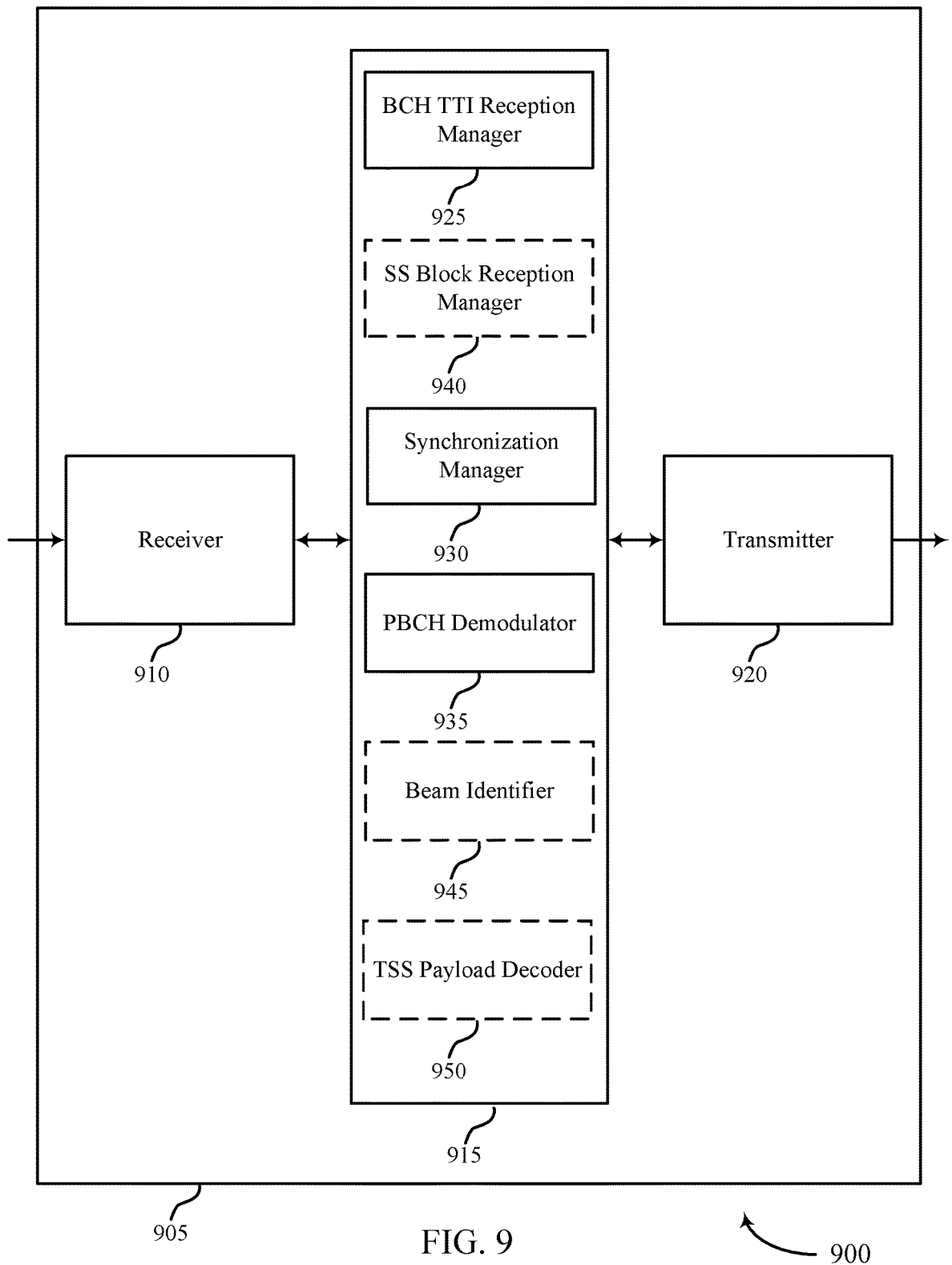
FIGS. 9-12 show block diagrams of apparatus for use in wireless communication, including various UE wireless communication managers, in accordance with various aspects of the present disclosure.

FIG. 9 shows a block diagram 900 of a wireless device 905 that supports communication of an SS block index in a timing synchronization signal in accordance with aspects of the present disclosure. Wireless device 905 may be an example of aspects of a wireless device 805 or a UE as described with reference to FIG. 8. Wireless device 905 may include receiver 910, UE wireless communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to timing synchronization, for example. Information may be passed on to other components of the device. The receiver 910 may be an example of aspects of the transceiver 1830 described with reference to FIG. 18. The receiver 910 may utilize a single antenna or a set of antennas.

Transmitter 920 may transmit signals generated by other components of the device. In some examples, the transmitter 920 may be collocated with a receiver 910 in a transceiver module. For example, the transmitter 920 may be an example of aspects of the transceiver 1835 described with reference to FIG. 18. The transmitter 920 may utilize a single antenna or a set of antennas.

UE wireless communication manager 915 may be an example of aspects of the UE wireless communication manager described with reference to FIG. 8. The UE wireless communication manager 915 may include a BCH TTI reception manager 925, a synchronization manager 930, a PBCH demodulator 935, an optional SS block reception manager 940, and optional beam identifier 945. Each of these components may communicate, directly or indirectly, with one another (e.g., via one or more buses).

In a first example of the UE wireless communication manager 915, the BCH TTI reception manager 925 may be used to receive a TSS and a PBCH, as described for example with reference to FIGS. 2-7. The TSS may be based at least in part on a timing of the TSS within a BCH TTI. The synchronization manager 930 may be used to determine the timing of the TSS within the BCH TTI, as described for example with reference to FIGS. 2-7. The PBCH demodulator 935 may be used to demodulate the PBCH based at least in part on the TSS, as described herein and for example with reference to FIGS. 2-7.

In a second example of the UE wireless communication manager 915, the BCH TTI reception manager 925 or SS block reception manager 940 may be used to receive a SS block that includes a TSS and a PBCH, as described for example with reference to FIGS. 2-7. The TSS may be based at least in part on a SS block index associated with the SS block. In some examples, the TSS may be based at least in part on the SS block index because the SS block index is encoded in a waveform signature of the TSS, or because the SS block index is included in at least one modulation symbol in the TSS. The SS block index may indicate the timing of the TSS within a BCH TTI, and may thus indicate the timing of the SS block within the BCH TTI. In some examples, the SS block may further include a PSS and a SSS. The SSS may be based at least in part on a PCI of the base station. In some examples, the SS block may be one SS block in a plurality of SS blocks within the BCH TTI. In some examples, the TSS may include at least one modulation symbol. In some examples the at least one modulation symbol may include a QPSK symbol or a BPSK symbol.

Also in the second example of the UE wireless communication manager 915, the synchronization manager 930 may be used to determine, based at least in part on the SS block index, the timing of the SS block, and thus the timing of the TSS, within the BCH TTI, as described for example with reference to FIGS. 2-7. The PBCH demodulator 935 may be used to demodulate the PBCH based at least in part on the TSS, as described herein and for example with reference to FIGS. 2-7. For example, the TSS may be transmitted as a DMRS for the PBCH. The PBCH demodulator 935 determine a signal to noise ratio (SNR) and/or a signal to noise plus interference ratio (SINR) for the TSS transmitted via a wireless channel, and use the determined SNR and/or SINR for demodulating the PBCH. In another example, the PBCH demodulator 935 may use the TSS to generate a channel estimate (e.g., estimate of a phase shift caused to the TSS by transmission via a wireless channel), and use the channel estimate for demodulating the PBCH. When the SS block includes a PSS and a SSS, the PBCH may be further demodulated based at least in part on the SSS. The beam identifier 945 may optionally be used to identify, based at least in part on the SS block index, a beam on which the SS block is transmitted, as described for example with reference to FIGS. 2-7. The TSS payload decoder 950 may be used to decode a SS block index encoded in the at least one modulation symbol, as described for example with reference to FIGS. 2-7.

In some examples, receiving the TSS and the PBCH may include receiving the TSS time division multiplexed with the PBCH on a same set of one or more frequency subcarriers. In some of these examples, the SS block may further include a PSS and a SSS, and receiving the TSS, the SSS, and the PBCH may include receiving the PBCH and the TSS after the SSS.

In some examples, receiving the TSS and the PBCH may include receiving the TSS on a first set of one or more frequency subcarriers that overlaps a second set of one or more frequency subcarriers on which the PBCH is received. The first set of one or more frequency subcarriers may be different from the second set of one or more frequency subcarriers. In some examples, receiving the TSS and the PBCH may further include receiving the TSS frequency division multiplexed with at least a portion of the PBCH. In some examples, the SS block may further include a PSS and a SSS, and receiving the SSS and the PBCH may include receiving a second portion of the PBCH after the SSS.

In some examples, receiving the TSS and the PBCH may include receiving the TSS on a first set of one or more frequency subcarriers that is interleaved with a second set of one or more frequency subcarriers on which the PBCH is received. In some of these examples, the SS block may further include a PSS and a SSS, and receiving the TSS, the PSS, the SSS, and the PBCH may include receiving the PSS and the SSS frequency division multiplexed with the interleaved TSS and PBCH.

In some examples, the PBCH may be received based at least in part on the SS block index, and the UE wireless communication manager 915 may decode the PBCH based at least in part on the SS block index.

Figure 10:
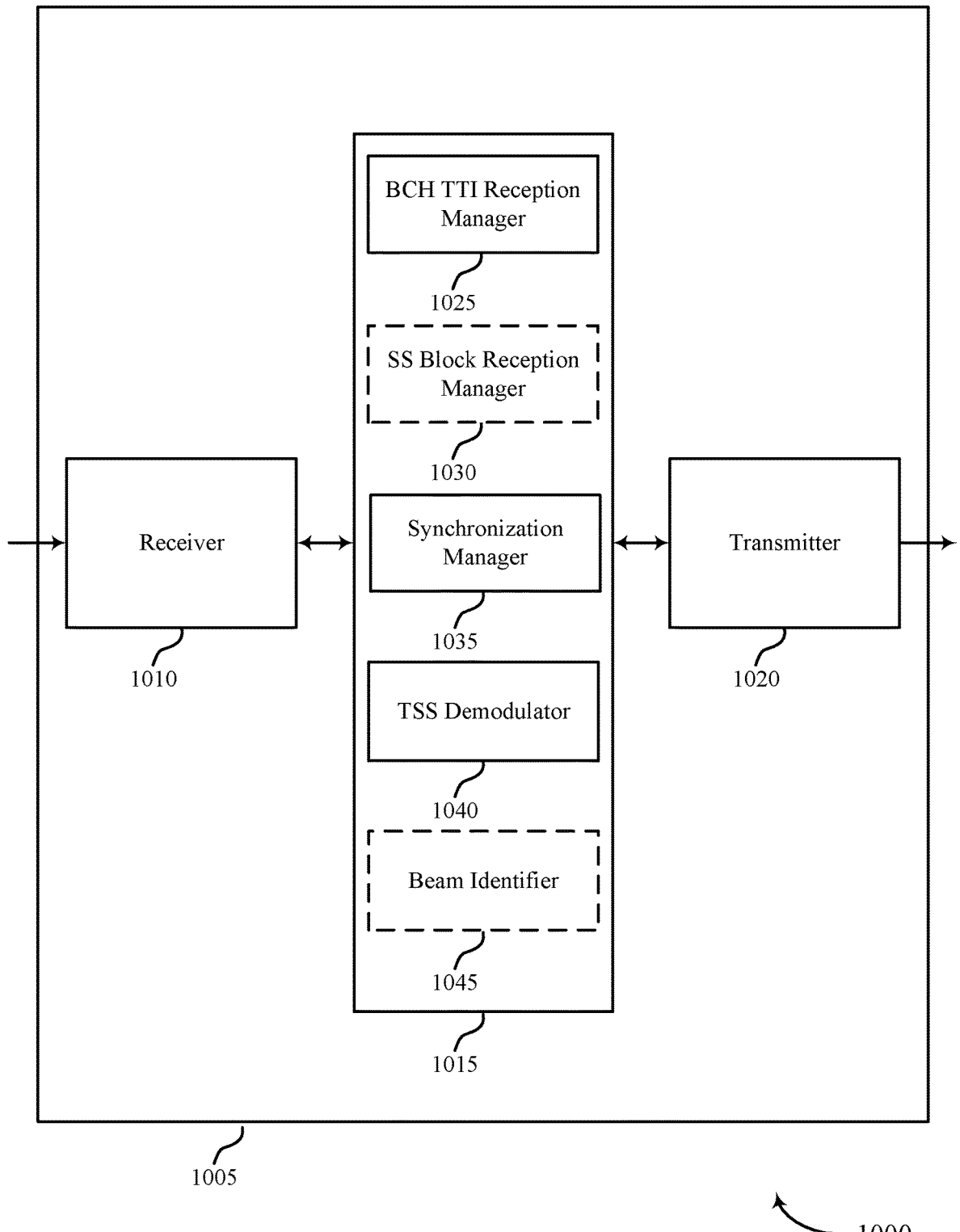

FIG. 10 shows a block diagram 1000 of a wireless device 1005 that supports communication of an SS block index in a timing synchronization signal in accordance with aspects of the present disclosure. Wireless device 1005 may be an example of aspects of a wireless device 805 or a UE as described with reference to FIG. 8. Wireless device 1005 may include receiver 1010, UE wireless communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to timing synchronization, for example. Information may be passed on to other components of the device. The receiver 1010 may be an example of aspects of the transceiver 1830 described with reference to FIG. 18. The receiver 1010 may utilize a single antenna or a set of antennas.

Transmitter 1020 may transmit signals generated by other components of the device. In some examples, the transmitter 1020 may be collocated with a receiver 910 in a transceiver module. For example, the transmitter 1020 may be an example of aspects of the transceiver 1835 described with reference to FIG. 18. The transmitter 1020 may utilize a single antenna or a set of antennas.

The UE wireless communication manager 1015 may be an example of aspects of the UE wireless communication manager described with reference to FIG. 8. The UE wireless communication manager 1015 may include a BCH TTI reception manager 1025, an optional SS block reception manager 1030, a synchronization manager 1035, a TSS demodulator 1040, an optional beam identifier 1045, and an optional PBCH demodulator 1050. Each of these components may communicate, directly or indirectly, with one another (e.g., via one or more buses).

The BCH TTI reception manager 1025 or SS block reception manager 1030 may be used to receive a SS block that includes a TSS, a PSS, and a SSS, as described for example with reference to FIGS. 2-4 and 6. The TSS may be based at least in part on a SS block index associated with the SS block. In some examples, the TSS may be based at least in part on the SS block index because the SS block index is encoded in a waveform signature of the TSS, or because the SS block index is included in at least one modulation symbol in the TSS. The SS block index may indicate the timing of the TSS within a BCH TTI, and may thus indicate the timing of the SS block within the BCH TTI. In some examples, the SSS may be based at least in part on a PCI of the base station. In some examples, the SS block may be one SS block in a plurality of SS blocks within the BCH TTI.

The synchronization manager 1035 may be used to determine, based at least in part on the SS block index, a timing of the SS block within the BCH TTI, as described for example with reference to FIGS. 2-4 and 6.

The TSS demodulator 1040 may be used to demodulate the TSS based at least in part on the SSS, as described herein and for example with reference to FIGS. 2-4 and 6. For example, the SSS may be transmitted as a DMRS for the TSS. The TSS demodulator 1040 may determine a signal to noise ratio (SNR) and/or a signal to noise plus interference ratio (SINR) for the SSS transmitted via a wireless channel, and use the determined SNR and/or SINR for demodulating the TSS. In another example, the TSS demodulator 1040 may use the SSS to generate a channel estimate (e.g., estimate of a phase shift caused to the SSS by transmission via a wireless channel), and use the channel estimate for demodulating the TSS.

The beam identifier 1045 may be used to identify, based at least in part on the SS block index, a beam on which the SS block is transmitted, as described for example with reference to FIGS. 2-4 and 6.

The PBCH demodulator 1050 may be used to demodulate a PBCH based at least in part on the SSS, when the SS block includes the PBCH, as described herein and for example with reference to FIGS. 2-4 and 6.

When the SS block includes a PBCH, and in some examples, the BCH TTI reception manager 1025 or SS block reception manager 1030 may be used to receive the PBCH based at least in part on the SS block index, and the UE wireless communication manager 1015 may decode the PBCH, based at least in part on the SS block index.

Figure 11:
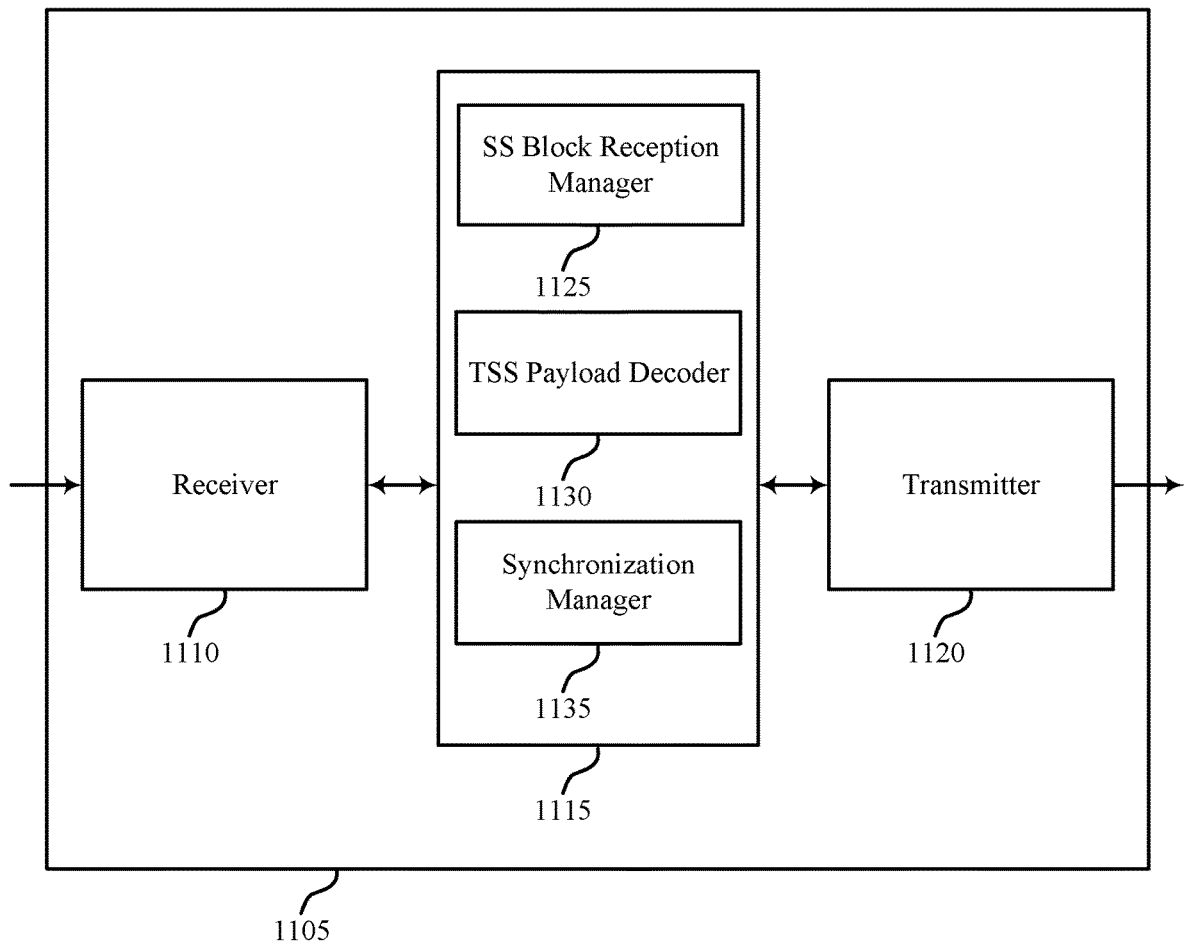

FIG. 11 shows a block diagram 1100 of a wireless device 1105 that supports communication of an SS block index in a timing synchronization signal in accordance with aspects of the present disclosure. Wireless device 1105 may be an example of aspects of a wireless device 805 or a UE as described with reference to FIG. 8. Wireless device 1105 may include receiver 1110, UE wireless communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to timing synchronization, for example. Information may be passed on to other components of the device. The receiver 1110 may be an example of aspects of the transceiver 1830 described with reference to FIG. 18. The receiver 1110 may utilize a single antenna or a set of antennas.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1835 described with reference to FIG. 18. The transmitter 1120 may utilize a single antenna or a set of antennas.

The UE wireless communication manager 1115 may be an example of aspects of the UE wireless communication manager described with reference to FIG. 8. The UE wireless communication manager 1115 may include a SS block reception manager 1125, a TSS payload decoder 1130, and a synchronization manager 1135. Each of these components may communicate, directly or indirectly, with one another (e.g., via one or more buses).

The SS block reception manager 1125 may be used to receive a SS block that includes a TSS, as described for example with reference to FIGS. 2-7. The TSS may include at least one modulation symbol. In some examples, the at least one modulation symbol may include a QPSK symbol or a BPSK symbol. In some examples, the SS block may also include a PSS, a SSS, and/or a PBCH. In some examples, the SSS may be based at least in part on a PCI of the base station. In some examples, the SS block may be one SS block in a plurality of SS blocks within a BCH TTI.

The TSS payload decoder 1130 may be used to decode a SS block index encoded in the at least one modulation symbol, as described for example with reference to FIGS. 2-7. The SS block index may indicate the timing of the TSS within a BCH TTI, and may thus indicate the timing of the SS block within the BCH TTI. In some examples, the SS block index may be encoded in the at least one modulation symbol using a polar code, or a Reed-Mueller code, or a Golay code, or a TBCC. The TSS payload decoder 1130 may also be used to decode, from the at least one modulation symbol, at least one parameter of a beam sweep configuration used to receive a plurality of SS blocks, including the SS block, within the BCH TTI, as described for example with reference to FIGS. 2-7. In some examples, the at least one parameter of the beam sweep configuration may include a number of beams in a SS block burst-set, or a periodicity of the SS block burst-set, or a combination thereof.

The synchronization manager 1135 may be used to identify, based at least in part on the SS block index, a timing of the SS block within a BCH TTI, as described for example with reference to FIGS. 2-7.

Figure 12:
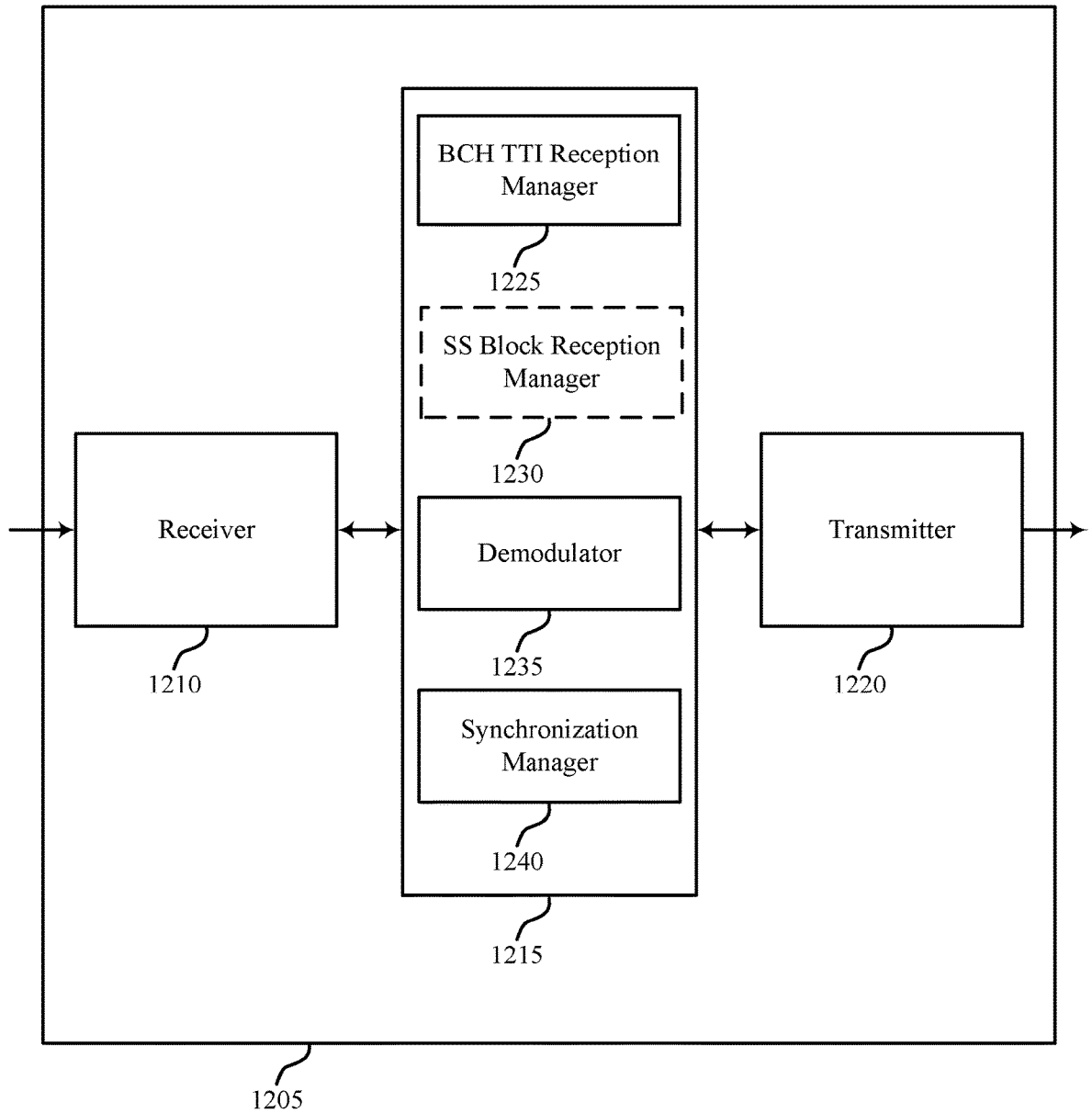

FIG. 12 shows a block diagram 1200 of a wireless device 1205 that supports communication of an SS block index in a timing synchronization signal in accordance with aspects of the present disclosure. Wireless device 1205 may be an example of aspects of a wireless device 805 or a UE as described with reference to FIG. 8. Wireless device 1205 may include receiver 1210, UE wireless communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to timing synchronization, for example. Information may be passed on to other components of the device. The receiver 1210 may be an example of aspects of the transceiver 1830 described with reference to FIG. 18. The receiver 1210 may utilize a single antenna or a set of antennas.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1835 described with reference to FIG. 18. The transmitter 1220 may utilize a single antenna or a set of antennas.

The UE wireless communication manager 1215 may be an example of aspects of the UE wireless communication manager described with reference to FIG. 8. The UE wireless communication manager 1215 may include a BCH TTI reception manager 1225, an optional SS block reception manager 1230, a demodulator 1235, and a synchronization manager 1240. Each of these components may communicate, directly or indirectly, with one another (e.g., via one or more buses).

The BCH TTI reception manager 1225 or SS block reception manager 1230 may be used to receive a SS block that includes a TSS and a PBCH, as described for example with reference to FIGS. 2-4 and 6. The TSS may be based at least in part on a SS block index associated with the SS block. In some examples, the TSS may be based at least in part on the SS block index because the SS block index is encoded in a waveform signature of the TSS, or because the SS block index is included in at least one modulation symbol in the TSS. The SS block index may indicate the timing of the TSS within a BCH TTI, and may thus indicate the timing of the SS block within the BCH TTI. In some examples, the SS block may further include a PSS and a SSS. In some examples, the SSS may be based at least in part on a PCI of the base station. In some examples, the SS block may be one SS block in a plurality of SS blocks within the BCH TTI.

The demodulator 1235 may be used to demodulate the TSS and the PBCH based at least in part on a same DMRS, as described herein and for example with reference to FIGS. 2-4 and 6. In some examples, the DMRS may be a SSS included in the SS block.

The synchronization manager 1240 may be used to identify, based at least in part on the SS block index, a timing of the SS block within a BCH TTI, as described for example with reference to FIGS. 2-4 and 6.

Figure 13:
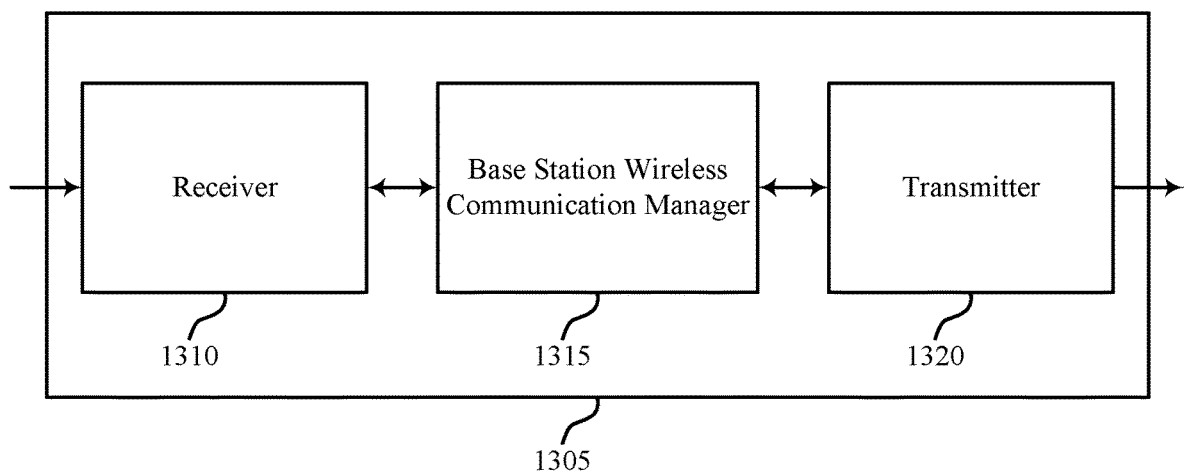
FIG. 13 shows a block diagram of an apparatus for use in wireless communication, in accordance with various aspects of the present disclosure.

FIG. 13 shows a block diagram 1300 of an apparatus 1305 that supports communication of an SS block index in a timing synchronization signal in accordance with aspects of the present disclosure. The apparatus 1305 may be an example of aspects of one or more of the base stations described with reference to FIGS. 1 and 3. The apparatus 1305 may include a receiver 1310, a base station wireless communication manager 1315, and a transmitter 1320. The apparatus 1305 may also include a processor. Each of these components may be in communication with one another (e.g., via one or more buses).

The receiver 1310 may receive data or control signals or information (i.e., transmissions), some or all of which may be associated with various information channels (e.g., data channels, control channels, etc.). Received signals or information, or measurements performed thereon, may be passed to other components of the apparatus 1305. The receiver 1310 may include one or a plurality of antennas.

The transmitter 1320 may transmit data or control signals or information (i.e., transmissions) generated by other components of the apparatus 1305, some or all of which may be associated with various information channels (e.g., data channels, control channels, etc.). In some examples, the transmitter 1320 may be collocated with the receiver 1310 in a transceiver. For example, the transmitter 1320 and receiver 1310 may be an example of aspects of the transceiver(s) 1950 described with reference to FIG. 19. The transmitter 1320 may include one or a plurality of antennas, which may be separate from (or shared with) the one or more antennas used by the receiver 1310.

The base station wireless communication manager 1315 and/or at least some of its various sub-components may be implemented in hardware, software executed by a processor, firmware, or any combination thereof. If implemented in software executed by a processor, the functions of the base station wireless communication manager 1315 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station wireless communication manager 1315 and/or at least some of its various sub-components may be physically located at various positions, including being distributed such that portions of functions are implemented at different physical locations by one or more physical devices. In some examples, the base station wireless communication manager 1315 and/or at least some of its various sub-components may be a separate and distinct component in accordance with various aspects of the present disclosure. In other examples, the base station wireless communication manager 1315 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The base station wireless communication manager 1315 may be used to transmit one or more of the SS blocks described with reference to FIGS. 2 and 4-7. A SS block may include a TSS based at least in part on a SS block index associated with the SS block. In some examples, the base station wireless communication manager 1315 may be used to transmit a TSS that is outside of a SS block and based at least in part on a timing of the TSS within a BCH TTI.

Figure 14:
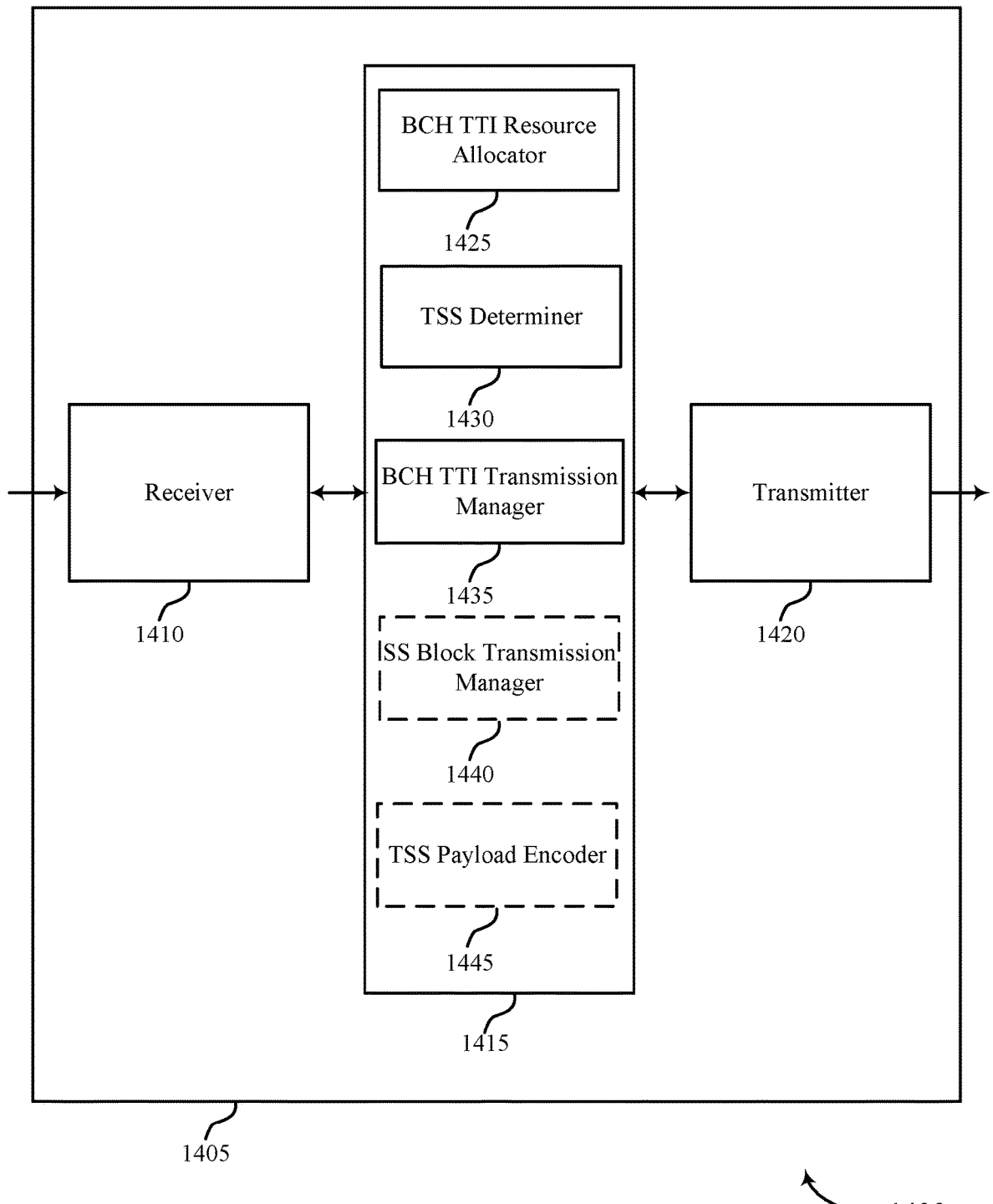
FIGS. 14-17 show block diagrams of apparatus for use in wireless communication, including various base station wireless communication managers, in accordance with various aspects of the present disclosure.

FIG. 14 shows a block diagram 1400 of an apparatus 1405 that supports communication of an SS block index in a timing synchronization signal in accordance with aspects of the present disclosure. The apparatus 1305 may be an example of aspects of one or more of the base stations described with reference to FIGS. 1 and 3. The apparatus 1405 may include a receiver 1410, a base station wireless communication manager 1415, and a transmitter 1420. The apparatus 1405 may also include a processor. Each of these components may be in communication with one another (e.g., via one or more buses).

The receiver 1410 may receive data or control signals or information (i.e., transmissions), some or all of which may be associated with various information channels (e.g., data channels, control channels, etc.). Received signals or information, or measurements performed thereon, may be passed to other components of the apparatus 1405. The receiver 1410 may include one or a plurality of antennas.

The transmitter 1420 may transmit data or control signals or information (i.e., transmissions) generated by other components of the apparatus 1405, some or all of which may be associated with various information channels (e.g., data channels, control channels, etc.). In some examples, the transmitter 1420 may be collocated with the receiver 1410 in a transceiver. For example, the transmitter 1420 and receiver 1410 may be an example of aspects of the transceiver(s) 1950 described with reference to FIG. 19. The transmitter 1420 may include one or a plurality of antennas, which may be separate from (or shared with) the one or more antennas used by the receiver 1410.

The base station wireless communication manager 1415 may be an example of aspects of the base station wireless communication manager described with reference to FIG. 13. The base station wireless communication manager 1415 may include a BCH TTI resource allocator 1425, a TSS determiner 1430, a BCH TTI transmission manager 1435, and an optional SS block transmission manager 1440. Each of these components may communicate, directly or indirectly, with one another (e.g., via one or more buses).

In a first example of the base station wireless communication manager 1415, the BCH TTI resource allocator 1425 may be used to allocate resources for a TSS and a PBCH within a BCH TTI, as described for example with reference to FIGS. 2-7. The TSS determiner 1430 may be used to determine the TSS based at least in part on a timing of the TSS within the BCH TTI, as described for example with reference to FIGS. 2-7. The BCH TTI transmission manager 1435 may be used to transmit, on the resources allocated for the TSS and the PBCH, the TSS and the PBCH, as described for example with reference to FIGS. 2-7. The TSS may be transmitted as a DMRS for the PBCH on at least one port used to transmit the TSS and the PBCH.

In a second example of the base station wireless communication manager 1415, the BCH TTI resource allocator 1425 may be used to allocate resources for a SS block within a BCH TTI, as described for example with reference to FIGS. 2-7. The SS block may include a TSS and a PBCH, and thus, resources may be allocated for the TSS and the PBCH in the SS block. In some examples, the SS block may also include a PSS and a SSS, and resources may be allocated for the PSS and the SSS in the SS block. The SSS may be determined based at least in part on a PCI of the base station. In some examples, the SS block may be one SS block in a plurality of SS blocks transmitted (e.g., by the base station) within the BCH TTI.

Also in the second example of the base station wireless communication manager 1415, the TSS determiner 1430 may be used to determine the TSS based at least in part on a timing of the TSS within the BCH TTI, as described for example with reference to FIGS. 2-7. The timing of the TSS may be based at least in part on a SS block index associated with the SS block. The SS block index may indicate the timing of the TSS within the BCH TTI, and thus, the TSS may be determined based at least in part on the SS block index. In some examples, the TSS may be determined based at least in part on the SS block index by encoding the SS block index in a waveform signature of the TSS, or by including the SS block index in at least one modulation symbol in the TSS. In some examples, the SS block index may further identify a beam on which the SS block is transmitted.

In some examples, the TSS payload encoder 1445 may be used to encode a SS block index in at least one modulation symbol, as described for example with reference to FIGS. 2-7. In some examples, the at least one modulation symbol may include a QPSK symbol or a BPSK symbol.

Also in the second example of the base station wireless communication manager 1415, the BCH TTI transmission manager 1435 or SS block transmission manager 1440 may be used to transmit, on the resources allocated for the SS block, the TSS and the PBCH, as described for example with reference to FIGS. 2-7. The TSS may be transmitted as a DMRS for the PBCH on at least one port used to transmit the TSS and the PBCH. In some examples, the SSS may be transmitted as an additional DMRS for the PBCH, on at least one port used to transmit the SSS and the PBCH. In some examples, the PBCH may be transmitted based at least in part on the SS block index for the SS block.

In some examples, transmitting the TSS and the PBCH may include transmitting the TSS time division multiplexed with the PBCH on a same set of one or more frequency subcarriers. In some of these examples, the SS block may further include a PSS and a SSS, and transmitting the TSS, the SSS, and the PBCH may include transmitting the PBCH and the TSS after the SSS.

In some examples, transmitting the TSS and the PBCH may include transmitting the TSS on a first set of one or more frequency subcarriers that overlaps a second set of one or more frequency subcarriers on which the PBCH is transmitted. The first set of one or more frequency subcarriers may be different from the second set of one or more frequency subcarriers. In some examples, transmitting the TSS and the PBCH may further include transmitting the TSS frequency division multiplexed with at least a portion of the PBCH. In some examples, the SS block may further include a PSS and a SSS, and transmitting the SSS and the PBCH may include transmitting a second portion of the PBCH after the SSS.

In some examples, transmitting the TSS and the PBCH may include transmitting the TSS on a first set of one or more frequency subcarriers that is interleaved with a second set of one or more frequency subcarriers on which the PBCH is transmitted. In some of these examples, the SS block may further include a PSS and a SSS, and transmitting the TSS, the PSS, the SSS, and the PBCH may include transmitting the PSS and the SSS frequency division multiplexed with the interleaved TSS and PBCH.

Figure 15:
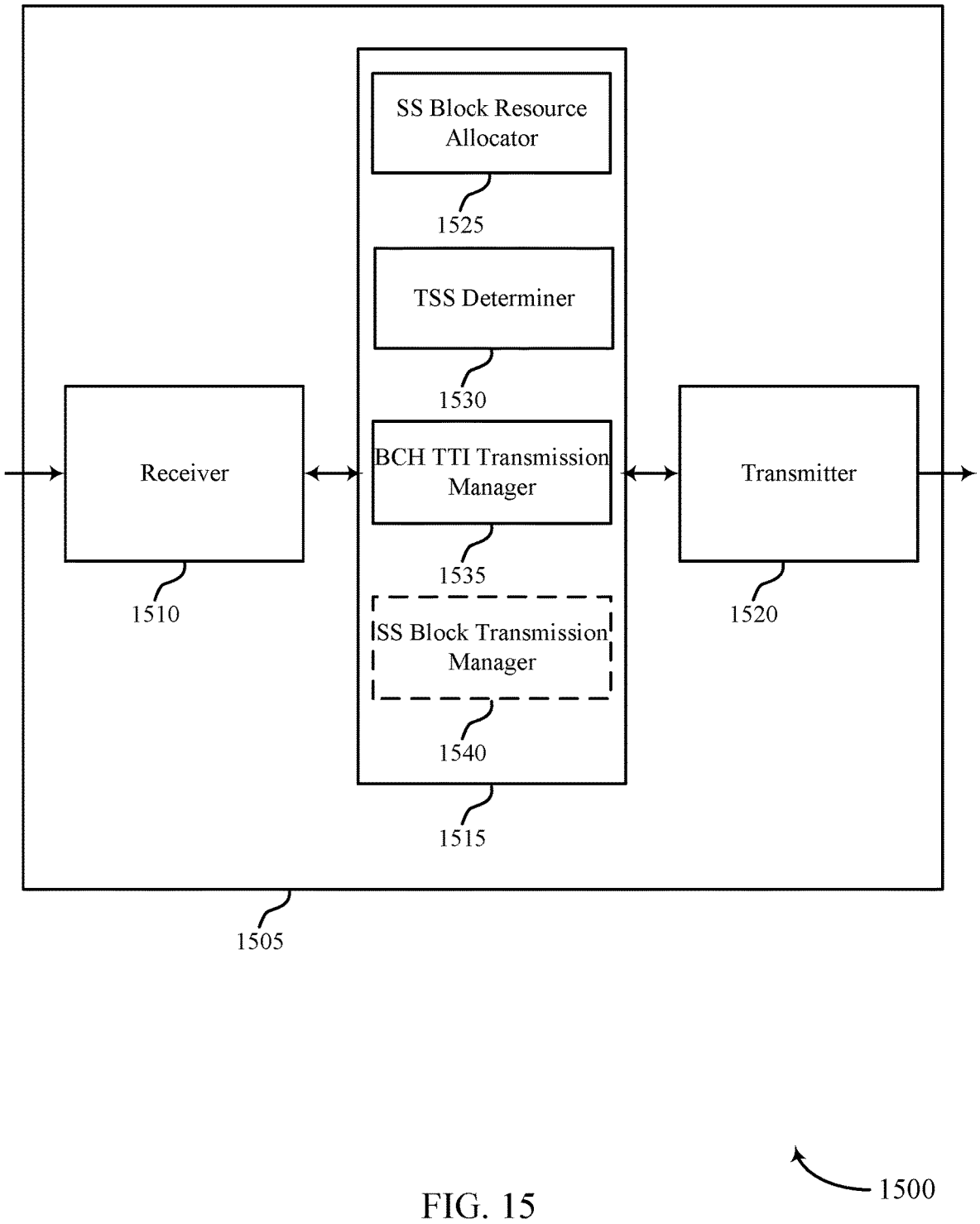

FIG. 15 shows a block diagram 1500 of an apparatus 1505 that supports communication of an SS block index in a timing synchronization signal in accordance with aspects of the present disclosure. The apparatus 1505 may be an example of aspects of one or more of the base stations described with reference to FIGS. 1 and 3. The apparatus 1505 may include a receiver 1510, a base station wireless communication manager 1515, and a transmitter 1520. The apparatus 1505 may also include a processor. Each of these components may be in communication with one another (e.g., via one or more buses).

The receiver 1510 may receive data or control signals or information (i.e., transmissions), some or all of which may be associated with various information channels (e.g., data channels, control channels, etc.). Received signals or information, or measurements performed thereon, may be passed to other components of the apparatus 1505. The receiver 1510 may include one or a plurality of antennas.

The transmitter 1520 may transmit data or control signals or information (i.e., transmissions) generated by other components of the apparatus 1505, some or all of which may be associated with various information channels (e.g., data channels, control channels, etc.). In some examples, the transmitter 1520 may be collocated with the receiver 1510 in a transceiver. For example, the transmitter 1520 and receiver 1510 may be an example of aspects of the transceiver(s) 1950 described with reference to FIG. 19. The transmitter 1520 may include one or a plurality of antennas, which may be separate from (or shared with) the one or more antennas used by the receiver 1510.

The base station wireless communication manager 1515 may be an example of aspects of the base station wireless communication manager described with reference to FIG. 13. The base station wireless communication manager 1515 may include a SS block resource allocator 1525, a TSS determiner 1530, a BCH TTI transmission manager 1535, an optional SS block transmission manager 1540. Each of these components may communicate, directly or indirectly, with one another (e.g., via one or more buses).

The SS block resource allocator 1525 may be used to allocate resources for a SS block, as described for example with reference to FIGS. 2-4 and 6. The SS block may include a TSS, a PSS, and a SSS, and thus, resources may be allocated for the TSS, the PSS, and the SSS in the SS block. The SSS may be determined based at least in part on a PCI of the base station. In some examples, the SS block may also include a PBCH, and resources may be allocated for the PBCH in the SS block. In some examples, the SS block may be one SS block in a plurality of SS blocks transmitted (e.g., by the base station) within a BCH TTI.

The TSS determiner 1530 may be used to determine the TSS based at least in part on a timing of the TSS within the BCH TTI, as described for example with reference to FIGS. 2-4 and 6. The timing of the TSS may be based at least in part on a SS block index associated with the SS block. The SS block index may indicate the timing of the TSS within the BCH TTI, and thus, the TSS may be determined based at least in part on the SS block index. In some examples, the TSS may be determined based at least in part on the SS block index by encoding the SS block index in a waveform signature of the TSS, or by including the SS block index in at least one modulation symbol in the TSS. In some examples, the SS block index may further identify a beam on which the SS block is transmitted.

The BCH TTI transmission manager 1535 or SS block transmission manager 1540 may be used to transmit, on the resources allocated for the SS block, the TSS the PSS, and the SSS, as described for example with reference to FIGS. 2-4 and 6. The SSS may be transmitted as a DMRS for the TSS on at least one port used to transmit the TSS and the SSS. When the SS block includes a PBCH, the SSS may also be transmitted as a DMRS for the PBCH, on at least one port used to transmit the SSS and the PBCH. In some examples, the PBCH may be transmitted based at least in part on the SS block index for the SS block.

When the SS block includes a PBCH, and in some examples, the BCH TTI transmission manager 1535 or SS block transmission manager 1540 may be used to transmit the TSS time division multiplexed with the PBCH on a same set of one or more frequency subcarriers. In some of these examples, transmitting the TSS, the SSS, and the PBCH may include transmitting the PBCH and the TSS after the SSS.

Figure 16:
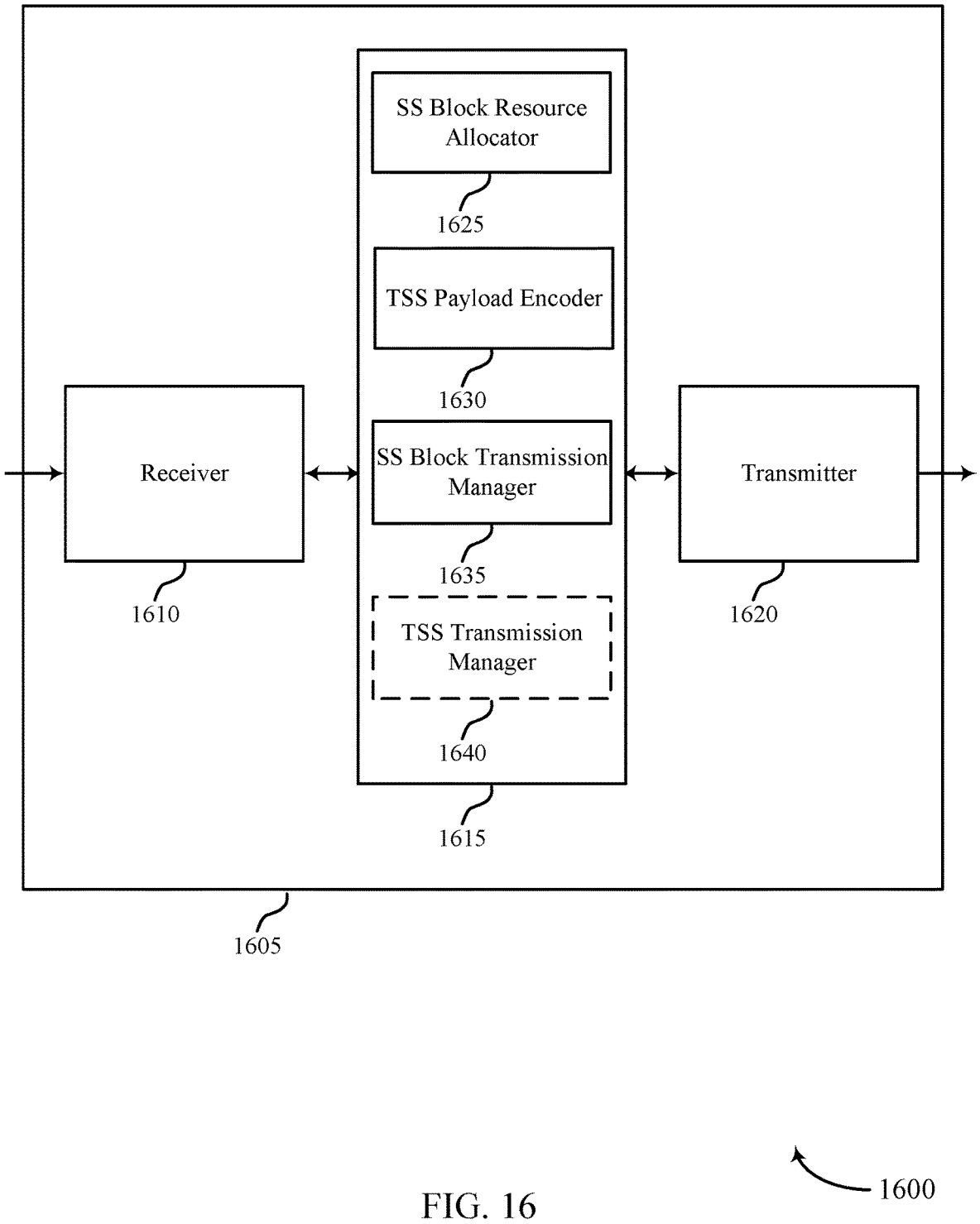

FIG. 16 shows a block diagram 1600 of an apparatus 1605 that supports communication of an SS block index in a timing synchronization signal in accordance with aspects of the present disclosure. The apparatus 1605 may be an example of aspects of one or more of the base stations described with reference to FIGS. 1 and 3. The apparatus 1605 may include a receiver 1610, a base station wireless communication manager 1615, and a transmitter 1620. The apparatus 1605 may also include a processor. Each of these components may be in communication with one another (e.g., via one or more buses).

The receiver 1610 may receive data or control signals or information (i.e., transmissions), some or all of which may be associated with various information channels (e.g., data channels, control channels, etc.). Received signals or information, or measurements performed thereon, may be passed to other components of the apparatus 1605. The receiver 1610 may include one or a plurality of antennas.

The transmitter 1620 may transmit data or control signals or information (i.e., transmissions) generated by other components of the apparatus 1605, some or all of which may be associated with various information channels (e.g., data channels, control channels, etc.). In some examples, the transmitter 1620 may be collocated with the receiver 1610 in a transceiver. For example, the transmitter 1620 and receiver 1610 may be an example of aspects of the transceiver(s) 1950 described with reference to FIG. 19. The transmitter 1620 may include one or a plurality of antennas, which may be separate from (or shared with) the one or more antennas used by the receiver 1610.

The base station wireless communication manager 1615 may be an example of aspects of the base station wireless communication manager described with reference to FIG. 13. The base station wireless communication manager 1615 may include a SS block resource allocator 1625, a TSS payload encoder 1630, a SS block transmission manager 1635, or an optional TSS transmission manager 1640. Each of these components may communicate, directly or indirectly, with one another (e.g., via one or more buses).

The SS block resource allocator 1625 may be used to allocate resources for a SS block, as described for example with reference to FIGS. 2-7. The SS block may include a TSS, a PSS, a SSS, and/or a PBCH, and thus, resources may be allocated for the TSS, the PSS, the SSS, and/or the PBCH in the SS block. The SSS may be determined based at least in part on a PCI of the base station. In some examples, the SS block may be one SS block in a plurality of SS blocks transmitted (e.g., by the base station) within a BCH TTI.

The TSS payload encoder 1630 may be used to encode a SS block index in at least one modulation symbol, as described for example with reference to FIGS. 2-7. In some examples, the at least one modulation symbol may include a QPSK symbol or a BPSK symbol. The SS block index may indicate a timing of the TSS within a BCH TTI, and may thus indicate the timing of the SS block within the BCH TTI. In some examples, the SS block index may be encoded in the at least one modulation symbol using a polar code, or a Reed-Mueller code, or a Golay code, or a TBCC. The TSS payload encoder 1630 may also be used to encode, in the at least one modulation symbol, at least one parameter of a beam sweep configuration used to transmit a plurality of SS blocks, including the SS block, within the BCH TTI, as described for example with reference to FIGS. 2-7. In some examples, the at least one parameter of the beam sweep configuration may include a number of beams in a SS block burst-set, or a periodicity of the SS block burst-set, or a combination thereof.

The SS bock transmission manager 1635 or TSS transmission manager 1640 may be used to transmit, on the resources allocated for the SS block, a TSS that includes the at least one modulation symbol, as described for example with reference to FIGS. 2-7.

In some examples, the base station wireless communication manager 1615 may be used to generate a CRC for the SS block index, and to encode the CRC in the at least one modulation symbol, along with the SS block index.

Figure 17:
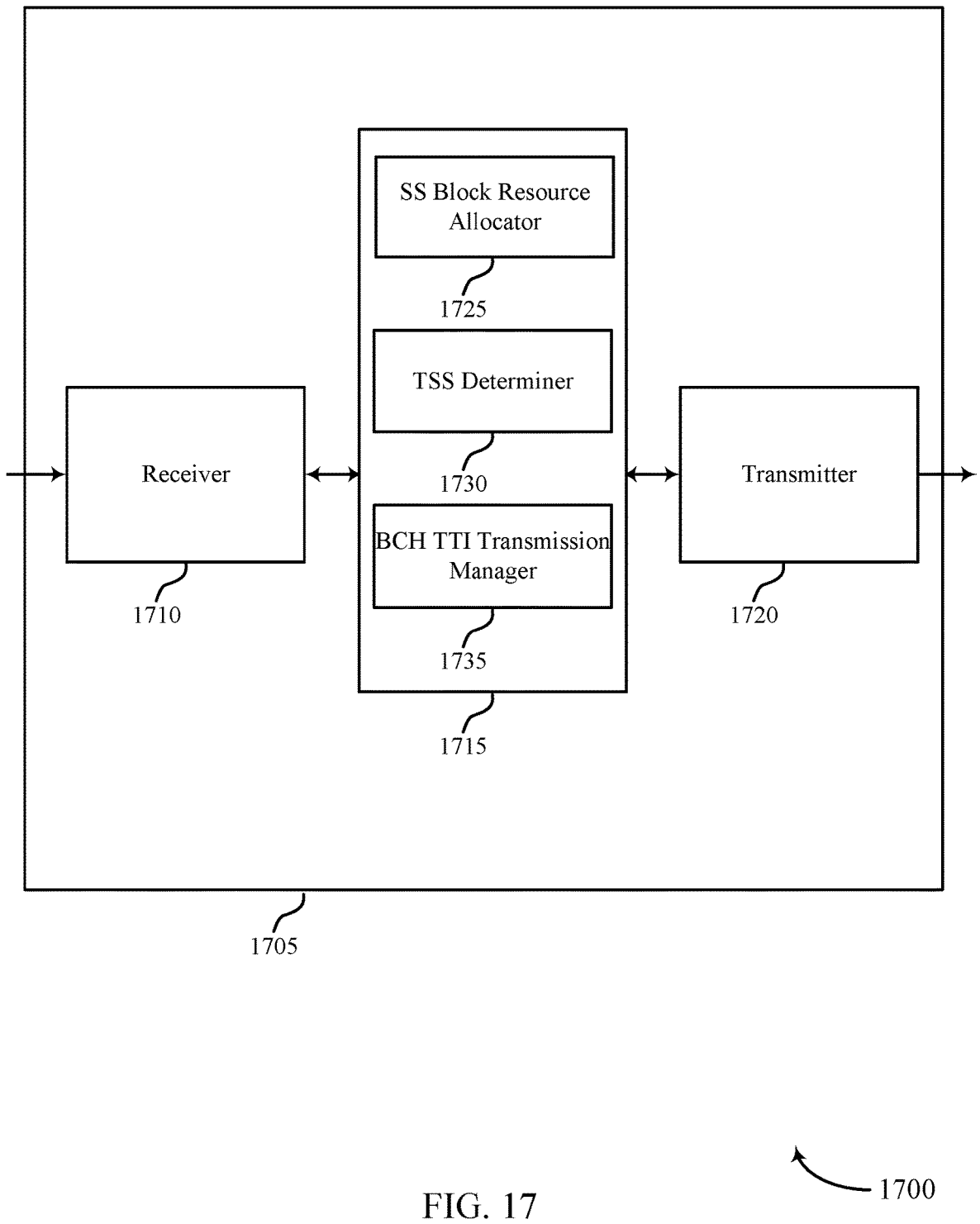

FIG. 17 shows a block diagram 1700 of an apparatus 1705 that supports communication of an SS block index in a timing synchronization signal in accordance with aspects of the present disclosure. The apparatus 1705 may be an example of aspects of one or more of the base stations described with reference to FIGS. 1 and 3. The apparatus 1705 may include a receiver 1710, a base station wireless communication manager 1715, and a transmitter 1720. The apparatus 1705 may also include a processor. Each of these components may be in communication with one another (e.g., via one or more buses).

The receiver 1710 may receive data or control signals or information (i.e., transmissions), some or all of which may be associated with various information channels (e.g., data channels, control channels, etc.). Received signals or information, or measurements performed thereon, may be passed to other components of the apparatus 1705. The receiver 1710 may include one or a plurality of antennas.

The transmitter 1720 may transmit data or control signals or information (i.e., transmissions) generated by other components of the apparatus 1705, some or all of which may be associated with various information channels (e.g., data channels, control channels, etc.). In some examples, the transmitter 1720 may be collocated with the receiver 1710 in a transceiver. For example, the transmitter 1720 and receiver 1710 may be an example of aspects of the transceiver(s) 1950 described with reference to FIG. 19. The transmitter

1720 may include one or a plurality of antennas, which may be separate from (or shared with) the one or more antennas used by the receiver 1710.

The base station wireless communication manager 1715 may be an example of aspects of the base station wireless communication manager described with reference to FIG. 13. The base station wireless communication manager 1715 may include a SS block resource allocator 1725, a TSS determiner 1730, and a BCH TTI transmission manager 1735. Each of these components may communicate, directly or indirectly, with one another (e.g., via one or more buses).

The SS block resource allocator 1725 may be used to allocate resources for a SS block, as described for example with reference to FIGS. 2-4 and 6. The SS block may include a TSS and a PBCH, and thus, resources may be allocated for the TSS and the PBCH in the SS block. The SS block may also include a PSS and a SSS, and resources in the SS block may be allocated for the PSS and the SSS. The SSS may be determined based at least in part on a PCI of the base station. In some examples, the SS block may be one SS block in a plurality of SS blocks transmitted (e.g., by the base station) within a BCH TTI.

The TSS determiner 1730 may be used to determine a TSS based at least in part on a SS block index associated with the SS block, as described for example with reference to FIGS. 2-4 and 6. The SS block index may indicate a timing of the SS block within a BCH TTI.

The BCH TTI transmission manager 1735 may be used to transmit, on the resources allocated for the SS block, the TSS and the PBCH, as described for example with reference to FIGS. 2-4 and 6. The transmitted SS block may include a same DMRS for the TSS and the PBCH on at least one port used to transmit the DMRS, the TSS, and the PBCH. In some examples, the DMRS may include a SSS in the SS block.

Figure 18:
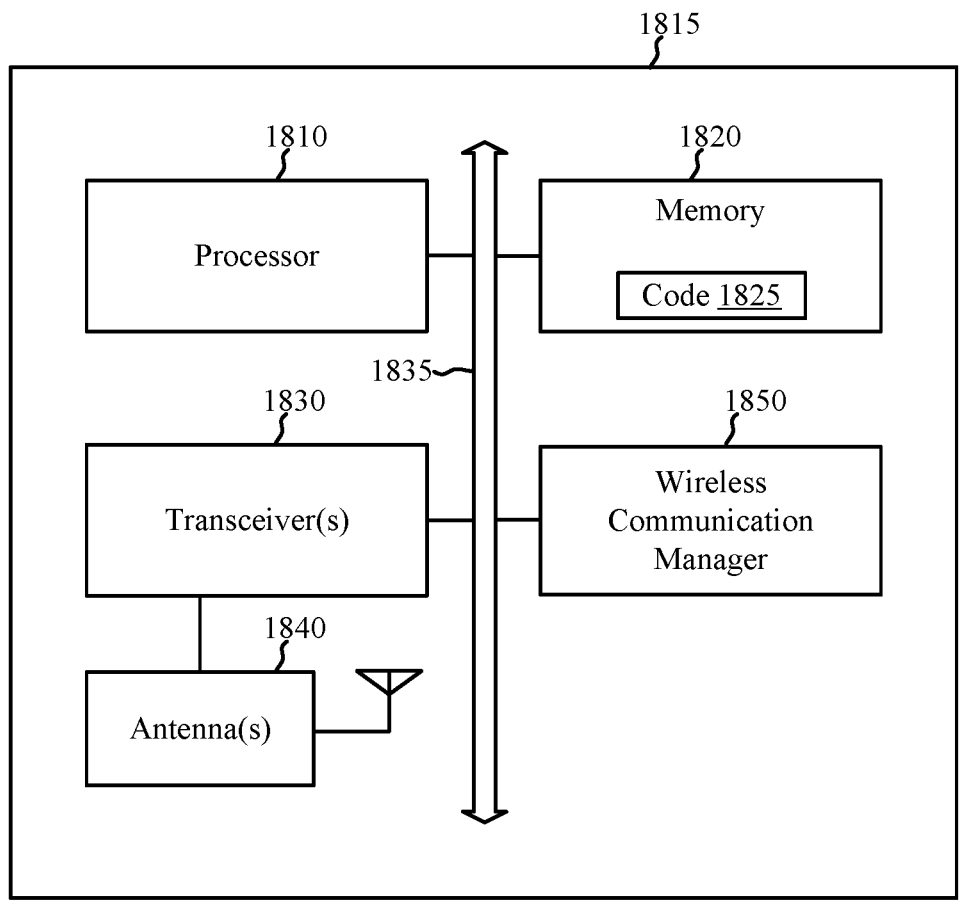
FIG. 18 shows a block diagram of a UE for use in wireless communication, in accordance with various aspects of the present disclosure.

FIG. 18 shows a block diagram 1800 of a UE 1815 for use in wireless communication, in accordance with various aspects of the present disclosure. The UE 1815 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1815 may, in some examples, have an internal power supply (not shown), such as a small battery, to facilitate mobile operation. In some examples, the UE 1815 may be an example of aspects of one or more of the UEs described with reference to FIGS. 1 and 3, or aspects of the apparatus described with reference to FIG. 8. The UE 1815 may be configured to implement at least some of the UE or apparatus techniques or functions described with reference to FIGS. 1-12.

The UE 1815 may include a processor 1810, a memory 1820, at least one transceiver (represented by transceiver(s) 1830), antennas 1840 (e.g., an antenna array), or a UE wireless communication manager 1850. Each of these components may be in communication with each other, directly or indirectly, over one or more buses 1835.

The memory 1820 may include random access memory (RAM) or read-only memory (ROM). The memory 1820 may store computer-readable, computer-executable code 1825 containing instructions that are configured to, when executed, cause the processor 1810 to perform various functions described herein related to wireless communication, including, for example, receiving a TSS and/or SS blocks. Alternatively, the computer-executable code 1825 may not be directly executable by the processor 1810 but be configured to cause the UE 1815 (e.g., when compiled and executed) to perform various of the functions described herein.

The processor 1810 may include an intelligent hardware device, e.g., a central processing unit (CPU), a microcontroller, an ASIC, etc. The processor 1810 may process information received through the transceiver(s) 1830 or information to be sent to the transceiver(s) 1830 for transmission through the antennas 1840. The processor 1810 may handle, alone or in connection with the UE wireless communication manager 1850, one or more aspects of communicating over (or managing communications over) one or more radio frequency spectrum bands.

The transceiver(s) 1830 may include a modem configured to modulate packets and provide the modulated packets to the antennas 1840 for transmission, and to demodulate packets received from the antennas 1840. The transceiver(s) 1830 may, in some examples, be implemented as one or more transmitters and one or more separate receivers. The transceiver(s) 1830 may support communications in one or more radio frequency spectrum bands. The transceiver(s) 1830 may be configured to communicate bi-directionally, via the antennas 1840, with one or more base stations or apparatuses, such as one or more of the base stations described with reference to FIG. 1,3, or 13.

The UE wireless communication manager 1850 may be configured to perform or control some or all of the UE or apparatus techniques or functions described with reference to FIGS. 1-12. The UE wireless communication manager 1850, or portions of it, may include a processor, or some or all of the functions of the UE wireless communication manager 1850 may be performed by the processor 1810 or in connection with the processor 1810. In some examples, the UE wireless communication manager 1850 may be an example of aspects of one or more of the UE wireless communication managers described with reference to FIGS. 8-12.

Figure 19:
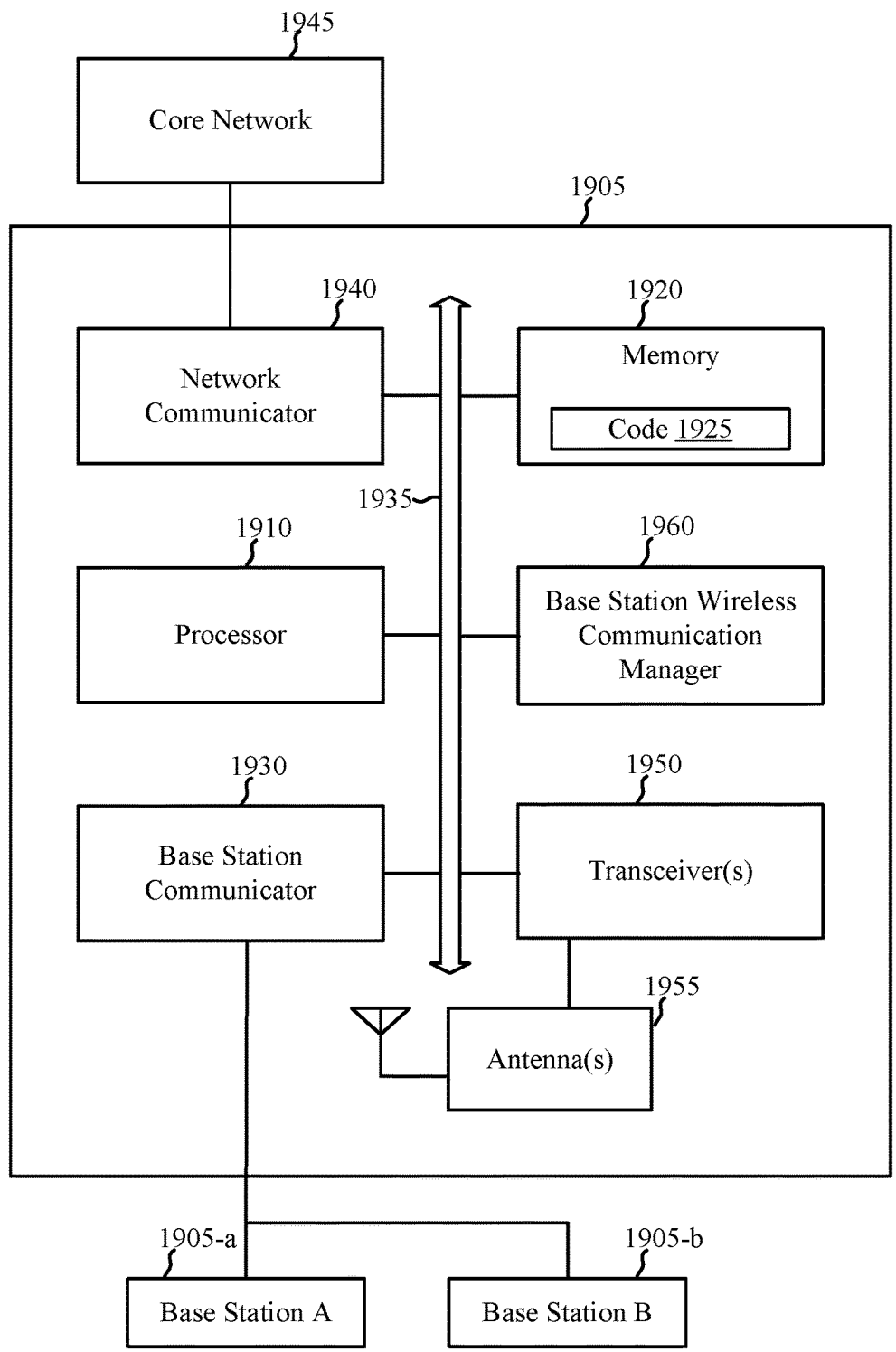
FIG. 19 shows a block diagram of a base station for use in wireless communication, in accordance with various aspects of the present disclosure.

FIG. 19 shows a block diagram 1900 of a base station 1905 for use in wireless communication, in accordance with various aspects of the present disclosure. In some examples, the base station 1905 may be an example of aspects of one or more of the base stations described with reference to FIGS. 1 and 3, or aspects of the apparatus described with reference to FIG. 13. The base station 1905 may be configured to implement or facilitate at least some of the base station or apparatus techniques or functions described with reference to FIGS. 1-7 and 13-17.

The base station 1905 may include a processor 1910, a memory 1920, at least one transceiver (represented by transceiver(s) 1950), at least one antenna 1955 (e.g., an antenna array), or a base station wireless communication manager 1960. The base station 1905 may also include one or more of a base station communicator 1930 or a network communicator 1940. Each of these components may be in communication with each other, directly or indirectly, over one or more buses 1935.

The memory 1920 may include RAM or ROM. The memory 1920 may store computer-readable, computer-executable code 1925 containing instructions that are configured to, when executed, cause the processor 1910 to perform various functions described herein related to wireless communication, including, for example, allocating resources for SS blocks and transmitting TSSs in the SS blocks. Alternatively, the computer-executable code 1925 may not be directly executable by the processor 1910 but be configured to cause the base station 1905 (e.g., when compiled and executed) to perform various of the functions described herein.

The processor 1910 may include an intelligent hardware device, e.g., a CPU, a microcontroller, an ASIC, etc. The processor 1910 may process information received through the transceiver(s) 1950, the base station communicator 1930, or the network communicator 1940. The processor 1910 may also process information to be sent to the transceiver(s) 1950 for transmission through the antennas 1955, or to the base station communicator 1930 for transmission to one or more other base stations (e.g., base station 1905-*a* and base station 1905-*b*), or to the network communicator 1940 for transmission to a core network 1945, which may be an example of one or more aspects of the core network 130 described with reference to FIG. 1. The processor 1910 may handle, alone or in connection with the base station wireless communication manager 1960, one or more aspects of communicating over (or managing communications over) one or more radio frequency spectrum bands.

The transceiver(s) 1950 may include a modem configured to modulate packets and provide the modulated packets to the antennas 1955 for transmission, and to demodulate packets received from the antennas 1955. The transceiver(s) 1950 may, in some examples, be implemented as one or more transmitters and one or more separate receivers. The transceiver(s) 1950 may support communications in one or more radio frequency spectrum bands. The transceiver(s) 1950 may be configured to communicate bi-directionally, via the antennas 1955, with one or more UEs or apparatuses, such as one or more of the UEs or apparatus described with reference to FIG. 1, 3, 8, or 18. The base station 1905 may communicate with the core network 1945 through the network communicator 1940. The base station 1905 may also communicate with other base stations, such as the base station 1905-*a* and the base station 1905-*b*, using the base station communicator 1930.

The base station wireless communication manager 1960 may be configured to perform or control some or all of the base station or apparatus techniques or functions described with reference to FIGS. 1-7 and 13-17. The base station wireless communication manager 1960, or portions of it, may include a processor, or some or all of the functions of the base station wireless communication manager 1960 may be performed by the processor 1910 or in connection with the processor 1910. In some examples, the base station wireless communication manager 1960 may be an example of aspects of one or more of the base station wireless communication managers described with reference to FIGS. 13-17.

Figure 20:
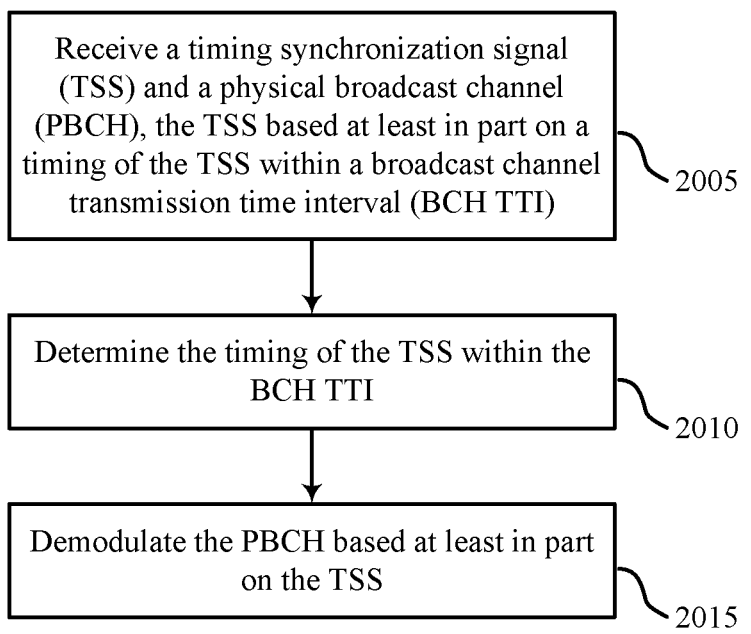
FIG. 20 is a flow chart illustrating an example of a method for wireless communication at a UE, in accordance with various aspects of the present disclosure.

FIG. 20 is a flow chart illustrating an example of a method 2000 for wireless communication at a UE, in accordance with various aspects of the present disclosure. For clarity, the method 2000 is described below with reference to aspects of one or more of the UEs described with reference to FIGS. 1,3, and 18, aspects of the apparatus described with reference to FIG. 8, or aspects of one or more of the UE wireless communication managers described with reference to FIGS. 8-12 and 18. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving a TSS and a PBCH, as described for example with reference to FIGS. 2-7. The TSS may be based at least in part on a timing of the TSS within a BCH TTI. In some examples, the operation(s) at block 2005 may be performed using the BCH TTI reception manager 925 described with reference to FIG. 9.

At block 2010, the method 2200 may include determining the timing of the TSS within the BCH TTI, as described for example with reference to FIGS. 2-7. In some examples, the operation(s) at block 2010 may be performed using the synchronization manager 930 described with reference to FIG. 9.

At block 2015, the method 2000 may include demodulating the PBCH based at least in part on the TSS, as described for example with reference to FIGS. 2-7. In some examples, the operation(s) at block 2015 may be performed using the PBCH demodulator 935 described with reference to FIG. 9.

Figure 21:
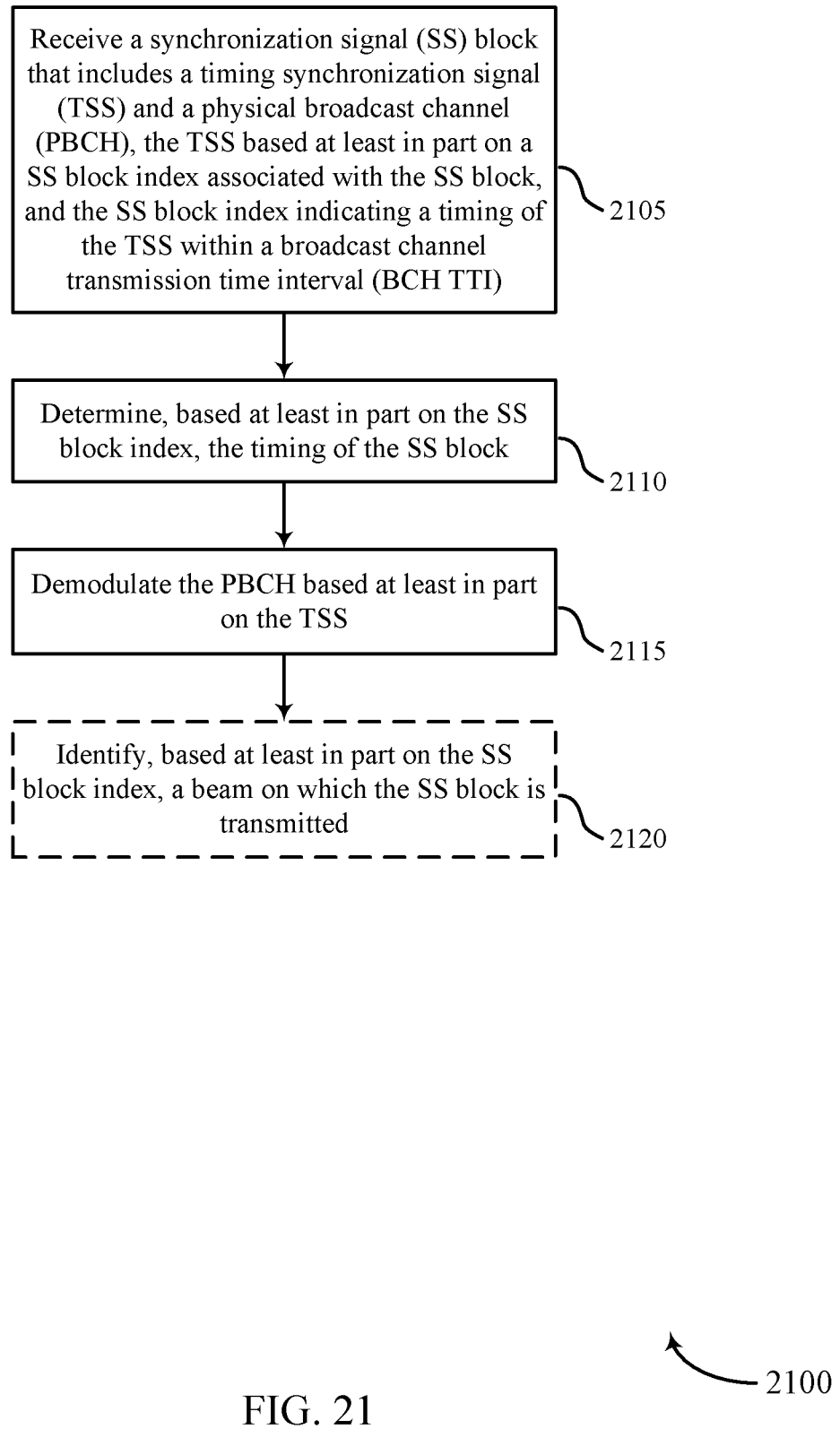
FIG. 21 is a flow chart illustrating an example of a method for wireless communication at a UE, in accordance with various aspects of the present disclosure.

FIG. 21 is a flow chart illustrating an example of a method 2100 for wireless communication at a UE, in accordance with various aspects of the present disclosure. For clarity, the method 2100 is described below with reference to aspects of one or more of the UEs described with reference to FIGS. 1,3, and 18, aspects of the apparatus described with reference to FIG. 8, or aspects of one or more of the UE wireless communication managers described with reference to FIGS. 8-12 and 18. In some examples, a UE may execute one or more sets of codes to control the functional elements of the UE to perform the functions described below. Additionally or alternatively, the UE may perform one or more of the functions described below using special-purpose hardware.

At block 2105, the method 2100 may include receiving a SS block that includes a TSS and a PBCH, as described for example with reference to FIGS. 2-7. The TSS may be based at least in part on a SS block index associated with the SS block. In some examples, the TSS may be based at least in part on the SS block index because the SS block index is encoded in a waveform signature of the TSS, or because the SS block index is included in at least one modulation symbol in the TSS. The SS block index may indicate the timing of the TSS within a BCH TTI, and may thus indicate the timing of the SS block within the BCH TTI. In some examples, the SS block may further include a PSS and a SSS. The SSS may be based at least in part on a PCI of the base station. In some examples, the SS block may be one SS block in a plurality of SS blocks within the BCH TTI. In some examples, the operation(s) at block 2105 may be performed using the BCH TTI reception manager 925 or SS block reception manager 940 described with reference to FIG. 9.

At block 2110, the method 2100 may include determining, based at least in part on the SS block index, the timing of the SS block, and thus the timing of the TSS, within the BCH TTI, as described for example with reference to FIGS. 2-7. In some examples, the operation(s) at block 2110 may be performed using the synchronization manager 930 described with reference to FIG. 9.

At block 2115, the method 2100 may include demodulating the PBCH based at least in part on the TSS, as described for example with reference to FIGS. 2-7. When the SS block includes a PSS and a SSS, the PBCH may be further demodulated based at least in part on the SSS. In some examples, the operation(s) at block 2115 may be performed using the PBCH demodulator 935 described with reference to FIG. 9.

At block 2120, the method 2100 may optionally include identifying, based at least in part on the SS block index, a beam on which the SS block is transmitted, as described for example with reference to FIGS. 2-7. In some examples, the operation(s) at block 2120 may be performed using the beam identifier 945 described with reference to FIG. 9.

In some examples of the method 2100, receiving the TSS and the PBCH may include receiving the TSS time division multiplexed with the PBCH on a same set of one or more frequency subcarriers. In some of these examples, the SS block may further include a PSS and a SSS, and receiving the TSS, the SSS, and the PBCH may include receiving the PBCH and the TSS after the SSS.

In some examples of the method 2100, receiving the TSS and the PBCH may include receiving the TSS on a first set of one or more frequency subcarriers that overlaps a second set of one or more frequency subcarriers on which the PBCH is received. The first set of one or more frequency subcarriers may be different from the second set of one or more frequency subcarriers. In some examples, receiving the TSS and the PBCH may further include receiving the TSS frequency division multiplexed with at least a portion of the PBCH. In some examples, the SS block may further include a PSS and a SSS, and receiving the SSS and the PBCH may include receiving a second portion of the PBCH after the SSS.

In some examples of the method 2100, receiving the TSS and the PBCH may include receiving the TSS on a first set of one or more frequency subcarriers that is interleaved with a second set of one or more frequency subcarriers on which the PBCH is received. In some of these examples, the SS block may further include a PSS and a SSS, and receiving the TSS, the PSS, the SSS, and the PBCH may include receiving the PSS and the SSS frequency division multiplexed with the interleaved TSS and PBCH.

In some examples of the method 2100, the PBCH may be received based at least in part on the SS block index, and the method 2100 may include decoding the PBCH, based at least in part on the SS block index.

Figure 22:
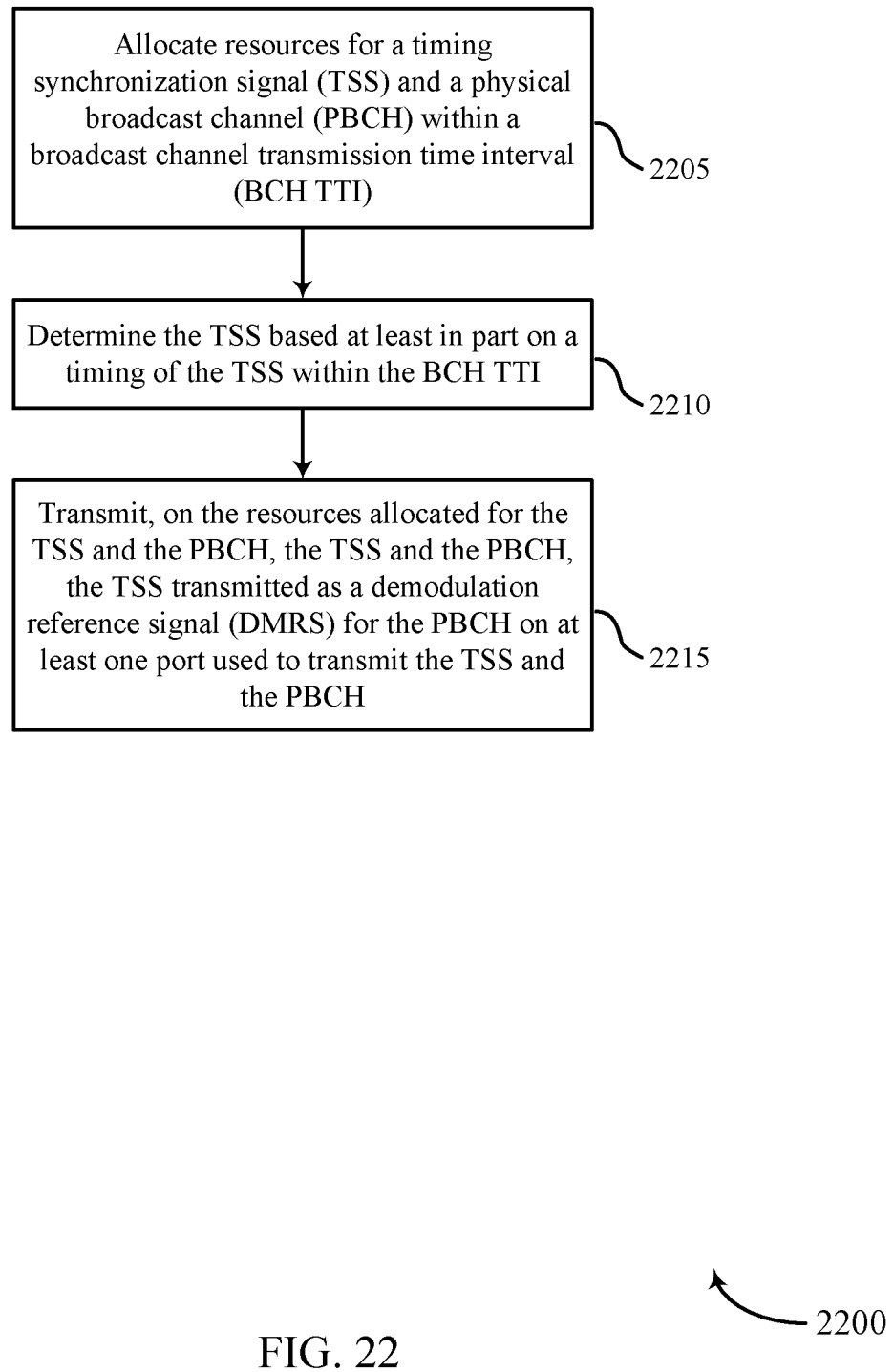
FIG. 22 is a flow chart illustrating an example of a method for wireless communication at a base station, in accordance with various aspects of the present disclosure.

FIG. 22 is a flow chart illustrating an example of a method 2200 for wireless communication at a base station, in accordance with various aspects of the present disclosure. For clarity, the method 2200 is described below with reference to aspects of one or more of the base stations described with reference to FIGS. 1, 3, and 19, aspects of the apparatus described with reference to FIG. 13, or aspects of one or more of the base station wireless communication managers described with reference to FIGS. 13-17 and 19. In some examples, a base station may execute one or more sets of codes to control the functional elements of the base station to perform the functions described below. Additionally or alternatively, the base station may perform one or more of the functions described below using special-purpose hardware.

At block 2205, the method 2200 may include allocating resources for a TSS and a PBCH within a BCH TTI, as described for example with reference to FIGS. 2-7. In some examples, the operation(s) at block 2205 may be performed using the BCH TTI resource allocator 1425 described with reference to FIG. 14.

At block 2210, the method 2200 may include determining the TSS based at least in part on a timing of the TSS within the BCH TTI, as described for example with reference to FIGS. 2-7. In some examples, the operation(s) at block 2205 may be performed using the TSS determiner 1430 described with reference to FIG. 14.

At block 2215, the method 2200 may include transmitting, on the resources allocated for the TSS and the PBCH, the TSS and the PBCH, as described for example with reference to FIGS. 2-7. The TSS may be transmitted as a DMRS for the PBCH on at least one port used to transmit the TSS and the PBCH. In some examples, the operation(s) at block 2215 may be performed using the BCH TTI transmission manager 1435 described with reference to FIG. 14.

Figure 23:
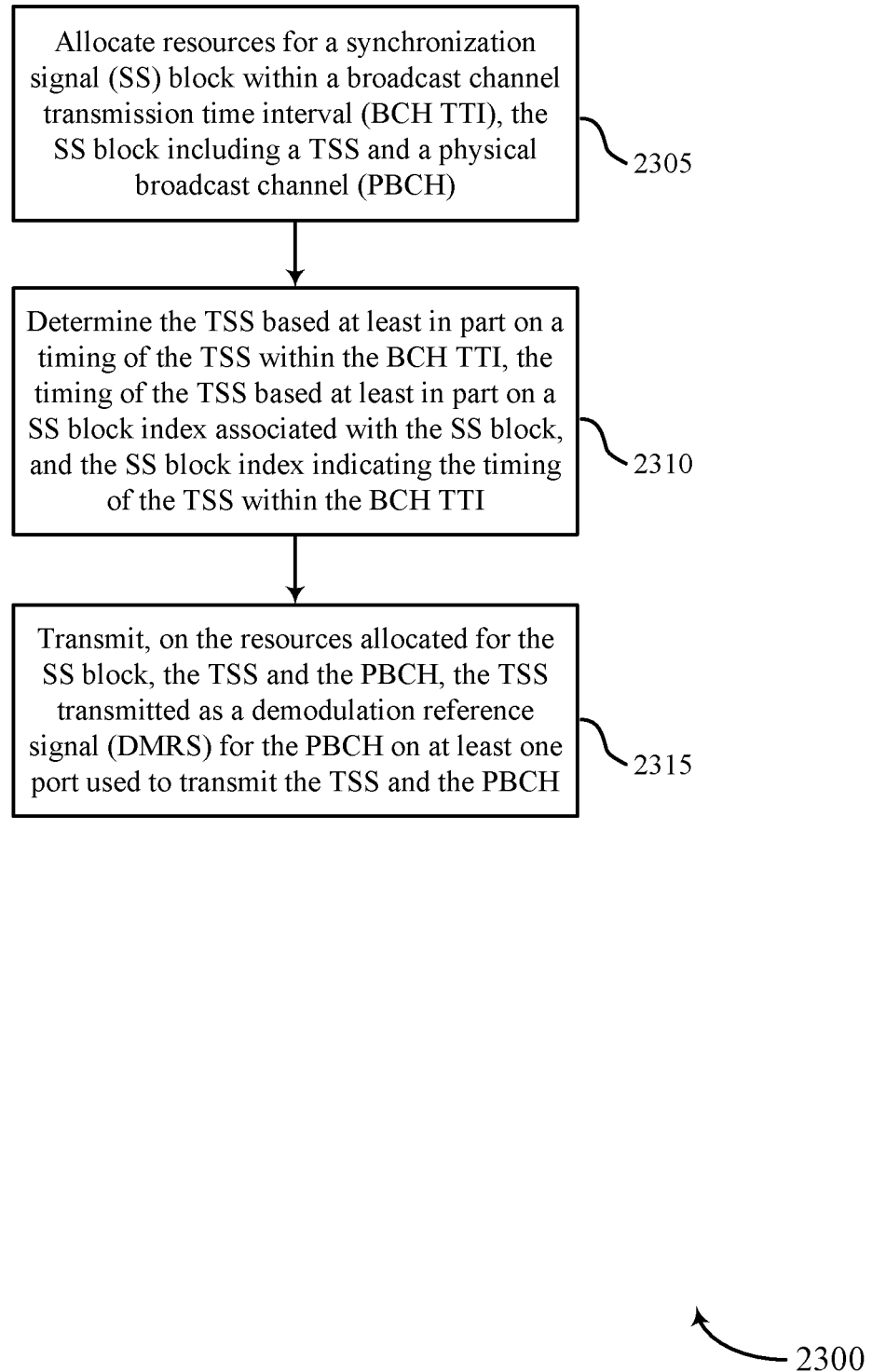
FIG. 23 is a flow chart illustrating an example of a method for wireless communication at a base station, in accordance with various aspects of the present disclosure.

FIG. 23 is a flow chart illustrating an example of a method 2300 for wireless communication at a base station, in accordance with various aspects of the present disclosure. For clarity, the method 2300 is described below with reference to aspects of one or more of the base stations described with reference to FIGS. 1, 3, and 19, aspects of the apparatus described with reference to FIG. 13, or aspects of one or more of the base station wireless communication managers described with reference to FIGS. 13-17 and 19. In some examples, a base station may execute one or more sets of codes to control the functional elements of the base station to perform the functions described below. Additionally or alternatively, the base station may perform one or more of the functions described below using special-purpose hardware.

At block 2305, the method 2300 may include allocating resources for a SS block within a BCH TTI, as described for example with reference to FIGS. 2-7. The SS block may include a TSS and a PBCH, and thus, resources may be allocated for the TSS and the PBCH in the SS block. In some examples, the SS block may also include a PSS and a SSS, and resources may be allocated for the PSS and the SSS in the SS block. The SSS may be determined based at least in part on a PCI of the base station. In some examples, the SS block may be one SS block in a plurality of SS blocks transmitted (e.g., by the base station) within the BCH TTI. In some examples, the operation(s) at block 2305 may be performed using the BCH TTI resource allocator 1425 described with reference to FIG. 14.

At block 2310, the method 2300 may include determining the TSS based at least in part on a timing of the TSS within the BCH TTI, as described for example with reference to FIGS. 2-7. The timing of the TSS may be based at least in part on a SS block index associated with the SS block. The SS block index may indicate the timing of the TSS within the BCH TTI, and thus, the TSS may be determined based at least in part on the SS block index. In some examples, the TSS may be determined based at least in part on the SS block index by encoding the SS block index in a waveform signature of the TSS, or by including the SS block index in at least one modulation symbol in the TSS. In some examples, the SS block index may further identify a beam on which the SS block is transmitted. In some examples, the operation(s) at block 2305 may be performed using the TSS determiner 1430 described with reference to FIG. 14.

At block 2315, the method 2300 may include transmitting, on the resources allocated for the SS block, the TSS and the PBCH, as described for example with reference to FIGS. 2-7. The TSS may be transmitted as a DMRS for the PBCH on at least one port used to transmit the TSS and the PBCH. In some examples, the SSS may be transmitted as an additional DMRS for the PBCH, on at least one port used to transmit the SSS and the PBCH. In some examples, the PBCH may be transmitted based at least in part on the SS block index for the SS block. In some examples, the operation(s) at block 2315 may be performed using the BCH TTI transmission manager 1435 or described with reference to FIG. 14.

In some examples of the method 2300, transmitting the TSS and the PBCH may include transmitting the TSS time division multiplexed with the PBCH on a same set of one or more frequency subcarriers. In some of these examples, the SS block may further include a PSS and a SSS, and transmitting the TSS, the SSS, and the PBCH may include transmitting the PBCH and the TSS after the SSS.

In some examples of the method 2300, transmitting the TSS and the PBCH may include transmitting the TSS on a first set of one or more frequency subcarriers that overlaps a second set of one or more frequency subcarriers on which the PBCH is transmitted. The first set of one or more frequency subcarriers may be different from the second set of one or more frequency subcarriers. In some examples, transmitting the TSS and the PBCH may further include transmitting the TSS frequency division multiplexed with at least a portion of the PBCH. In some examples, the SS block may further include a PSS and a SSS, and transmitting the SSS and the PBCH may include transmitting a second portion of the PBCH after the SSS.

In some examples of the method 2300, transmitting the TSS and the PBCH may include transmitting the TSS on a first set of one or more frequency subcarriers that is interleaved with a second set of one or more frequency subcarriers on which the PBCH is transmitted. In some of these examples, the SS block may further include a PSS and a SSS, and transmitting the TSS, the PSS, the SSS, and the PBCH may include transmitting the PSS and the SSS frequency division multiplexed with the interleaved TSS and PBCH.

Figure 24:
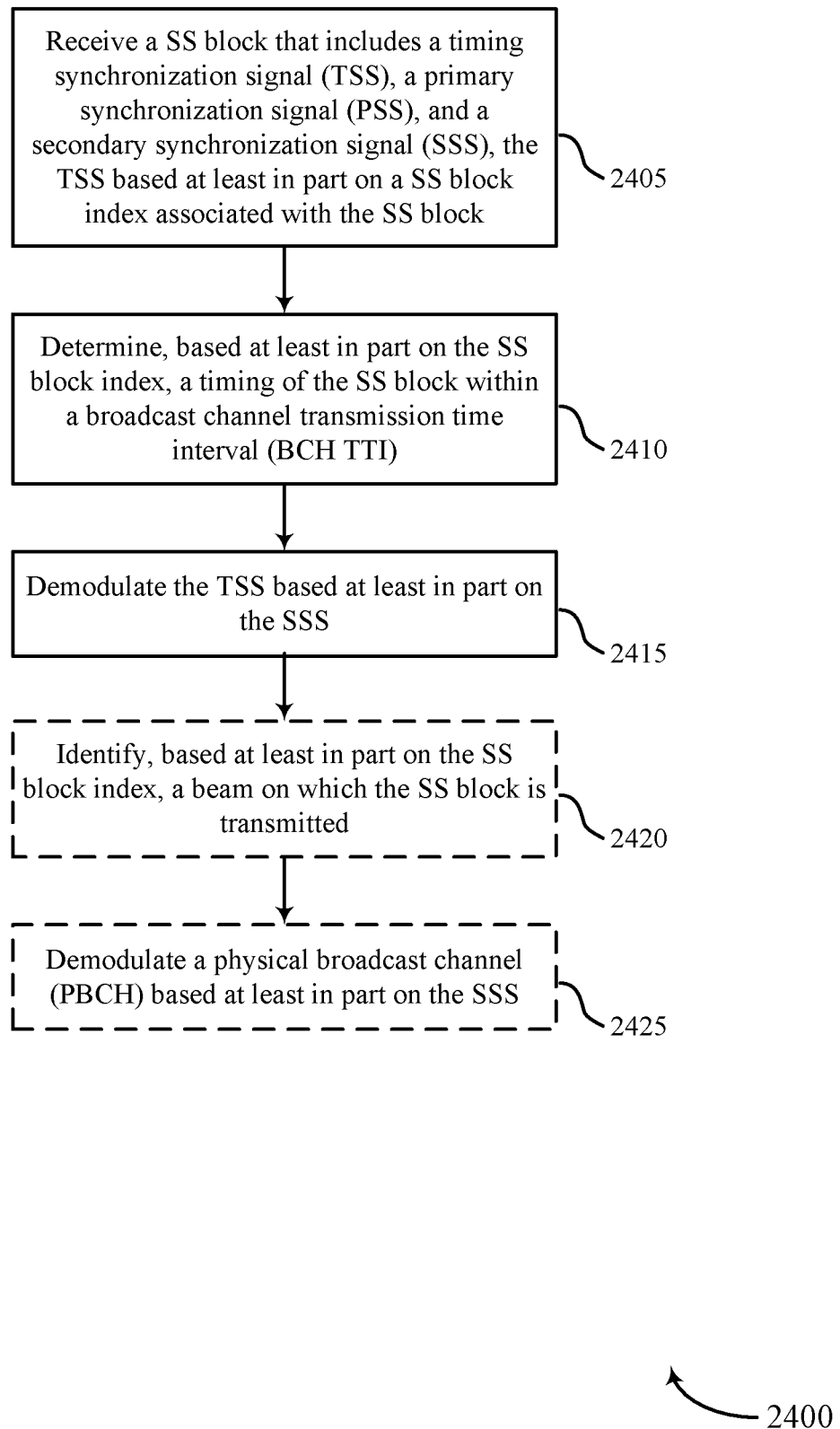
FIG. 24 is a flow chart illustrating an example of a method for wireless communication at a UE, in accordance with various aspects of the present disclosure.

FIG. 24 is a flow chart illustrating an example of a method 2400 for wireless communication at a UE, in accordance with various aspects of the present disclosure. For clarity, the method 2400 is described below with reference to aspects of one or more of the UEs described with reference to FIGS. 1, 3, and 18, aspects of the apparatus described with reference to FIG. 8, or aspects of one or more of the UE wireless communication managers described with reference to FIGS. 8-12 and 18. In some examples, a UE may execute one or more sets of codes to control the functional elements of the UE to perform the functions described below. Additionally or alternatively, the UE may perform one or more of the functions described below using special-purpose hardware.

At block 2405, the method 2400 may include receiving a SS block that includes a TSS, a PSS, and a SSS, as described for example with reference to FIGS. 2-4 and 6. The TSS may be based at least in part on a SS block index associated with the SS block. In some examples, the TSS may be based at least in part on the SS block index because the SS block index is encoded in a waveform signature of the TSS, or because the SS block index is included in at least one modulation symbol in the TSS. The SS block index may indicate the timing of the TSS within a BCH TTI, and may thus indicate the timing of the SS block within the BCH TTI. In some examples, the SSS may be based at least in part on a PCI of the base station. In some examples, the SS block may be one SS block in a plurality of SS blocks within the BCH TTI. In some examples, the operation(s) at block 2405 may be performed using the BCH TTI reception manager 1025 or SS block reception manager 1030 described with reference to FIG. 10.

At block 2410, the method 2400 may include determining, based at least in part on the SS block index, a timing of the SS block within the BCH TTI, as described for example with reference to FIGS. 2-4 and 6. In some examples, the operation(s) at block 2410 may be performed using the synchronization manager 1035 described with reference to FIG. 10.

At block 2415, the method 2400 may include demodulating the TSS based at least in part on the SSS, as described herein and for example with reference to FIGS. 2-4 and 6. In some examples, the operation(s) at block 2415 may be performed using the TSS demodulator 1040 described with reference to FIG. 10.

At block 2420, the method 2400 may optionally include identifying, based at least in part on the SS block index, a beam on which the SS block is transmitted, as described for example with reference to FIGS. 2-4 and 6. In some examples, the operation(s) at block 2420 may be performed using the beam identifier 1045 described with reference to FIG. 10.

At block 2425, and when the SS block includes a PBCH, the method 2400 may optionally include demodulating the PBCH based at least in part on the SSS, as described herein and for example with reference to FIGS. 2-4 and 6. In some examples, the operation(s) at block 2425 may be performed using the PBCH demodulator 1050 described with reference to FIG. 10.

In some examples of the method 2400, the SS block may include a PBCH, and receiving the TSS and the PBCH may include receiving the TSS time division multiplexed with the PBCH on a same set of one or more frequency subcarriers. In some of these examples, receiving the TSS, the SSS, and the PBCH may include receiving the PBCH and the TSS after the SSS.

When the SS block includes a PBCH, and in some examples of the method 2400, the PBCH may be received based at least in part on the SS block index, and the method 2100 may include decoding the PBCH, based at least in part on the SS block index.

Figure 25:
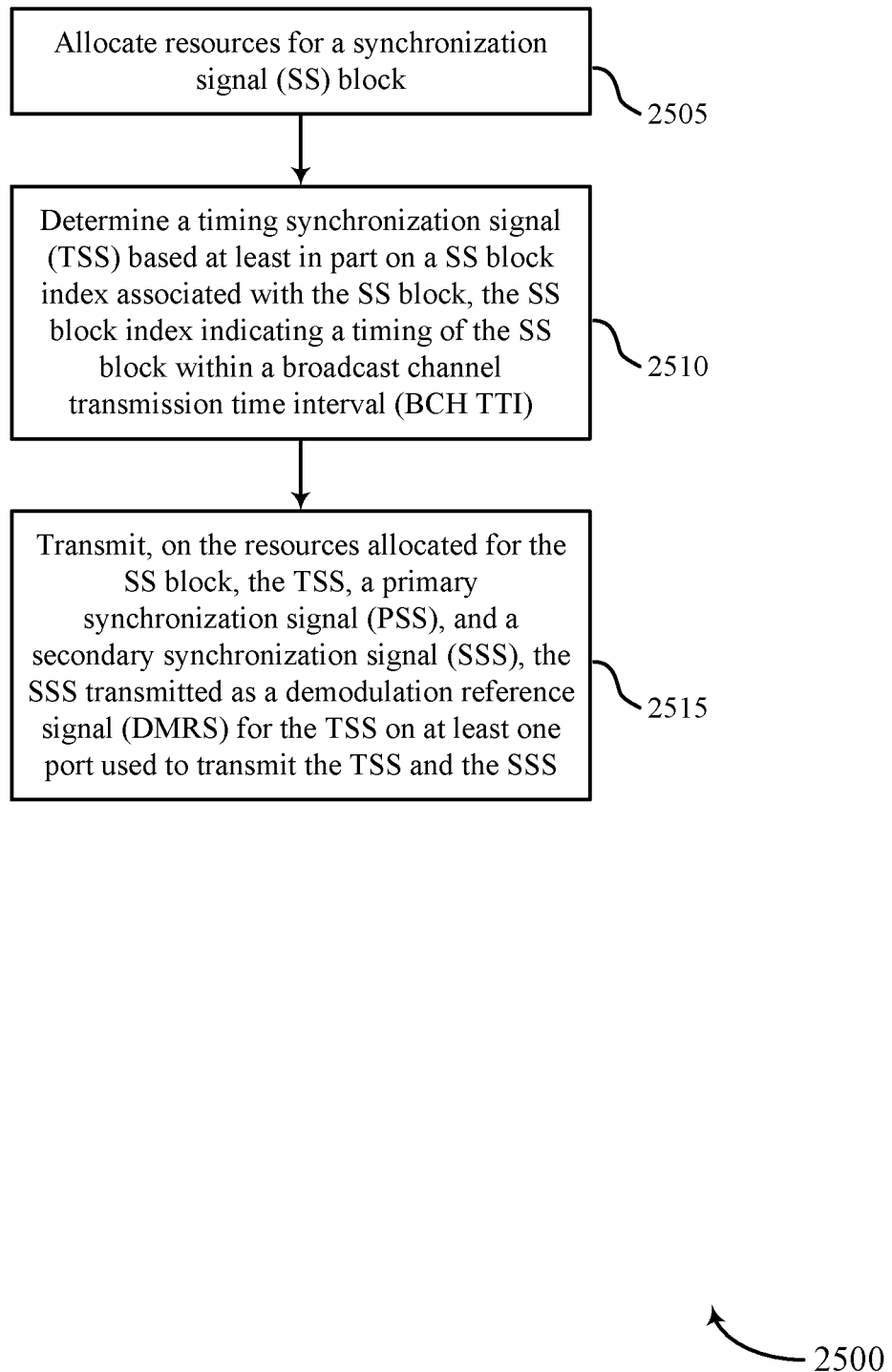
FIG. 25 is a flow chart illustrating an example of a method for wireless communication at a base station, in accordance with various aspects of the present disclosure.

FIG. 25 is a flow chart illustrating an example of a method 2500 for wireless communication at a base station, in accordance with various aspects of the present disclosure. For clarity, the method 2500 is described below with reference to aspects of one or more of the base stations described with reference to FIGS. 1, 3, and 19, aspects of the apparatus described with reference to FIG. 13, or aspects of one or more of the base station wireless communication managers described with reference to FIGS. 13-17 and 19. In some examples, a base station may execute one or more sets of codes to control the functional elements of the base station to perform the functions described below. Additionally or alternatively, the base station may perform one or more of the functions described below using special-purpose hardware.

At block 2505, the method 2500 may include allocating resources for a SS block, as described for example with reference to FIGS. 2-4 and 6. The SS block may include a TSS, a PSS, and a SSS, and thus, resources may be allocated for the TSS, the PSS, and the SSS in the SS block. The SSS may be determined based at least in part on a PCI of the base station. In some examples, the SS block may also include a PBCH, and resources may be allocated for the PBCH in the SS block. In some examples, the SS block may be one SS block in a plurality of SS blocks transmitted (e.g., by the base station) within a BCH TTI. In some examples, the operation(s) at block 2505 may be performed using the SS block resource allocator 1525 described with reference to FIG. 15.

At block 2510, the method 2500 may include determining the TSS based at least in part on a timing of the TSS within the BCH TTI, as described for example with reference to FIGS. 2-4 and 6. The timing of the TSS may be based at least in part on a SS block index associated with the SS block. The SS block index may indicate the timing of the TSS within the BCH TTI, and thus, the TSS may be determined based at least in part on the SS block index. In some examples, the TSS may be determined based at least in part on the SS block index by encoding the SS block index in a waveform signature of the TSS, or by including the SS block index in at least one modulation symbol in the TSS. In some examples, the SS block index may further identify a beam on which the SS block is transmitted. In some examples, the operation(s) at block 2505 may be performed using the TSS determiner 1530 described with reference to FIG. 15.

At block 2515, the method 2500 may include transmitting, on the resources allocated for the SS block, the TSS the PSS, and the SSS, as described for example with reference to FIGS. 2-4 and 6. The SSS may be transmitted as a DMRS for the TSS on at least one port used to transmit the TSS and the SSS. When the SS block includes a PBCH, the SSS may also be transmitted as a DMRS for the PBCH, on at least one port used to transmit the SSS and the PBCH. In some examples, the PBCH may be transmitted based at least in part on the SS block index for the SS block. In some examples, the operation(s) at block 2515 may be performed using the BCH TTI transmission manager 1535 or SS block transmission manager 1540 described with reference to FIG. 15.

When the SS block includes a PBCH, and in some examples of the method 2500, transmitting the TSS and the PBCH may include transmitting the TSS time division multiplexed with the PBCH on a same set of one or more frequency subcarriers. In some of these examples, transmitting the TSS, the SSS, and the PBCH may include transmitting the PBCH and the TSS after the SSS.

Figure 26:
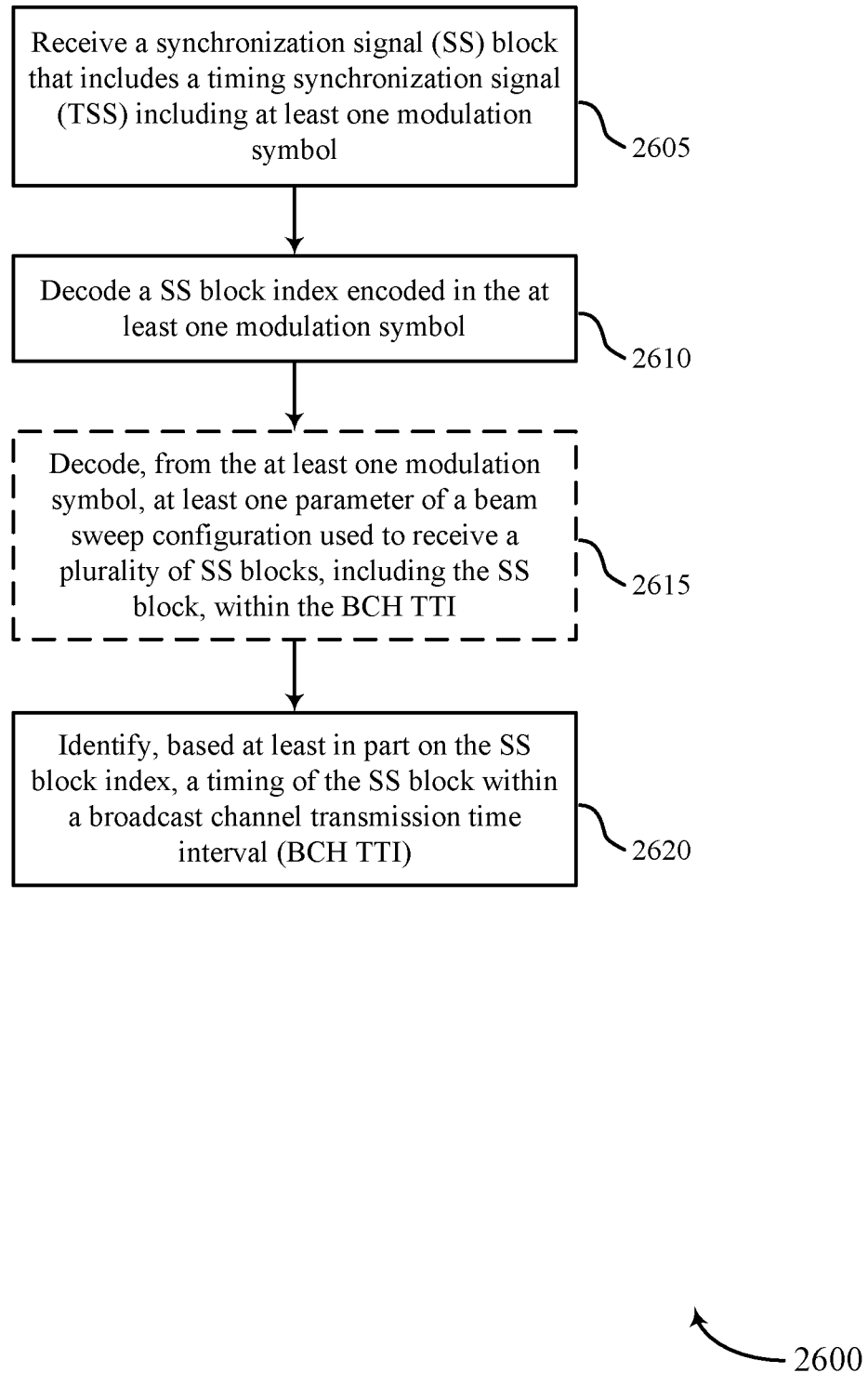
FIG. 26 is a flow chart illustrating an example of a method for wireless communication at a UE, in accordance with various aspects of the present disclosure.

FIG. 26 is a flow chart illustrating an example of a method 2600 for wireless communication at a UE, in accordance with various aspects of the present disclosure. For clarity, the method 2600 is described below with reference to aspects of one or more of the UEs described with reference to FIGS. 1, 3, and 18, aspects of the apparatus described with reference to FIG. 8, or aspects of one or more of the UE wireless communication managers described with reference to FIGS. 8-12 and 18. In some examples, a UE may execute one or more sets of codes to control the functional elements of the UE to perform the functions described below. Additionally or alternatively, the UE may perform one or more of the functions described below using special-purpose hardware.

At block 2605, the method 2600 may include receiving a SS block that includes a TSS, as described for example with reference to FIGS. 2-7. The TSS may include at least one modulation symbol. In some examples, the at least one modulation symbol may include a QPSK symbol or a BPSK symbol. In some examples, the SS block may also include a PSS, a SSS, and/or a PBCH. In some examples, the SSS may be based at least in part on a PCI of the base station. In some examples, the SS block may be one SS block in a plurality of SS blocks within a BCH TTI. In some examples, the operation(s) at block 2605 may be performed using the SS block reception manager 1125 described with reference to FIG. 11.

At block 2610, the method 2600 may include decoding a SS block index encoded in the at least one modulation symbol, as described for example with reference to FIGS. 2-7. The SS block index may indicate the timing of the TSS within a BCH TTI, and may thus indicate the timing of the SS block within the BCH TTI. In some examples, the SS block index may be encoded in the at least one modulation symbol using a polar code, or a Reed-Mueller code, or a Golay code, or a TBCC. In some examples, the operation(s) at block 2610 may be performed using the TSS payload decoder 1130 described with reference to FIG. 11.

At block 2615, the method 2600 may optionally include decoding, from the at least one modulation symbol, at least one parameter of a beam sweep configuration used to receive a plurality of SS blocks, including the SS block, within the BCH TTI, as described for example with reference to FIGS. 2-7. In some examples, the at least one parameter of the beam sweep configuration may include a number of beams in a SS block burst-set, or a periodicity of the SS block burst-set, or a combination thereof. In some examples, the operation(s) at block 2615 may be performed using the TSS payload decoder 1130 described with reference to FIG. 11.

At block 2620, the method 2600 may include identifying, based at least in part on the SS block index, a timing of the SS block within a BCH TTI, as described for example with reference to FIGS. 2-7. In some examples, the operation(s) at block 2620 may be performed using the synchronization manager 1135 described with reference to FIG. 11.

In some examples, the method 2600 may optionally include decoding a CRC for the SS block index encoded in the at least one modulation symbol, and verifying the SS block index based at least in part on the CRC.

Figure 27:
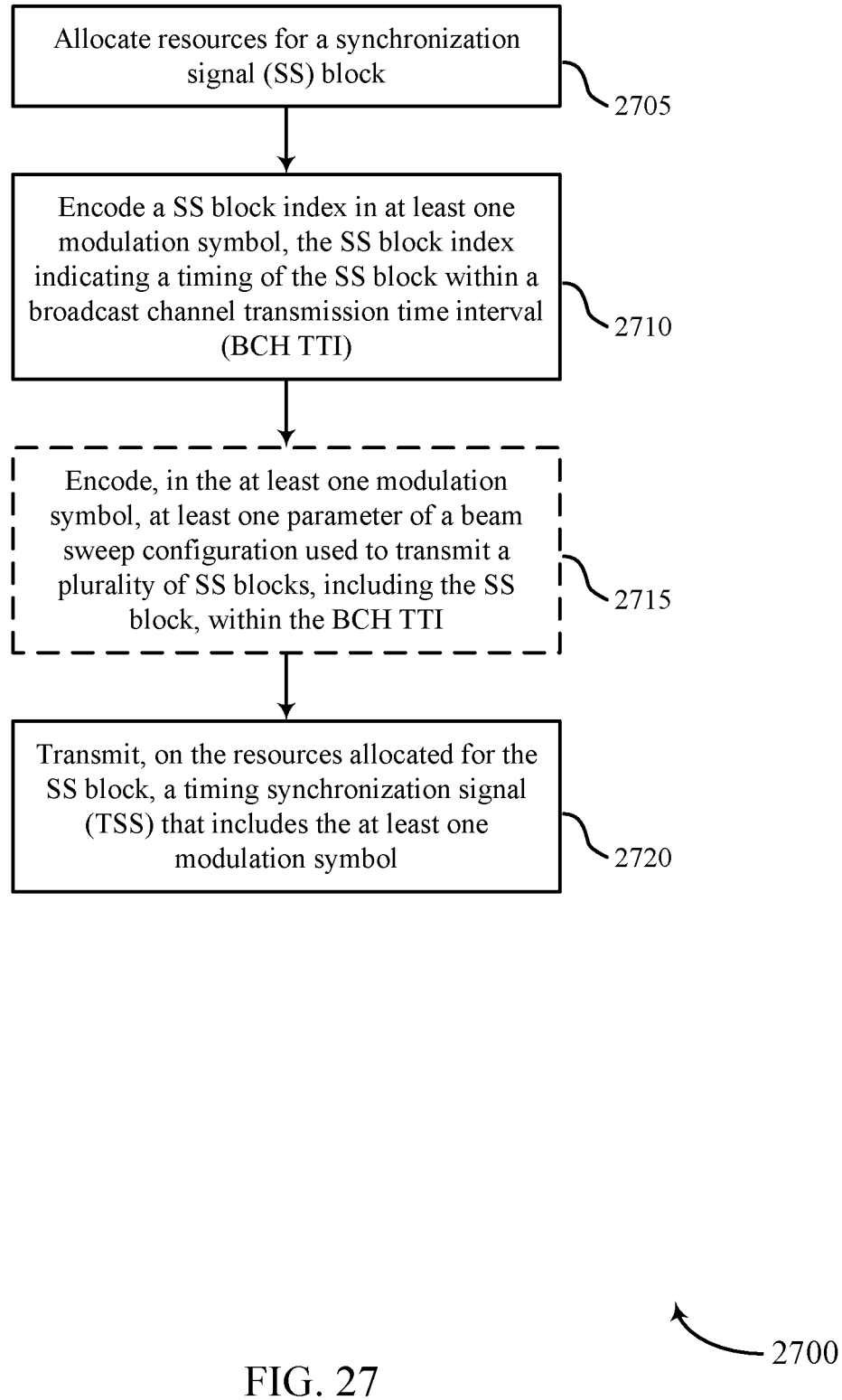
FIG. 27 is a flow chart illustrating an example of a method for wireless communication at a base station, in accordance with various aspects of the present disclosure.

FIG. 27 is a flow chart illustrating an example of a method 2700 for wireless communication at a base station, in accordance with various aspects of the present disclosure. For clarity, the method 2700 is described below with reference to aspects of one or more of the base stations described with reference to FIGS. 1, 3, and 19, aspects of the apparatus described with reference to FIG. 13, or aspects of one or more of the base station wireless communication managers described with reference to FIGS. 13-17 and 19. In some examples, a base station may execute one or more sets of codes to control the functional elements of the base station to perform the functions described below. Additionally or alternatively, the base station may perform one or more of the functions described below using special-purpose hardware.

At block 2705, the method 2700 may include allocating resources for a SS block, as described for example with reference to FIGS. 2-7. The SS block may include a TSS, a PSS, a SSS, and/or a PBCH, and thus, resources may be allocated for the TSS, the PSS, the SSS, and/or the PBCH in the SS block. The SSS may be determined based at least in part on a PCI of the base station. In some examples, the SS block may be one SS block in a plurality of SS blocks transmitted (e.g., by the base station) within a BCH TTI. In some examples, the operation(s) at block 2705 may be performed using the SS block resource allocator 1625 described with reference to FIG. 16.

At block 2710, the method 2700 may include encoding a SS block index in at least one modulation symbol, as described for example with reference to FIGS. 2-7. In some examples, the at least one modulation symbol may include a QPSK symbol or a BPSK symbol. The SS block index may indicate a timing of the TSS within a BCH TTI, and may thus indicate the timing of the SS block within the BCH TTI. In some examples, the SS block index may be encoded in the at least one modulation symbol using a polar code, or a Reed-Mueller code, or a Golay code, or a TBCC. In some examples, the operation(s) at block 2710 may be performed using the TSS payload encoder 1630 described with reference to FIG. 16.

At block 2715, the method 2700 may optionally include encoding, in the at least one modulation symbol, at least one parameter of a beam sweep configuration used to transmit a plurality of SS blocks, including the SS block, within the BCH TTI, as described for example with reference to FIGS. 2-7. In some examples, the at least one parameter of the beam sweep configuration may include a number of beams in a SS block burst-set, or a periodicity of the SS block burst-set, or a combination thereof. In some examples, the operation(s) at block 2715 may be performed using the TSS payload encoder 1630 described with reference to FIG. 16.

At block 2720, the method 2700 may include transmitting, on the resources allocated for the SS block, a TSS that includes the at least one modulation symbol, as described for example with reference to FIGS. 2-7. In some examples, the operation(s) at block 2720 may be performed using the SS block transmission manager 1635 or TSS transmission manager 1640 described with reference to FIG. 16.

In some examples, the method 2700 may optionally include generating a CRC for the SS block index, and encoding the CRC in the at least one modulation symbol, along with the SS block index.

Figure 28:
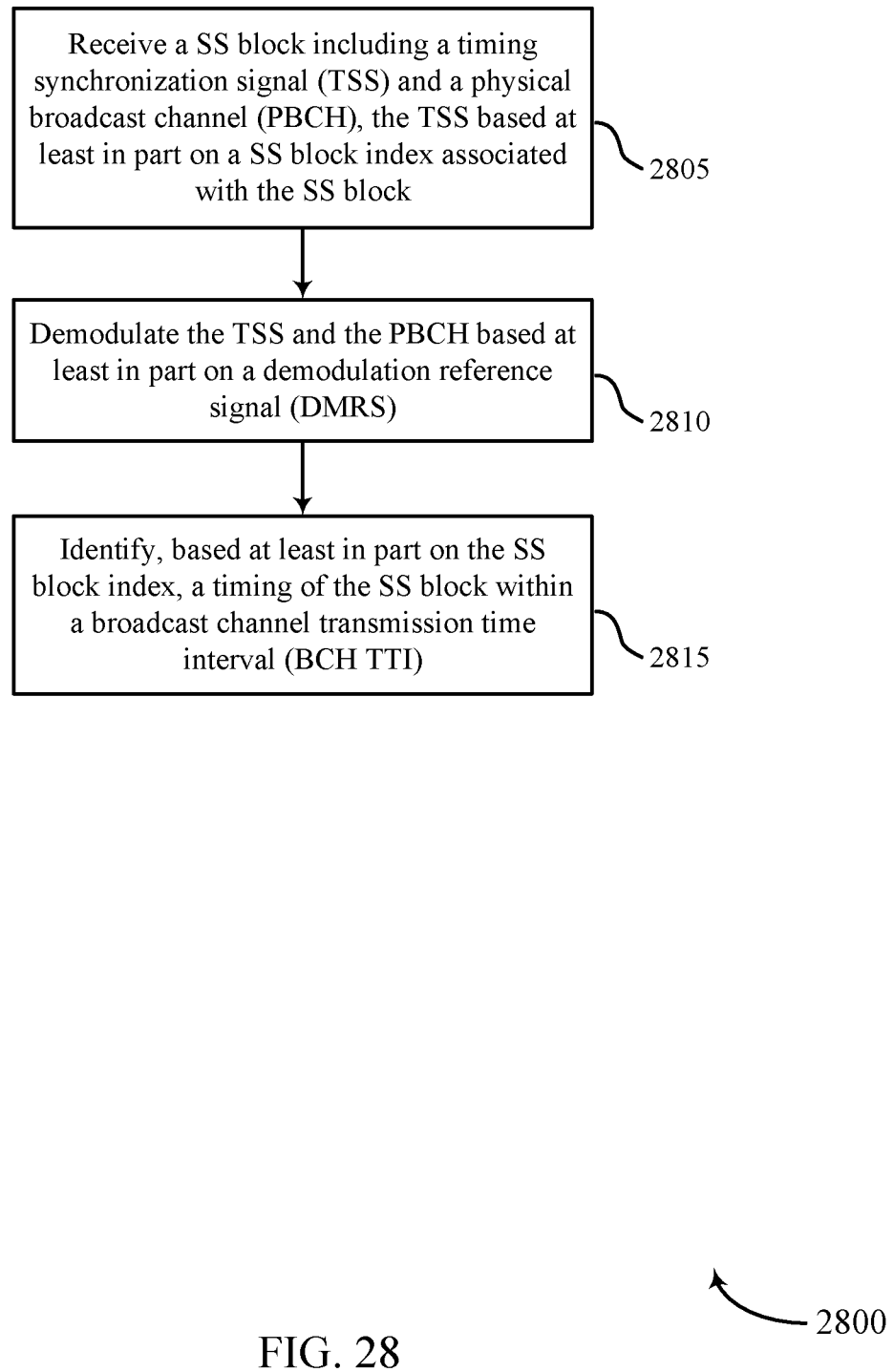
FIG. 28 is a flow chart illustrating an example of a method for wireless communication at a UE, in accordance with various aspects of the present disclosure.

FIG. 28 is a flow chart illustrating an example of a method 2800 for wireless communication at a UE, in accordance with various aspects of the present disclosure. For clarity, the method 2800 is described below with reference to aspects of one or more of the UEs described with reference to FIGS. 1,3, and 18, aspects of the apparatus described with reference to FIG. 8, or aspects of one or more of the UE wireless communication managers described with reference to FIGS. 8-12 and 18. In some examples, a UE may execute one or more sets of codes to control the functional elements of the UE to perform the functions described below. Additionally or alternatively, the UE may perform one or more of the functions described below using special-purpose hardware.

At block 2805, the method 2800 may include receiving a SS block that includes a TSS and a PBCH, as described for example with reference to FIGS. 2-4 and 6. The TSS may be based at least in part on a SS block index associated with the SS block. In some examples, the TSS may be based at least in part on the SS block index because the SS block index is encoded in a waveform signature of the TSS, or because the SS block index is included in at least one modulation symbol in the TSS. The SS block index may indicate the timing of the TSS within a BCH TTI, and may thus indicate the timing of the SS block within the BCH TTI. In some examples, the SS block may further include a PSS and a SSS. In some examples, the SSS may be based at least in part on a PCI of the base station. In some examples, the SS block may be one SS block in a plurality of SS blocks within the BCH TTI. In some examples, the operation(s) at block 2805 may be performed using the BCH TTI reception manager 1225 or SS block reception manager 1230 described with reference to FIG. 12.

At block 2810, the method 2800 may include demodulating the TSS and the PBCH based at least in part on a same DMRS, as described herein and for example with reference to FIGS. 2-4 and 6. In some examples, the DMRS may include a SSS in the SS block. In some examples, the operation(s) at block 2810 may be performed using the demodulator 1235 described with reference to FIG. 12.

At block 2815, the method 2800 may include identifying, based at least in part on the SS block index, a timing of the SS block within a BCH TTI, as described for example with reference to FIGS. 2-4 and 6. In some examples, the operation(s) at block 2815 may be performed using the synchronization manager 1240 described with reference to FIG. 12.

Figure 29:
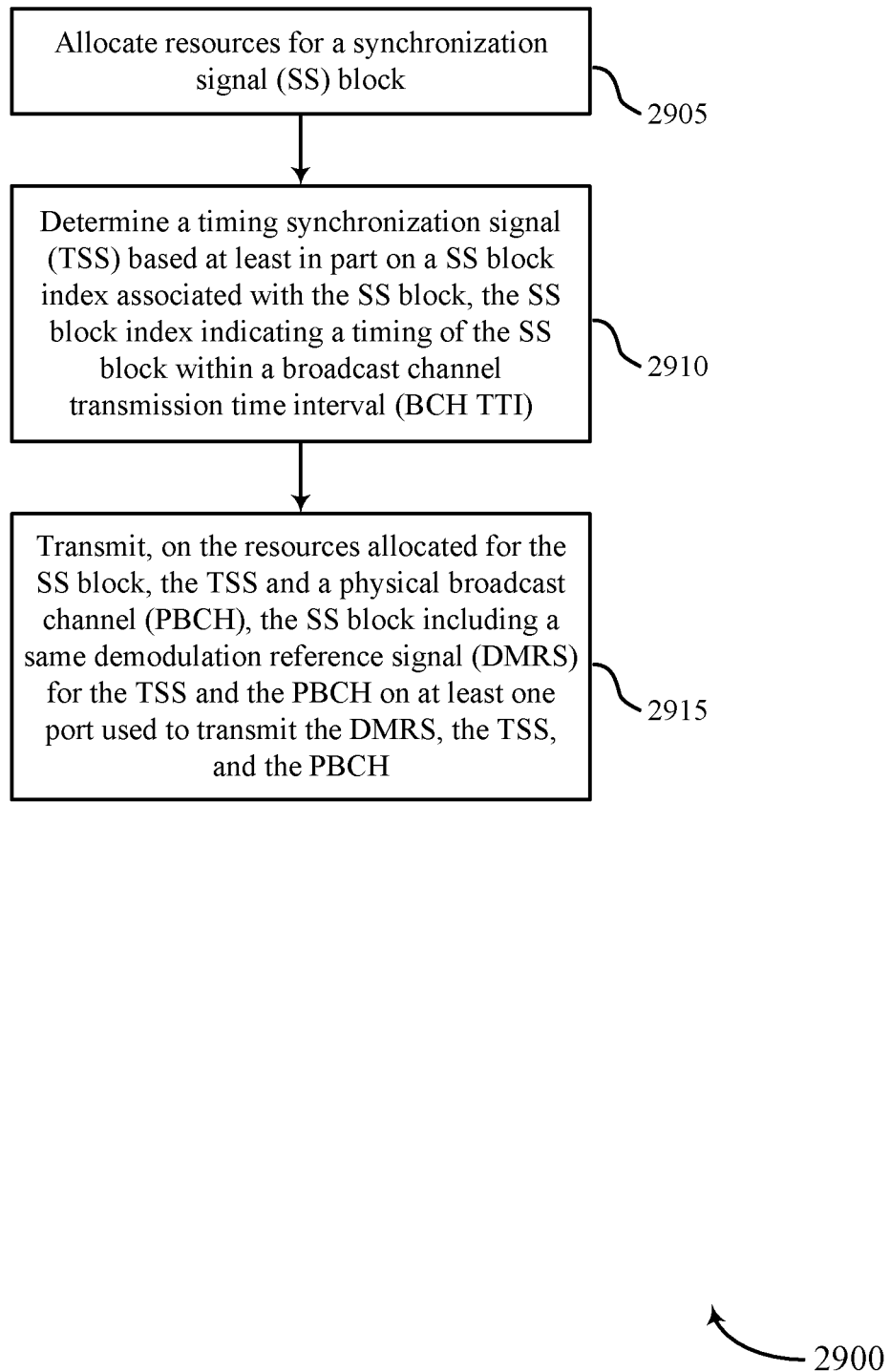
FIG. 29 is a flow chart illustrating an example of a method for wireless communication at a base station, in accordance with various aspects of the present disclosure.

FIG. 29 is a flow chart illustrating an example of a method 2900 for wireless communication at a base station, in accordance with various aspects of the present disclosure. For clarity, the method 2900 is described below with reference to aspects of one or more of the base stations described with reference to FIGS. 1,3, and 19, aspects of the apparatus described with reference to FIG. 13, or aspects of one or more of the base station wireless communication managers described with reference to FIGS. 13-17 and 19. In some examples, a base station may execute one or more sets of codes to control the functional elements of the base station to perform the functions described below. Additionally or alternatively, the base station may perform one or more of the functions described below using special-purpose hardware.

At block 2905, the method 2900 may include allocating resources for a SS block, as described for example with reference to FIGS. 2-4 and 6. The SS block may include a TSS and a PBCH, and thus, resources may be allocated for the TSS and the PBCH in the SS block. The SS block may also include a PSS and a SSS, and resources in the SS block may be allocated for the PSS and the SSS. The SSS may be determined based at least in part on a PCI of the base station. In some examples, the SS block may be one SS block in a plurality of SS blocks transmitted (e.g., by the base station) within a BCH TTI. In some examples, the operation(s) at block 2905 may be performed using the SS block resource allocator 1725 described with reference to FIG. 17.

At block 2910, the method 2900 may include determining a TSS based at least in part on a SS block index associated with the SS block, as described for example with reference to FIGS. 2-4 and 6. The SS block index may indicate a timing of the SS block within a BCH TTI. In some examples, the operation(s) at block 2910 may be performed using the TSS determiner 1730 described with reference to FIG. 17.

At block 2915, the method 2900 may include transmitting, on the resources allocated for the SS block, the TSS and the PBCH, as described for example with reference to FIGS. 2-4 and 6. The transmitted SS block may include a same DMRS for the TSS and the PBCH on at least one port used to transmit the DMRS, the TSS, and the PBCH. In some examples, the DMRS may include a SSS in the SS block. In some examples, the operation(s) at block 2915 may be performed using the BCH TTI transmission manager 1735 described with reference to FIG. 17.

The methods 2000, 2100, 2200, 2300, 2400, 2500, 2600, 2700, 2800, and 2900 described with reference to FIGS. 20-29 may provide for wireless communication. It should be noted that the methods are example implementations of some of the techniques described in the present disclosure, and the operations of the methods may be rearranged, combined with other operations of the same or different method, or otherwise modified, such that other implementations are possible. In some examples, operations of the methods 2000, 2100, 2400, 2600, or 2800 may be combined. In some examples, operations of the methods 2200, 2300, 2500, 2700, or 2900 may be combined. In some examples, operations may be added to the methods.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving a synchronization signal (SS) block that includes a physical broadcast channel (PBCH), a demodulation reference signal (DMRS) for the PBCH, a primary synchronization signal (PSS), and a secondary synchronization signal (SSS), the DMRS for the PBCH based at least in part on a SS block index associated with the SS block;
   determining the SS block index, wherein the SS block index is at least encoded by a waveform signature of the DMRS for the PBCH;
   determining, based at least in part on the SS block index, a timing of the SS block within a broadcast channel transmission time interval (BCH TTI); and demodulating the PBCH based at least in part on the DMRS for the PBCH by assuming signals within the SS block are transmitted from a same antenna port.

2. The method of claim 1, further comprising:
receiving the SS block index encoded by the waveform signature of the DMRS for the PBCH or in at least one modulation symbol in a timing synchronization signal (TSS).

3. The method of claim 1, further comprising:
identifying, based at least in part on the SS block index, a beam on which the SS block is received.

4. The method of claim 1, further comprising:
receiving the PBCH based at least in part on the SS block index; and
decoding the PBCH based at least in part on the SS block index.

5. The method of claim 1, further comprising:
demodulating the PBCH based at least in part on the SSS.

6. The method of claim 1, wherein the SSS is based at least in part on a physical cell identity (PCI) of a base station.

7. The method of claim 1, wherein a timing synchronization signal (TSS) includes at least one modulation symbol encoding the SS block index, the method further comprising:
decoding the SS block index encoded in the at least one modulation symbol, wherein the at least one modulation symbol includes a quadrature phase-shift keying (QPSK) symbol.

8. The method of claim 1, further comprising:
receiving a second SS block that includes a second PBCH, a second DMRS for the second PBCH, a second PSS, and a second SSS, the second DMRS for the second PBCH based at least in part on a second SS block index associated with the second SS block;
determining, based at least in part on the SS block index and the second SS block index, a timing of each of the SS block and the second SS block within the BCH TTI; and
demodulating the PBCH and the second PBCH based at least in part on the second DMRS for the second PBCH by assuming signals within the second SS block are transmitted from a same antenna port.

9. A user equipment (UE), comprising:
one or more memories storing processor-executable code; and
one or more processors coupled with the one or more memories and individually or collectively operable to execute the code to cause the UE to:
receive a synchronization signal (SS) block that includes a physical broadcast channel (PBCH), a demodulation reference signal (DMRS) for the PBCH, a primary synchronization signal (PSS), and a secondary synchronization signal (SSS), the DMRS for the PBCH based at least in part on a SS block index associated with the SS block;
determine the SS block index, wherein the SS block index is at least encoded by a waveform signature of the DMRS for the PBCH;
determine, based at least in part on the SS block index, a timing of the SS block within a broadcast channel transmission time interval (BCH TTI); and
demodulate the PBCH based at least in part on the DMRS for the PBCH by assuming signals within the SS block are transmitted from a same antenna port.

10. The UE of claim 9, wherein the one or more processors are individually or collectively further operable to execute the code to cause the UE to:
receive the SS block index encoded by the waveform signature of the DMRS for the PBCH or in at least one modulation symbol in a timing synchronization signal (TSS).

11. The UE of claim 9, wherein the one or more processors are individually or collectively further operable to execute the code to cause the UE to:
identify, based at least in part on the SS block index, a beam on which the SS block is received.

12. The UE of claim 9, wherein the one or more processors are individually or collectively further operable to execute the code to cause the UE to:
receive the PBCH based at least in part on the SS block index; and
decode the PBCH based at least in part on the SS block index.

13. The UE of claim 9, wherein the one or more processors are individually or collectively further operable to execute the code to cause the UE to:
demodulate the PBCH based at least in part on the SSS.

14. The UE of claim 9, wherein the SSS is based at least in part on a physical cell identity (PCI) of a base station.

15. The UE of claim 9, wherein a timing synchronization signal (TSS) includes at least one modulation symbol encoding the SS block index, and the one or more processors are individually or collectively further operable to execute the code to cause the UE to:
decode the SS block index encoded in the at least one modulation symbol, wherein the at least one modulation symbol includes a quadrature phase-shift keying (QPSK) symbol.

16. The UE of claim 9, wherein the one or more processors are individually or collectively further operable to execute the code to cause the UE to:
receive a second SS block that includes a second PBCH, a second DMRS for the second PBCH, a second PSS, and a second SSS, the second DMRS for the second PBCH based at least in part on a second SS block index associated with the second SS block;
determine, based at least in part on the SS block index and the second SS block index, a timing of each of the SS block and the second SS block within the BCH TTI; and
demodulate the PBCH and the second PBCH based at least in part on the second DMRS for the second PBCH by assuming signals within the second SS block are transmitted from a same antenna port.

17. A non-transitory computer-readable medium storing code for wireless communication, the code comprising instructions executable by one or more processors to:
receive a synchronization signal (SS) block that includes a physical broadcast channel (PBCH), a demodulation reference signal (DMRS) for the PBCH, a primary synchronization signal (PSS), and a secondary synchronization signal (SSS), the DMRS for the PBCH based at least in part on a SS block index associated with the SS block;
determine the SS block index, wherein the SS block index is at least encoded by a waveform signature of the DMRS for the PBCH;
determine, based at least in part on the SS block index, a timing of the SS block within a broadcast channel transmission time interval (BCH TTI); and demodulate the PBCH based at least in part on the DMRS for the PBCH by assuming signals on the SS block are transmitted from a same antenna port.

18. The non-transitory computer-readable medium of claim 17, wherein the instructions are further executable by the one or more processors to:
receive the SS block index encoded by the waveform signature of the DMRS for the PBCH or in at least one modulation symbol in a timing synchronization signal (TSS).

19. The non-transitory computer-readable medium of claim 17, wherein the instructions are further executable by the one or more processors to:
identify, based at least in part on the SS block index, a beam on which the SS block is received.

20. The non-transitory computer-readable medium of claim 17, wherein the instructions are further executable by the one or more processors to:
receive the PBCH based at least in part on the SS block index; and
decode the PBCH based at least in part on the SS block index.

* * * * *